(12) United States Patent
Masuda

(10) Patent No.: US 12,025,546 B2
(45) Date of Patent: Jul. 2, 2024

(54) FLOW PATH DEVICE, METHOD FOR MANUFACTURING FLOW PATH DEVICE, FLOW PATH MEASURING DEVICE, AND INSPECTION APPARATUS

(71) Applicant: KYOCERA CORPORATION, Kyoto (JP)

(72) Inventor: Yuji Masuda, Yasu (JP)

(73) Assignee: KYOCERA CORPORATION, Kyoto (JP)

( * ) Notice: Subject to any disclaimer, the term of this patent is extended or adjusted under 35 U.S.C. 154(b) by 212 days.

(21) Appl. No.: 17/777,980

(22) PCT Filed: Nov. 12, 2020

(86) PCT No.: PCT/JP2020/042203
§ 371 (c)(1),
(2) Date: May 18, 2022

(87) PCT Pub. No.: WO2021/100590
PCT Pub. Date: May 27, 2021

(65) Prior Publication Data
US 2022/0412868 A1 Dec. 29, 2022

(30) Foreign Application Priority Data
Nov. 19, 2019 (JP) .................. 2019-208809

(51) Int. Cl.
*G01N 15/06* (2024.01)
*B29D 99/00* (2010.01)
*G01N 15/075* (2024.01)

(52) U.S. Cl.
CPC ............ *G01N 15/06* (2013.01); *B29D 99/00* (2013.01); *G01N 15/075* (2024.01)

(58) Field of Classification Search
CPC ..... B01L 2200/0636; B01L 2200/0652; B01L 2300/0681; B01L 2300/0816; B01L 2300/0887; B01L 2300/168; B01L 3/502707; B01L 3/502761; B29D 99/00; G01N 15/0255; G01N 15/06; G01N 2015/0019; G01N 2015/0288; G01N 15/075; G01N 2015/012; G01N 2015/016
See application file for complete search history.

(56) References Cited

U.S. PATENT DOCUMENTS

2020/0330992 A1  10/2020  Yoneta et al.

FOREIGN PATENT DOCUMENTS

WO  2019151150 A1  8/2019

*Primary Examiner* — Tri T Ton
(74) *Attorney, Agent, or Firm* — HAUPTMAN HAM, LLP

(57) ABSTRACT

A flow path device includes a first portion, and a second portion. The first portion includes a resin first body and a first reinforcement. In the first body, a first connector connects a first outer portion and a first joint having a groove pattern defining a first flow path. The first reinforcement is between and bonded to the first outer portion and the first joint, and includes first protrusions protruding from the first body and including two specific-shaped portions. The second portion includes a resin second body and a second reinforcement. In the second body, a second connector connects a second outer portion and a second joint, and through-holes connect to the first flow path. The second reinforcement is between and bonded to the second outer portion and the second joint, and includes second protrusions protruding from the second body and including two specific-shaped portions.

11 Claims, 30 Drawing Sheets

Vb-Vb

VIb-VIb

VIIIb-VIIIb

IXb-IXb

XVb-XVb

FLOW PATH DEVICE, METHOD FOR MANUFACTURING FLOW PATH DEVICE, FLOW PATH MEASURING DEVICE, AND INSPECTION APPARATUS

CROSS-REFERENCE TO RELATED APPLICATION

The present application is a National Phase entry based on PCT Application No. PCT/JP2020/042203 filed on Nov. 12, 2020, entitled "FLOW CHANNEL DEVICE, METHOD FOR MANUFACTURING FLOW CHANNEL DEVICE, MEASUREMENT FLOW CHANNEL DEVICE, AND INSPECTION APPARATUS", which claims the benefit of Japanese Patent Application No. 2019-208809, filed on Nov. 19, 2019, entitled "FLOW CHANNEL DEVICE, METHOD FOR MANUFACTURING FLOW CHANNEL DEVICE, MEASUREMENT FLOW CHANNEL DEVICE, AND INSPECTION APPARATUS". The contents of which are incorporated by reference herein in their entirety.

FIELD

Embodiments of the present disclosure relate generally to a flow path device, a method for manufacturing a flow path device, a flow path measuring device, and an inspection apparatus.

BACKGROUND

A known device (also referred to as a first flow path device) has flow paths for separating specific microparticles in a fluid. The first flow path device includes microflow paths with diameters comparable to the diameters of microparticles. A known measuring device (also referred to as a flow path measuring device) includes the first flow path device, and another device (also referred to as a second flow path device) connected to the first flow path device and having flow paths for inspecting specific microparticles separated and collected by the first flow path device. A known apparatus (also referred to as an inspection apparatus) includes the flow path measuring device and a sensor for measuring specific microparticles in the flow path measuring device.

SUMMARY

A flow path device, a method for manufacturing a flow path device, a flow path measuring device, and an inspection apparatus are disclosed.

In one embodiment, a flow path device includes a first portion and a second portion. The first portion has a first surface and a second surface opposite to the first surface. The second portion has a third surface joined to the second surface and a fourth surface opposite to the third surface. The first portion includes a first body including a resin and a first reinforcement being harder than the first body. The first body includes a first outer portion having the first surface, a first joint having the second surface, and one or more first connectors connecting the first outer portion and the first joint together. The first outer portion, the first joint, and the one or more first connectors are integral with one another. The first joint has, on the second surface, a groove pattern defining a first flow path. The first reinforcement is sandwiched between the first outer portion and the first joint and is bonded to the first outer portion and the first joint. The first reinforcement includes one or more first protrusions protruding from the first body in a direction along the first surface when viewed in plan toward the first surface. The one or more first protrusions include a first specific-shaped portion and a second specific-shaped portion at different positions when viewed in plan toward the first surface. The second portion includes a second body including a resin and a second reinforcement being harder than the second body. The second body includes a second outer portion having the fourth surface, a second joint having the third surface, one or more second connectors connecting the second outer portion and the second joint together, and a plurality of through-holes extending from the third surface to the fourth surface and connecting to the first flow path. The second outer portion, the second joint, and the one or more second connectors are integral with one another. The second reinforcement is sandwiched between the second outer portion and the second joint and is bonded to the second outer portion and the second joint. The second reinforcement includes one or more second protrusions protruding from the second body in a direction along the fourth surface when viewed in plan toward the fourth surface. The one or more second protrusions include a third specific-shaped portion and a fourth specific-shaped portion at different positions when viewed from a plan perspective toward the fourth surface.

In one embodiment, a method for manufacturing a flow path device includes (a) forming a first portion having a first surface and a second surface opposite to the first surface by resin molding, (b) forming a second portion having a third surface and a fourth surface opposite to the third surface by resin molding, and (c) joining the first portion and the second portion at the second surface and the third surface to form a flow path device. The (a) forming includes forming the first portion including a first body including a resin and a first reinforcement being harder than the first body. The first body includes a first outer portion having the first surface, a first joint having the second surface, and one or more first connectors connecting the first outer portion and the first joint together. The first outer portion, the first joint, and the one or more first connectors are integral with one another. The first joint has a groove pattern on the second surface. The first reinforcement is sandwiched between the first outer portion and the first joint and is bonded to the first outer portion and the first joint. The first reinforcement includes one or more first protrusions protruding from the first body in a direction along the first surface when viewed in plan toward the first surface. The one or more first protrusions include a first specific-shaped portion and a second specific-shaped portion at different positions when viewed from a plan perspective toward the first surface. The (b) forming includes forming the second portion including a second body including a resin and a second reinforcement being harder than the second body. The second body includes a second outer portion having the fourth surface, a second joint having the third surface, one or more second connectors connecting the second outer portion and the second joint together, and a plurality of through-holes extending from the third surface to the fourth surface. The second outer portion, the second joint, and the one or more second connectors are integral with one another. The second reinforcement is sandwiched between the second outer portion and the second joint and is bonded to the second outer portion and the second joint. The second reinforcement includes one or more second protrusions protruding from the second body in a direction along the fourth surface when viewed in plan toward the fourth surface. The one or more second protrusions include a third specific-shaped portion and a fourth specific-shaped portion at different positions when viewed from a plan perspective toward the fourth surface. The (c) joining includes aligning the first portion and the second portion using the first specific-shaped portion, the second specific-shaped portion, the third specific-shaped portion, and the fourth specific-shaped portion and bonding the first portion and the second portion at the second surface and the third surface to connect the groove pattern and the plurality of through-holes and to cause the groove pattern to define the first flow path.

In one embodiment, a flow path measuring device includes a first flow path device including the flow path device according to the above one embodiment, and a second flow path device. The plurality of through-holes include a through-hole including a first opening located in the fourth surface. The second flow path device has a fifth surface and a sixth surface opposite to the fifth surface, a second flow path located inside the second flow path device and having a second opening in the fifth surface, and a light-transmitting portion that transmits light from at least a measurement area included in the second flow path out of the second flow path device. The first opening and the second opening connect to each other.

In one embodiment, an inspection apparatus includes the flow path measuring device according to the above one embodiment, and a sensor that receives light from the measurement area through the light-transmitting portion.

DETAILED DESCRIPTION

Figure 1A:
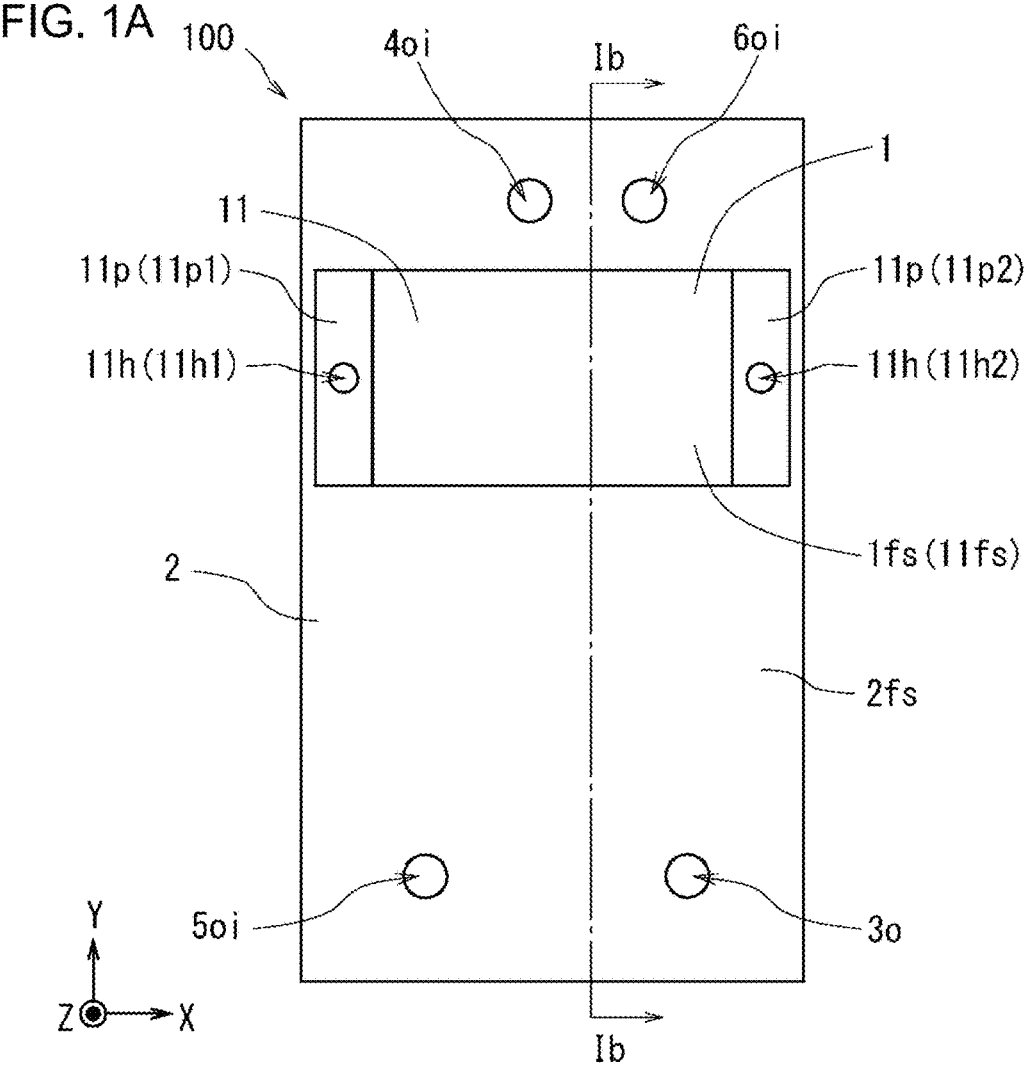
FIG. 1A illustrates a plan view of an example flow path measuring device according to a first embodiment.

A known device (first flow path device) includes microflow paths that branch for the diameters of specific microparticles to separate and collect specific microparticles in a fluid. A known measuring device (flow path measuring device) includes the first flow path device and another device (second flow path device) connected to the first flow path device and having flow paths for measuring specific microparticles. A known apparatus (inspection apparatus) includes the flow path measuring device and a sensor for measuring specific particles.

The first flow path device may be manufactured by, for example, joining a first member, which is a sheet or a plate with irregularities defining microflow paths, and a second member, which is a sheet or a plate with multiple throughholes connecting to the flow paths.

The material for the first flow path device may be, for example, polydimethylsiloxane (PDMS). PDMS is highly transferable in resin molding using molds. Being transferrable is the property that allows a resin-molded product to have fine irregularities in correspondence with the fine pattern of the mold used in resin molding. The first member is resin-molded using PDMS for easy manufacture of a flow path device having microflow paths.

However, a resin-molded product as a sheet or a plate formed using a highly transferrable resin such as PDMS is highly flexible. The resin-molded product can easily bend when lifted with its two ends being held. Thus, the first member and the second member may not easily be aligned with each other when, for example, being joined together.

This can occur to any device with flow paths (also referred to as a flow path device), in addition to a flow path device used for a flow path measuring device and an inspection apparatus.

The inventor of the present disclosure has developed a technique for accurately and easily manufacturing a flow path device, a flow path measuring device, and an inspection apparatus.

Embodiments and modifications of the present disclosure will now be described with reference to the drawings. Throughout the drawings, components with the same structures and functions are given the same reference numerals and will not be described repeatedly. The drawings are schematic. FIGS. 1A to 3B, FIGS. 5A to 21, and FIGS. 23A to 31 show the right-handed XYZ coordinate system. In this XYZ coordinate system, the longitudinal direction of a first upper surface $1fs$ of a first flow path device 1 is defined as the +X direction, the lateral direction of the first upper surface $1fs$ of the first flow path device 1 is defined as the +Y direction, and the direction normal to the first upper surface $1fs$, which is orthogonal to both the +X and +Y directions, is defined as the +Z direction.

1. First Embodiment

1-1. Flow Path Measuring Device

A flow path measuring device 100 according to a first embodiment receives, for example, a fluid as a sample, to flow through flow paths in the flow path measuring device 100 and thus separates and collects specific microparticles as a specific element contained in the sample from other elements to allow measurement of the collected specific microparticles. The fluid may be, for example, blood. In this case, the specific microparticles may be, for example, white blood cells. The other elements may be, for example, other microparticles such as red blood cells. The measurement may be, for example, measuring the number of white blood cells contained in the blood.

Figure 1B:
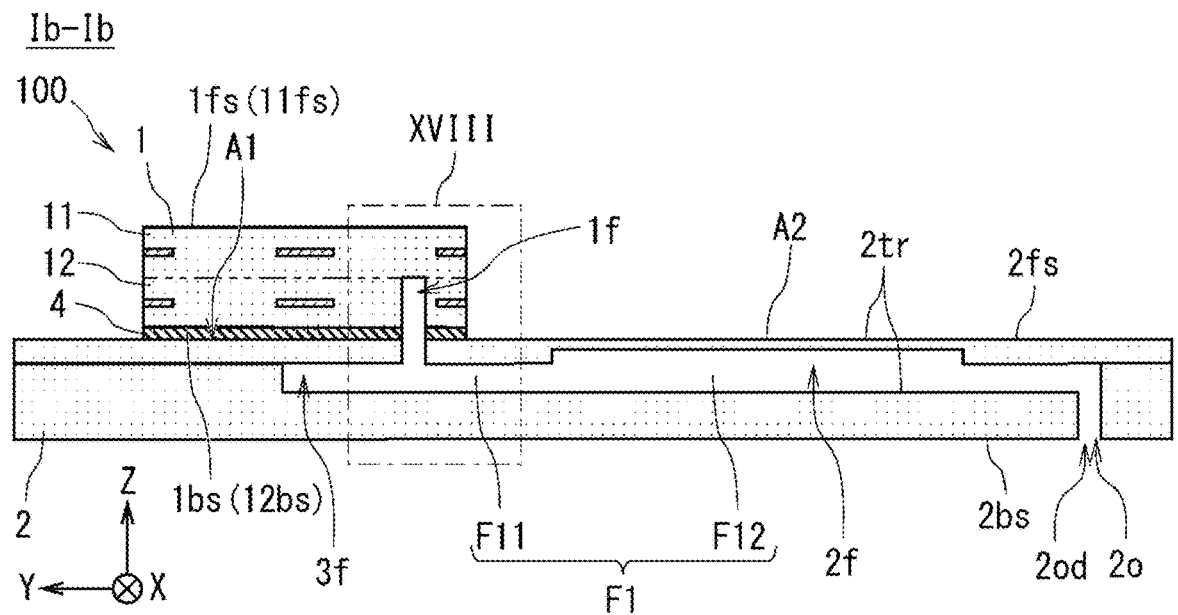
FIG. 1B illustrates an imaginary cross-sectional view of the flow path measuring device taken along line Ib-Ib in FIG. 1A.

As shown in FIGS. 1A and 1B, the flow path measuring device 100 according to the first embodiment includes, for example, the first flow path device 1 and a second flow path device 2.

The first flow path device 1 includes, for example, a small chip (also referred to as a microchip) as a plate. The first flow path device 1 has, for example, a substantially rectangular surface $1fs$ (also referred to as a first upper surface) and a surface $1bs$ (also referred to as a first lower surface) opposite to the first upper surface $1fs$. In the example of FIGS. 1A and 1B, the first upper surface $1fs$ faces in the +Z direction. In other words, the first upper surface $1fs$ has a normal in the +Z direction. The first lower surface $1bs$ faces in the −Z direction. In other words, the first lower surface $1bs$ has a normal in the −Z direction. The first upper surface $1fs$ and the first lower surface $1bs$ may be flat. The first flow path device 1 has a thickness of, for example, about 1 to 5 mm. Each of the first upper surface $1fs$ and the first lower surface $1bs$ of the first flow path device 1 has the shorter side of about 10 to 30 mm and the longer side of about 10 to 50 mm.

The second flow path device 2 includes, for example, a larger plate than the first flow path device 1. The second flow path device 2 has, for example, a substantially rectangular surface $2fs$ (also referred to as a second upper surface) and a surface $2bs$ (also referred to as a second lower surface) opposite to the second upper surface $2fs$. In the example of FIGS. 1A and 1B, the second upper surface $2fs$ faces in the +Z direction. In other words, the second upper surface $2fs$ has a normal in the +Z direction. The second lower surface $2bs$ faces in the −Z direction. In other words, the second lower surface $2bs$ has a normal in the −Z direction. The second upper surface $2fs$ and the second lower surface $2bs$ may be flat. The second flow path device 2 has a thickness of, for example, about 0.5 to 5 mm. Each of the second upper surface $2fs$ and the second lower surface $2bs$ of the second flow path device 2 has the shorter side of about 10 to 30 mm and the longer side of about 20 to 50 mm.

The first flow path device 1 is located on, for example, the second upper surface $2fs$ of the second flow path device 2. In other words, the first lower surface $1bs$ of the first flow path device 1 and the second upper surface $2fs$ of the second flow path device 2 face each other.

1-2. First Flow Path Device

The first flow path device 1 can separate and collect, from other elements, specific microparticles as a specific element contained in a fluid as a sample. The first flow path device 1 includes, for example, a first flow path 1*f*. The first flow path device 1 can separate, in the first flow path 1*f* for example, and collect specific microparticles in the fluid from other elements.

Figure 2A:
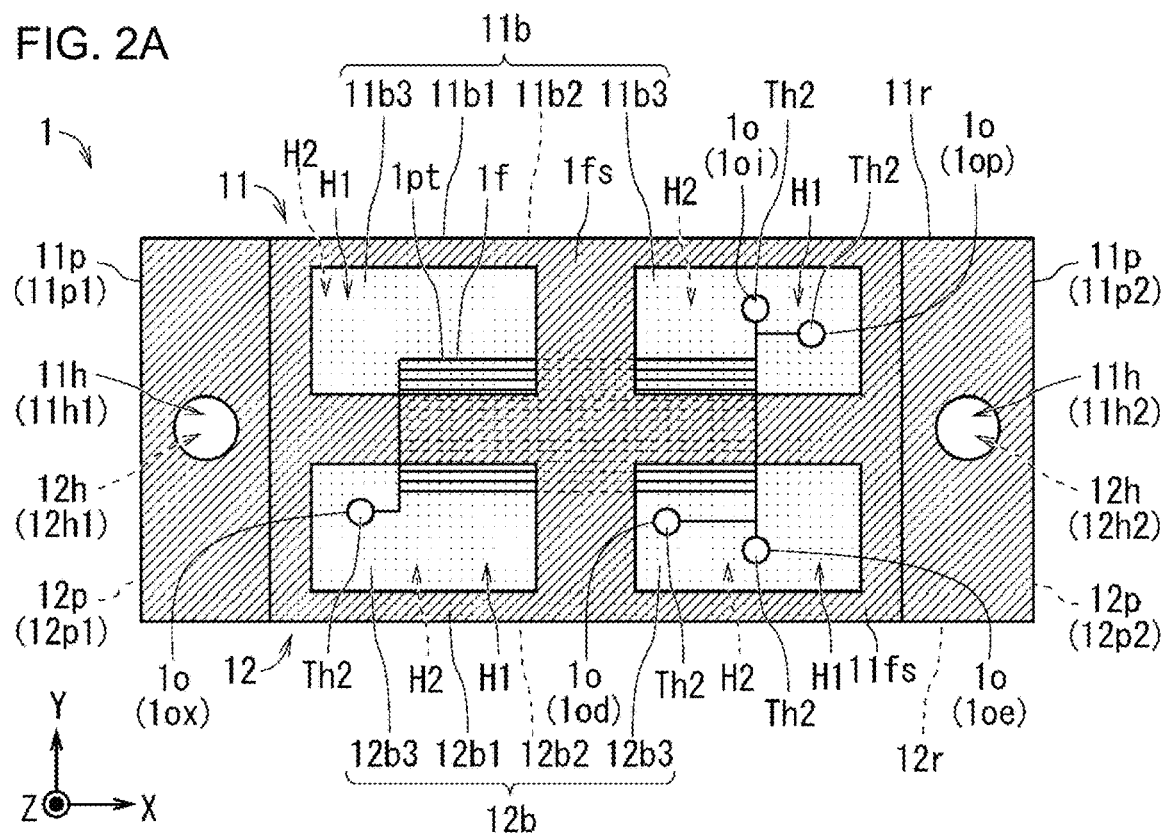
FIG. 2A illustrates a plan view of an example first flow path device according to the first embodiment.
Figure 2B:
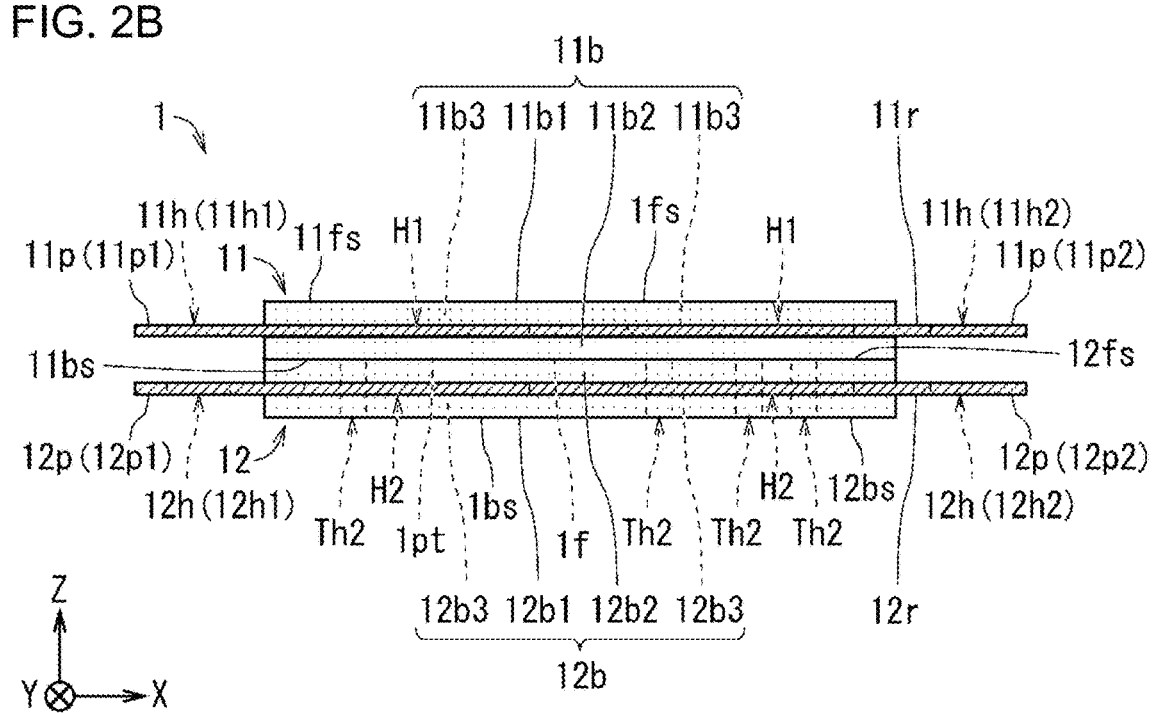
FIG. 2B illustrates a front view of the first flow path device according to the first embodiment.

As shown in FIGS. 2A and 2B, the first flow path device 1 includes, for example, a first portion 11 and a second portion 12. Each of the first portion 11 and the second portion 12 is, for example, a plate and has a thickness of, for example, about 0.5 mm to several millimeters.

The first portion 11 has, for example, a first surface 11*fs* and a second surface 11*bs* opposite to the first surface 11*fs*. In the example of FIGS. 2A and 2B, the first surface 11*fs* faces in the +Z direction. In other words, the first surface 11*fs* has a normal in the +Z direction. The second surface 11*bs* faces in the −Z direction. In other words, the second surface 11*bs* has a normal in the −Z direction. The second portion 12 has, for example, a third surface 12*fs* and a fourth surface 12*bs* opposite to the third surface 12*fs*. In the example of FIGS. 2A and 2B, the third surface 12*fs* faces in the +Z direction. In other words, the third surface 12*fs* has a normal in the +Z direction. The fourth surface 12*bs* faces in the −Z direction. In other words, the fourth surface 12*bs* has a normal in the −Z direction. For example, the second surface 11*bs* of the first portion 11 is joined with the third surface 12*fs* of the second portion 12. In the example of FIGS. 2A and 2B, the second surface 11*bs* and the third surface 12*fs* are flat. The second surface 11*bs* and the third surface 12*fs* may be joined together without an adhesive and by, for example, surface modification of the second surface 11*bs* and the third surface 12*fs*. The surface modification may be performed by, for example, irradiation of oxygen plasma or irradiation of ultraviolet (UV) light using an excimer lamp.

1-2-1. First Portion

The first portion 11 includes, for example, a first body 11*b* and a first reinforcement 11*r*.

The first body 11*b* is formed from a resin. The first body 11*b* may be formed from, for example, a silicone resin such as PDMS or a flexible resin such as polyimide. The first body 11*b* includes, for example, a first outer portion 11*b*1, a first joint 11*b*2, and one or more first connectors 11*b*3 that are integral with one another.

The first outer portion 11*b*1 includes, for example, a first surface 11*fs*. In the example of FIGS. 2A and 2B, the first outer portion 11*b*1 is a plate or a sheet located nearer the first surface 11*fs* than the first reinforcement 11*r*.

The first joint 11*b*2 includes, for example, a second surface 11*bs*. In the example of FIGS. 2A and 2B, the first joint 11*b*2 is a plate or a sheet located nearer the second surface 11*bs* than the first reinforcement 11*r*. The first joint 11*b*2 has, for example, a pattern of grooves 1*pt* (also referred to as a groove pattern) on the second surface 11*bs* defining the first flow path 1*f*. For example, the second surface 11*bs* of the first portion 11 and the third surface 12*fs* of the second portion 12 are joined together to cause the groove pattern 1*pt* and the third surface 12*fs* to define the first flow path 1*f*.

The one or more first connectors 11*b*3 connect the first outer portion 11*b*1 to the first joint 11*b*2. In the example of FIGS. 2A and 2B, the one or more first connectors 11*b*3 are four first connectors 11*b*3. Each first connector 11*b*3 is located in a hole H1 extending through the first reinforcement 11*r* in the thickness direction (+Z direction). In other words, the first connectors 11*b*3 are located in the respective four holes H1 in the first reinforcement 11*r*.

The first reinforcement 11*r* is harder than the first body 11*b*. In other words, for example, the first reinforcement 11*r* has higher rigidity than the first body 11*b*. For example, the material for the first reinforcement 11*r* may be a resin such as poly(methyl methacrylate) (PMMA) or polycarbonate with high rigidity, a metal, or a ceramic. The first reinforcement 11*r* may be, for example, a plate with a plate surface along the XY plane. The first reinforcement 11*r* is, for example, bonded to and sandwiched between the first outer portion 11*b*1 and the first joint 11*b*2. For example, the first reinforcement 11*r* can be bonded to the first outer portion 11*b*1 and the first joint 11*b*2 by resin molding using uncured resin portions to be the first body 11*b* sandwiching the first reinforcement 11*r*.

The first reinforcement 11*r* includes, for example, one or more first protrusions 11*p*. The one or more first protrusions 11*p* protrude from the first body 11*b* along the first surface 11*fs* as viewed in plan toward the first surface 11*fs*. In the example of FIGS. 2A and 2B, the one or more first protrusions 11*p* are two first protrusions 11*p*. More specifically, the one or more first protrusions 11*p* include a first-A protrusion 11*p*1 and a first-B protrusion 11*p*2. The first-A protrusion 11*p*1 protrudes from the first body 11*b* in the −X direction. The first-B protrusion 11*p*2 protrudes from the first body 11*b* in the +X direction.

The one or more first protrusions 11*p* each have, for example, two portions with specific shapes (also referred to as specific-shaped portions) at different positions as viewed from a plan perspective toward the first surface 11*fs*. In other words, the one or more first protrusions 11*p* each have, for example, a portion having a first specific shape (also referred to as a first specific-shaped portion) and a portion having a second specific shape (also referred to as a second specific-shaped portion). In the example of FIGS. 2A and 2B, each specific-shaped portion may be a first through-hole 11*h* extending through in the Z direction and having a circular cross section perpendicular to its longitudinal direction (+Z direction). More specifically, the first-A protrusion 11*p*1 has a first-A through-hole 11*h*1 to serve as the first specific-shaped portion. The first-B protrusion 11*p*2 has a first-B through-hole 11*h*2 to serve as the second specific-shaped portion.

As described above, the first portion 11 includes, for example, the first reinforcement 11*r* extending through the integrally formed resin first body 11*b*. Without the first reinforcement 11*r*, any resin first body 11*b* that is too flexible can bend and deform when lifted with its two ends being held. The first portion 11 in the first embodiment includes the first reinforcement 11*r*. The first body 11*b* thus does not easily bend and deform when the first portion 11 is lifted with its two ends being held. This facilitates, for example, handling of the first portion 11. This facilitates, for example, alignment between the first portion 11 and the second portion 12 in joining the first portion 11 and the second portion 12 together.

1-2-2. Structure of Second Portion

The second portion 12 includes, for example, a second body 12*b* and a second reinforcement 12*r*.

The second body 12*b* is formed from a resin. The second body 12*b* may be formed from, for example, a silicone resin such as PDMS or a flexible resin such as polyimide. The second body 12*b* includes, for example, a second outer portion 12*b*1, a second joint 12*b*2, and one or more second connectors 12*b*3 that are integral with one another.

The second outer portion 12b1 includes, for example, a fourth surface 12bs. In the example of FIGS. 2A and 2B, the second outer portion 12b1 is a plate or a sheet located nearer the fourth surface 12bs than the second reinforcement 12r.

The second joint 12b2 includes, for example, a third surface 12fs. In the example of FIGS. 2A and 2B, the second joint 12b2 is a plate or a sheet located nearer the third surface 12fs than the second reinforcement 12r.

The one or more second connectors 12b3 connect the second outer portion 12b1 to the second joint 12b2. In the example of FIGS. 2A and 2B, the one or more second connectors 12b3 are four second connectors 12b3. Each second connector 12b3 is in a hole H2 extending through the second reinforcement 12r in the thickness direction (+Z direction). In other words, the second connectors 12b3 are located in the respective four holes H2 in the second reinforcement 12r.

The second body 12b has, for example, multiple through-holes Th2 extending from the third surface 12fs to the fourth surface 12bs. Each of the through-holes Th2 has a diameter of, for example, about 2 mm. The through-holes Th2 connect to, for example, the first flow path 1f. This allows passage of fluid between the first flow path 1f in the first flow path device 1 and a device external to the first flow path device 1, such as the second flow path device 2.

The second reinforcement 12r is harder than the second body 12b. In other words, for example, the second reinforcement 12r has higher rigidity than the second body 12b. For example, the material for the second reinforcement 12r may be a resin such as PMMA or polycarbonate with high rigidity, a metal, or a ceramic. The second reinforcement 12r may be, for example, a plate with a plate surface along the XY plane. The second reinforcement 12r is, for example, bonded to and sandwiched between the second outer portion 12b1 and the second joint 12b2. For example, the second reinforcement 12r can be bonded to the second outer portion 12b1 and the second joint 12b2 by resin molding using uncured resin portions to be the second body 12b sandwiching the second reinforcement 12r.

The second reinforcement 12r includes, for example, one or more second protrusions 12p. The one or more second protrusions 12p protrude, for example, from the second body 12b along the fourth surface 12bs as viewed in plan toward the fourth surface 12bs. In the example of FIGS. 2A and 2B, the one or more second protrusions 12p are two second protrusions 12p. More specifically, the one or more second protrusions 12p include a second-A protrusion 12p1 and a second-B protrusion 12p2. The second-A protrusion 12p1 protrudes from the second body 12b in the −X direction. The second-B protrusion 12p2 protrudes from the second body 12b in the +X direction.

The one or more second protrusions 12p each have, for example, two portions with specific shapes (specific-shaped portions) at different positions as viewed from a plan perspective toward the fourth surface 12bs. In other words, the one or more second protrusions 12p each have, for example, a portion having a third specific shape (also referred to as a third specific-shaped portion) and a portion having a fourth specific shape (also referred to as a fourth specific-shaped portion). In the example of FIGS. 2A and 2B, each specific-shaped portion may be a second through-hole 12h extending through in the Z direction and having a circular cross section perpendicular to its longitudinal direction (+Z direction). More specifically, the second-A protrusion 12p1 has a second-A through-hole 12h1 as the third specific-shaped portion. The second-B protrusion 12p2 has a second-B through-hole 12h2 as the fourth specific-shaped portion.

As described above, the second portion 12 includes, for example, the second reinforcement 12r extending through the integrally formed resin second body 12b. Without the second reinforcement 12r, any resin second body 12b that is too flexible can bend and deform when lifted with its two ends being held. The second portion 12 in the first embodiment includes the second reinforcement 12r. The second body 12b thus does not easily bend and deform when the second portion 12 is lifted with its two ends being held. This facilitates, for example, handling of the second portion 12. This facilitates, for example, alignment between the first portion 11 and the second portion 12 in joining the first portion 11 and the second portion 12 together. The first flow path device 1 can be manufactured easily.

When, for example, the first portion 11 and the second portion 12 are stacked on each other and joined together, the first-A through-hole 11h1 as the first specific-shaped portion and the first-B through-hole 11h2 as the second specific-shaped portion can be used to determine the orientation and the position of the first portion 11. For example, the second-A through-hole 12h1 as the third specific-shaped portion and the second-B through-hole 12h2 as the fourth specific-shaped portion can be used to determine the orientation and the position of the second portion 12. This facilitates, for example, alignment between the first portion 11 and the second portion 12. The first flow path device 1 can thus be manufactured accurately and easily.

1-2-3. First Flow Path

Figure 3A:
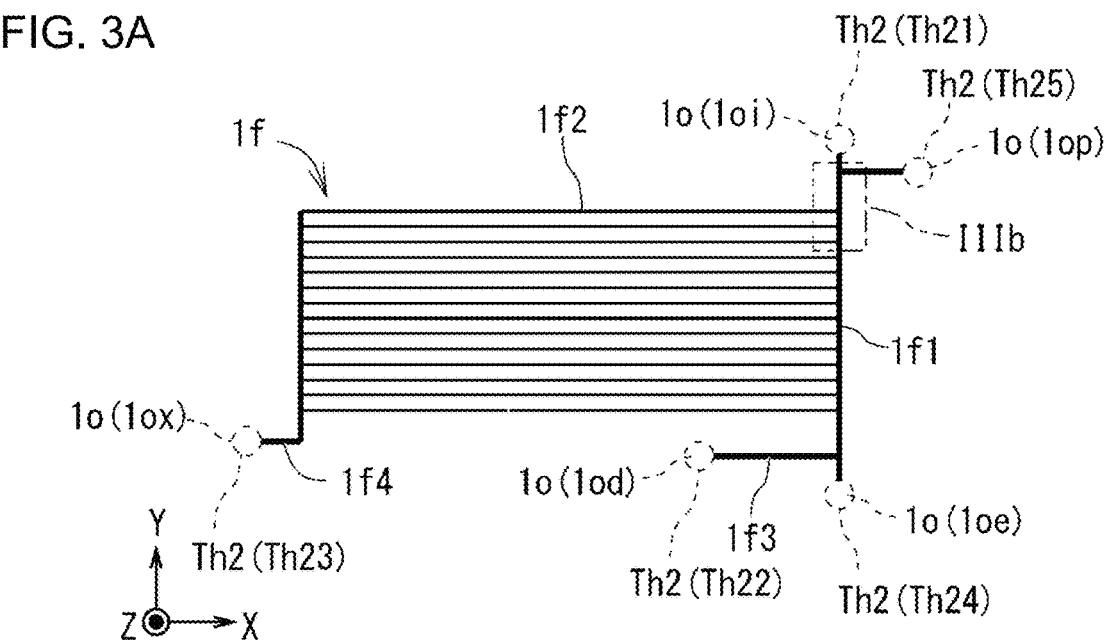
FIG. 3A illustrates a plan view of an example first flow path.

As shown in FIG. 3A, the first flow path 1f includes, for example, a main flow path 1f1 and multiple branch flow paths 1f2. The branch flow paths 1f2 branch from the main flow path 1f1. The first flow path device 1 may have a fluid flowing into the main flow path 1f1. In this example, the fluid contains specific microparticles (also referred to as first particles) and microparticles (also referred to as second particles) different from the specific microparticles (first particles). In this structure, for example, the second particles flow from the main flow path 1f1 into the branch flow paths 1f2. This allows separation of the first particles from the second particles. In other words, the first flow path device 1 can separate, for example, the second particles from the first particles. The branch flow paths 1f2 are, for example, designed to receive the second particles from the main flow path 1f1, but may receive particles different from the first particles or from the second particles.

Figure 3B:
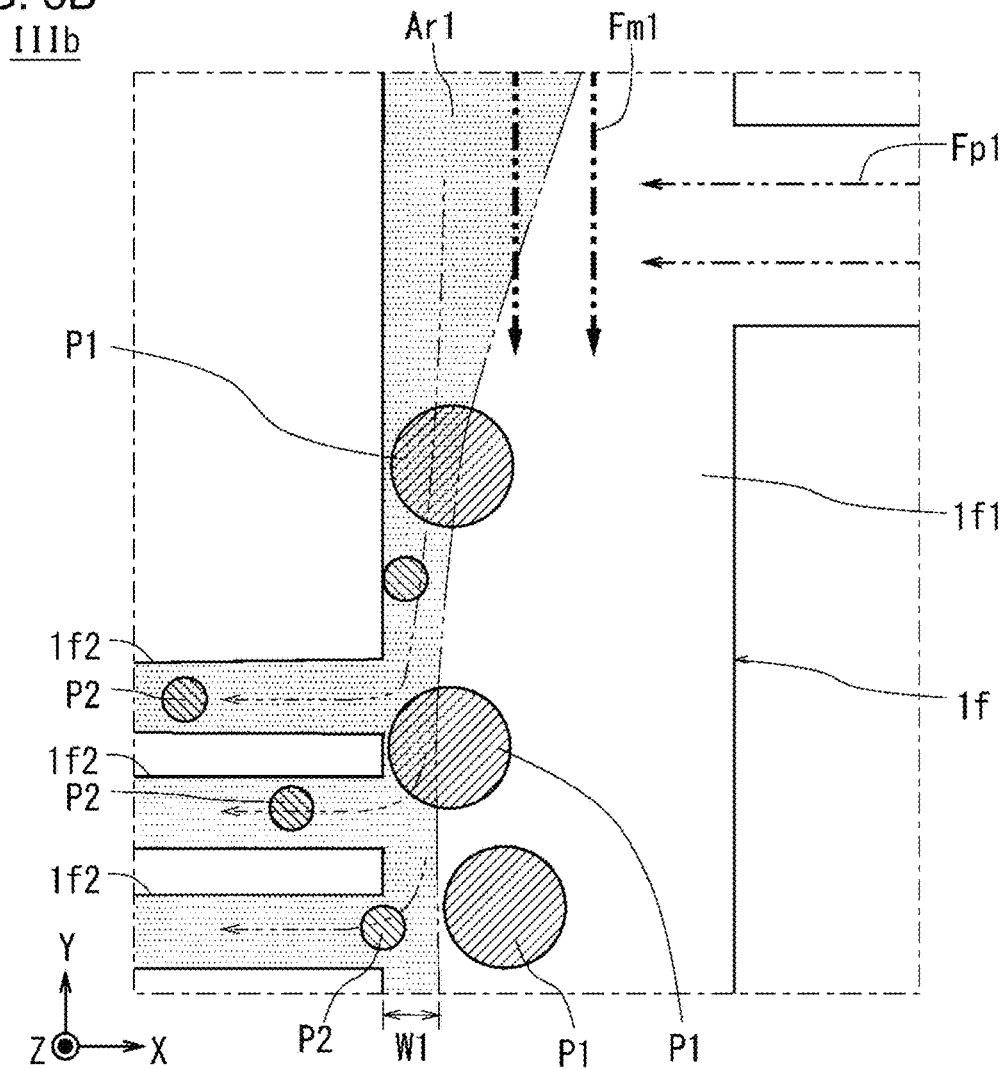
FIG. 3B illustrates an enlarged plan view of the first flow path showing area IIIb in FIG. 3A.

FIG. 3B schematically shows the first particles and the second particles being separated in the first flow path 1f. In FIG. 3B, the larger circles indicate first particles P1, and the smaller circles indicate second particles P2. The arrows Fm1 drawn with thick two-dot chain lines in the −Y direction indicate the direction of the main flow of fluid (also referred to as a main flow) in the main flow path 1f1. The arrows Fp1 drawn with two-dot chain lines in the −X direction indicate the direction of a sample-directing flow described below. The hatched area Ar1 with a dot pattern in the first flow path 1f indicates a sample-drawing flow described below.

In the first embodiment, the first flow path 1f includes, for example, a main flow path 1f1 and multiple branch flow paths 1f2. The branch flow paths 1f2 connect to the main flow path 1f1 and branch from the main flow path 1f1 in the −X direction. The sample-drawing flow can be generated from the main flow path 1f1 to each of the branch flow paths 1f2 by adjusting, for example, the cross-sectional areas and the lengths of the main flow path 1f1 and the branch flow paths 1f2 and the flow velocity of the sample (fluid). For example, the first flow path 1f generates the sample-directing flow that can direct the sample (fluid) flowing in the main flow path 1f1 toward each branch flow path 1f2. For example, as shown in FIG. 3B, the sample-drawing flow has, near a branch portion of the main flow path 1f1 to each branch flow path 1f2, a width W1 that causes an area Ar1 of the sample-drawing flow not to include the center of gravity of each first particle P1 and to include the center of gravity of each second particle P2. The sample-drawing flow thus draws the second particles P2 from the main flow path 1f1 into each branch flow path 1f2. The branch flow paths 1f2 may have a width smaller than the diameter of each first particle P1 flowing in the sample and larger than the diameter of each second particle P2. This causes the second particles P2 to be drawn into the branch flow paths 1f2 from the main flow path 1f1 without the first particles P1 being drawn into the branch flow paths 1f2.

For example, the sample is blood, the first particles P1 are white blood cells, and the second particles P2 are red blood cells. A red blood cell has the center of gravity at, for example, about 2 to 2.5 μm from its outer edge. A red blood cell has a maximum diameter of, for example, about 6 to 8 μm. A white blood cell has the center of gravity at, for example, about 5 to 10 μm from its outer edge. A white blood cell has a maximum diameter of, for example, about 10 to 30 μm. In this case, the main flow path 1f1 may have an imaginary cross-sectional area of, for example, about 300 to 1000 μm$^2$ along the XZ plane, and have a length of, for example, about 0.5 to 20 mm in the Y direction. Each branch flow path 1f2 may have an imaginary cross-sectional area of, for example, about 100 to 500 μm$^2$ along the YZ plane, and have a length of, for example, about 3 to 25 mm in the X direction. The flow velocity in the first flow path 1f may then be set to, for example, 0.2 to 5 m/s to set the width W1 of the sample-drawing flow to about 2 to 15 μm. This allows separation of, for example, red blood cells and white blood cells in the blood in the first flow path 1f.

The first flow path 1f further includes, for example, a collection flow path 1f3. The collection flow path 1f3 connects to, for example, a downstream portion of the main flow path 1f1. The collection flow path 1f3 can collect the first particles P1 flowing in the main flow path 1f1. In the first flow path 1f in the first embodiment, the first particles P1 separated in the main flow path 1f1 can flow from the main flow path 1f1 into the collection flow path 1f3. The collection flow path 1f3 can thus collect the first particles P1.

The first flow path 1f may further include, for example, a discharge flow path 1f4. The discharge flow path 1f4 may connect to, for example, the branch flow paths 1f2. The discharge flow path 1f4 may receive the second particles P2 from the branch flow paths 1f2 to either collect or discard the second particles P2. For example, the discharge flow path 1f4 collecting the second particles P2 functions as a flow path for collecting the second particles P2. The fluid reaching the downstream end of the main flow path 1f1 may be, for example, discarded.

In the first embodiment, as shown in FIGS. 2A to 3A, the first flow path 1f connects to multiple first openings 1o in the first lower surface 1bs through, for example, the multiple through-holes Th2 in the second portion 12. In other words, each through-hole Th2 includes the corresponding first opening 1o in the fourth surface 12bs.

The multiple first openings 1o may include, for example, a first inlet 1oi, a first outlet 1od, a first discharge port 1ox, and a second discharge port 1oe. The first inlet 1oi can receive, for example, inflow of the sample, which then flows into the main flow path 1f1 through a first through-hole Th2 (also referred to as a first through-hole Th21). The first outlet 1od can collect, for example, the first particles P1 flowing from the collection flow path 1f3 through a second through-hole Th2 (also referred to as a second through-hole Th22). The first discharge port 1ox can discharge, for example, the second particles P2 separated from the sample and flowing through the discharge flow path 1f4 and a third through-hole Th2 (third through-hole Th23). The fluid discharged through the first discharge port 1ox can be discarded or collected through, for example, a through-hole 2th of the second flow path device 2. The second discharge port 1oe can discharge, for example, elements in the sample from which the first particles P1 and the second particles P2 are removed. The elements flow from the downstream end of the main flow path 1f1 through a fourth through-hole Th2 (also referred to as a fourth through-hole Th24). The fluid discharged through the second discharge port 1oe can be discarded or collected through, for example, the through-hole 2th of the second flow path device 2. In the first embodiment, the multiple first openings 1o further include, for example, a first sample-directing inlet 1op. The first sample-directing inlet 1op can receive, for example, inflow of fluid that creates a sample-directing flow to direct the sample toward the branch flow paths 1f2 of the main flow path 1f1 and cause a fluid that creates a sample-directing flow to flow into the main flow path 1f1 through a fifth through-hole Th2 (also referred to as a fifth through-hole Th25).

1-3. Method for Manufacturing First Flow Path Device

Figure 4:
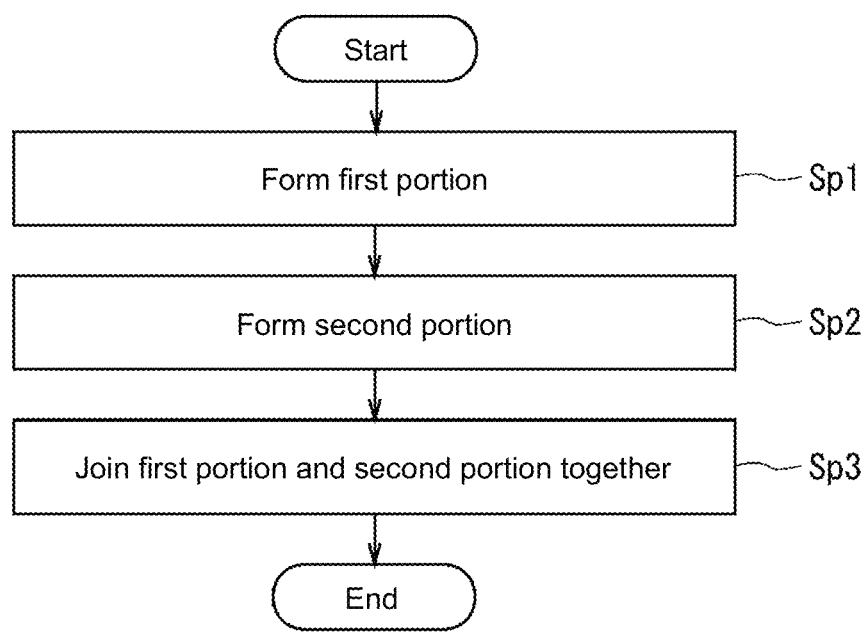
FIG. 4 illustrates a flowchart of an example method for manufacturing the first flow path device according to the first embodiment.

An example method for manufacturing the first flow path device 1 will now be described with reference to FIGS. 4 to 17C. The manufacturing method for the first flow path device 1 includes, for example, a first process in step Sp1, a second process in step Sp2, and a third process in step Sp3 that are performed in the stated order as shown in FIG. 4. The first process in step Sp1 and the second process in step Sp2 may be performed in the reversed order.

First Process (Step Sp1)

In the first process in step Sp1, the first portion 11 described above is formed by resin molding.

An example process for forming the first portion 11 by resin molding will now be described.

Figure 5A:
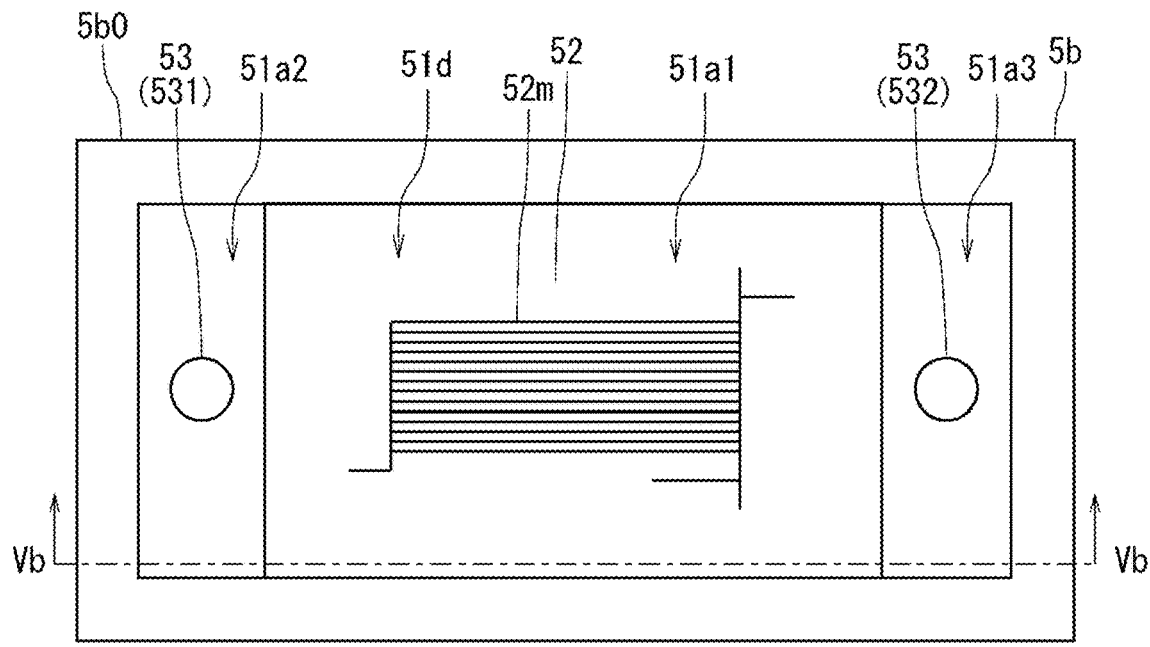
FIG. 5A illustrates a plan view of an example first lower mold used for manufacturing a first portion of the first flow path device according to the first embodiment.
Figure 5B:
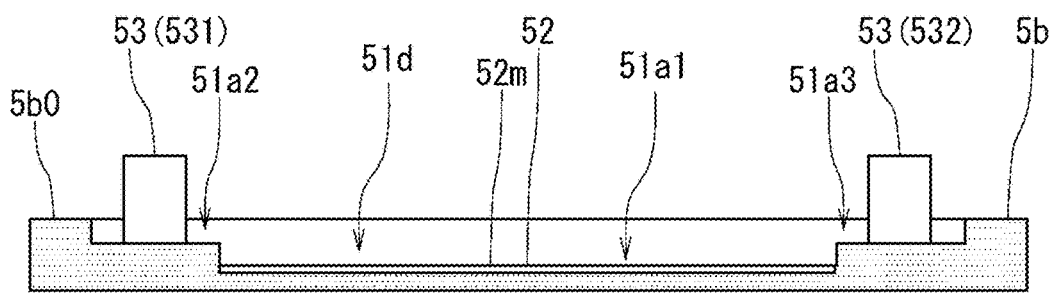
FIG. 5B illustrates an imaginary cross-sectional view of the first lower mold taken along line Vb-Vb in FIG. 5A.

As shown in, for example, FIGS. 5A and 5B, a first lower mold 5b used for resin molding of the first portion 11 is prepared. The first lower mold 5b includes, for example, a substantially rectangular first lower mold body 5b0 with an upper first recess 51d. The first recess 51d includes, for example, a first-A area 51a1, a first-B area 51a2, and a first-C area 51a3. The first-A area 51a1 has, for example, the shape corresponding to the outline of the first joint 11b2. The first-B area 51a2 has, for example, the shape corresponding to the outline of the first-A protrusion 11p1. The first-C area 51a3 has, for example, the shape corresponding to the outline of the first-B protrusion 11p2. In the first recess 51d, for example, the first-A area 51a1 is deeper than the first-B area 51a2 and the first-C area 51a3. The first-B area 51a2 and the first-C area 51a3 have substantially the same depth. The first-A area 51a1 has, for example, a micro mold 52 at the bottom. The micro mold 52 includes, for example, a substrate and a fine irregularity portion 52m on the substrate. The substrate may be, for example, a silicon substrate. The fine irregularity portion 52m may be in correspondence with the groove pattern 1pt defining the first flow path 1f. The micro mold 52 includes, for example, the silicon substrate and the fine irregularity portion 52m on the silicon substrate. The fine irregularity portion 52m may be formed with, for example, a resist referred to as SU-8. A first pin 53, which protrudes, for example, upward (+Z direction), is located at the bottom of each of the first-B area 51a2 and the first-C area 51a3. More specifically, a first-A pin 531, which protrudes upward (+Z direction), is at the bottom of the first-B area 51a2. A first-B pin 532, which protrudes upward (+Z direction), is at the bottom of the first-C area 51a3. The first pin 53 has, for example, the shape to fit in the first through-hole 11h in the first reinforcement 11r. More specifically, the first-A pin 531 has, for example, the shape to fit in the first-A through-hole 11h1 in the first reinforcement 11r. The first-B pin 532 has, for example, the shape to fit in the first-B through-hole 11h2 in the first reinforcement 11r.

Figure 6A:
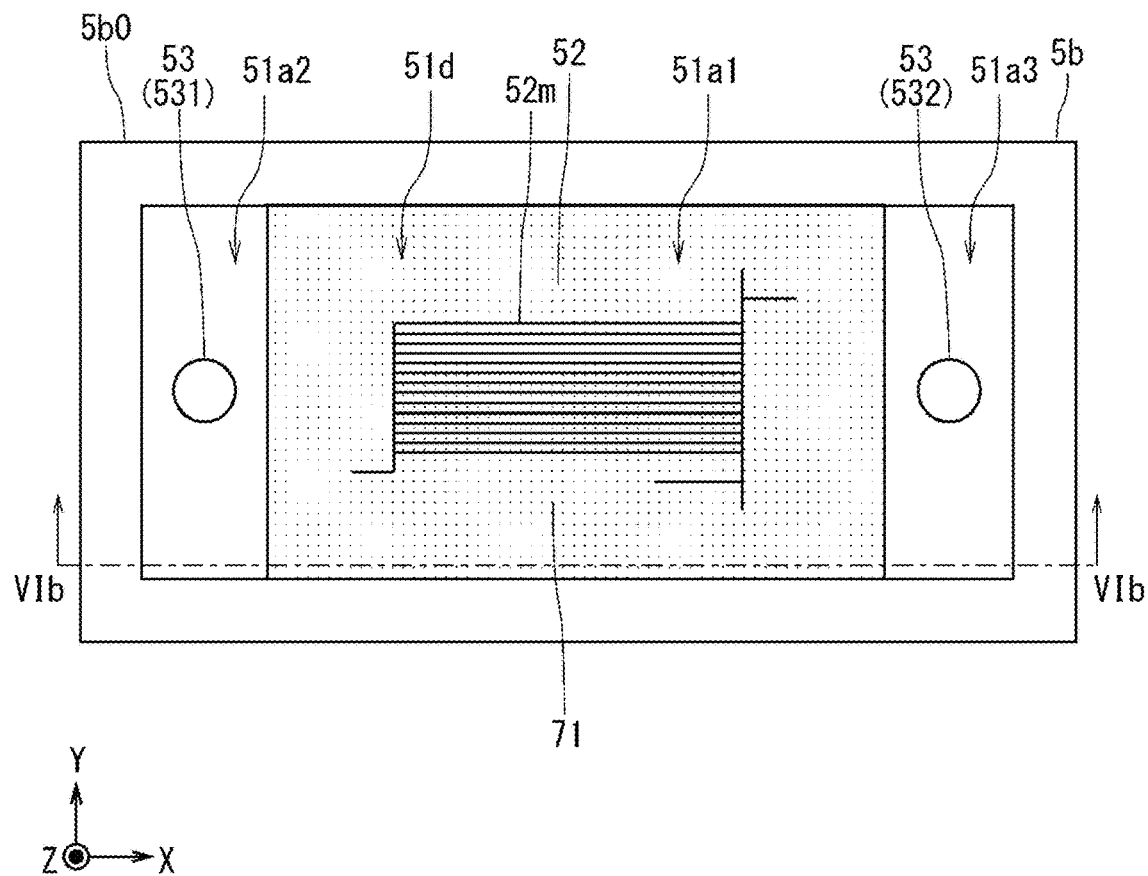
FIG. 6A illustrates a plan view of the device during manufacture of the first portion.
Figure 6B:
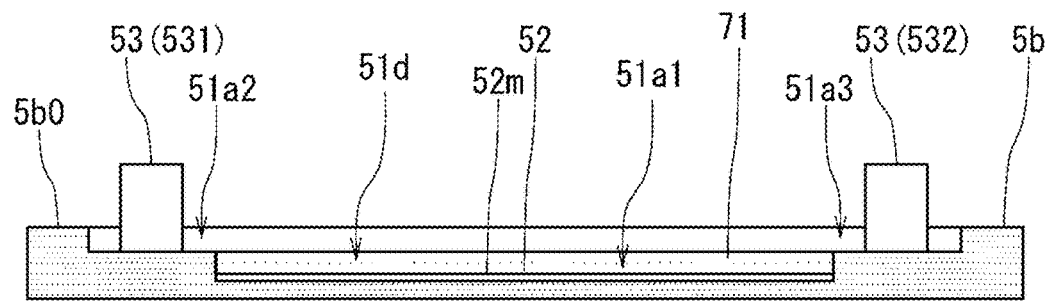
FIG. 6B illustrates an imaginary cross-sectional view of the device taken along line VIb-VIb in FIG. 6A during manufacture of the first portion.

As shown in FIGS. 6A and 6B, a first resin 71 that is uncured liquid is placed in the first-A area 51a1. For example, the first resin 71 may be a thermosetting resin containing a main agent and a hardener mixed together.

Figure 7A:
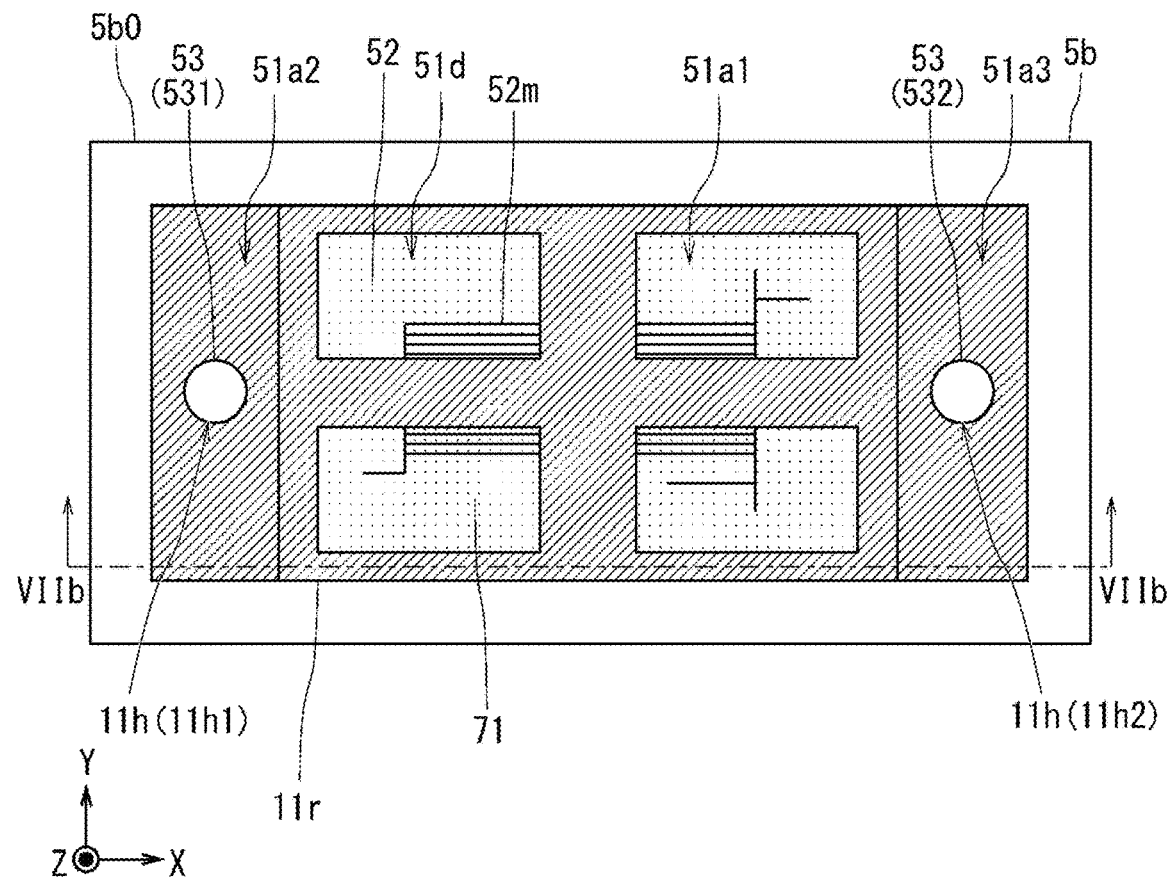
FIG. 7A illustrates a plan view of the device during manufacture of the first portion.
Figure 7B:
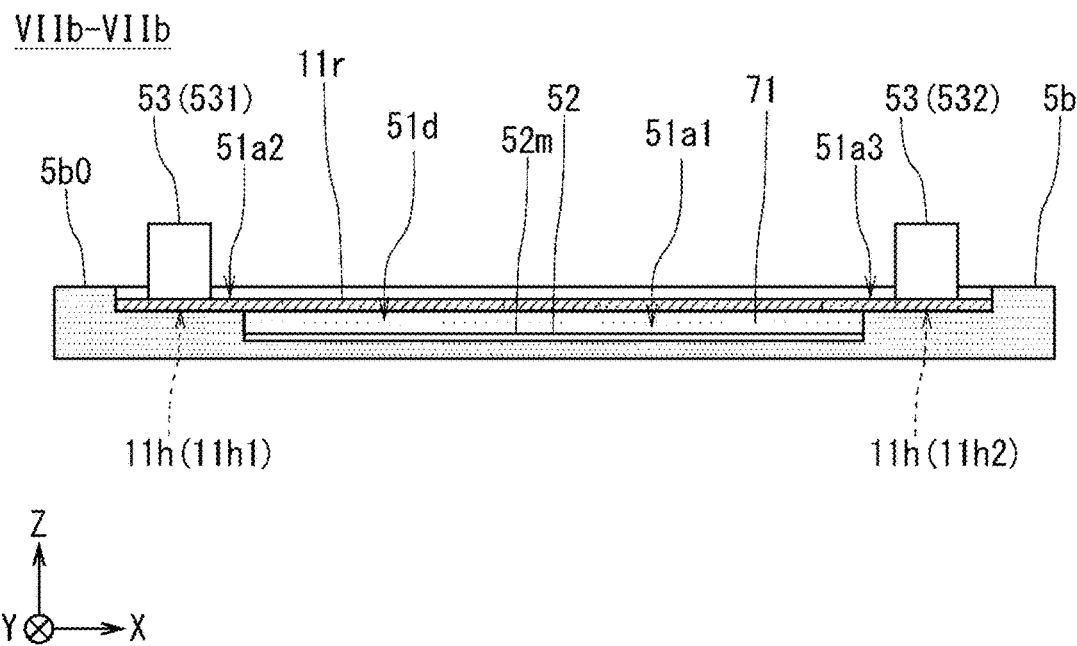
FIG. 7B illustrates an imaginary cross-sectional view of the device taken along line VIIb-VIIb in FIG. 7A during manufacture of the first portion.

As shown in, for example, FIGS. 7A and 7B, the first reinforcement 11r is then placed between the first-B area 51a2 and the first-C area 51a3 to bridge these areas. The first-A pin 531 is fitted in the first-A through-hole 11h1, and the first-B pin 532 is fitted in the first-B through-hole 11h2.

Figure 8A:
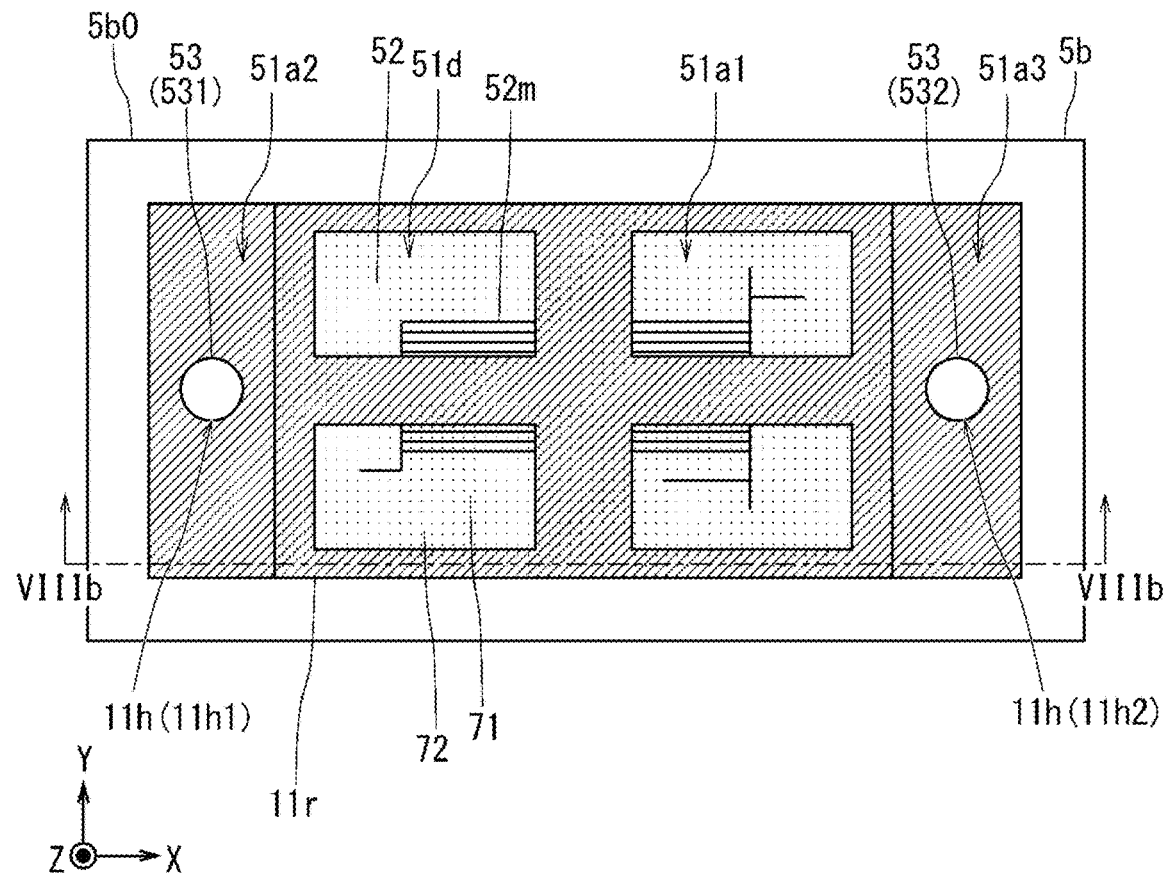
FIG. 8A illustrates a plan view of the device during manufacture of the first portion.
Figure 8B:
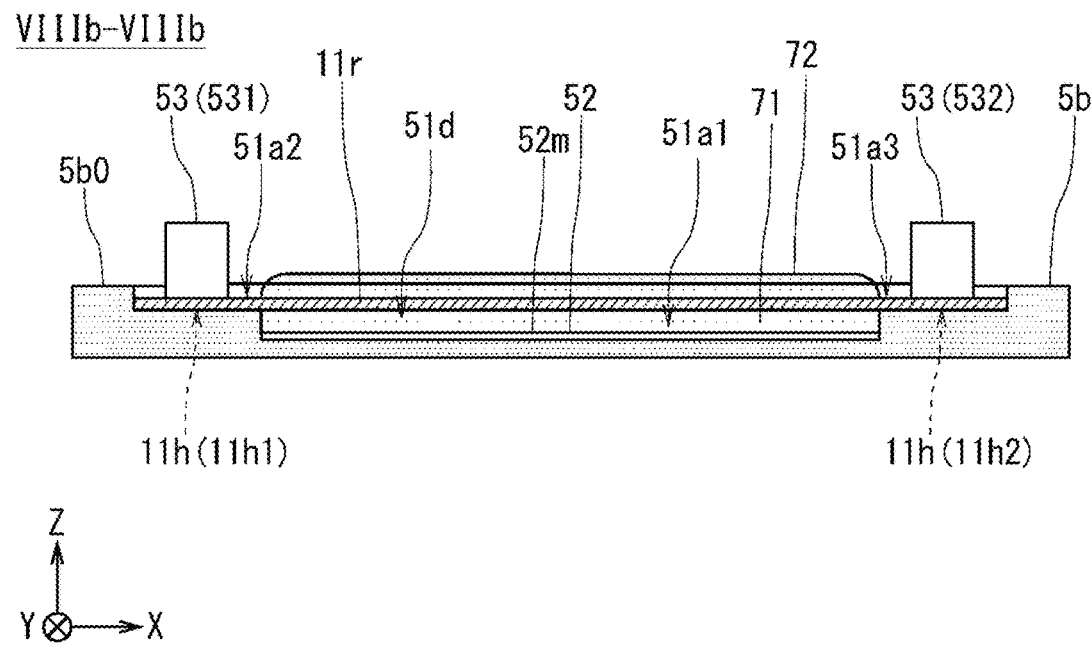
FIG. 8B illustrates an imaginary cross-sectional view of the device taken along line VIIIb-VIIIb in FIG. 8A during manufacture of the first portion.

As shown in FIGS. 8A and 8B, a second resin 72 that is uncured liquid is placed in the first-A area 51a1 on the first reinforcement 11r. For example, the second resin 72 may be a thermosetting resin containing a main agent and a hardener mixed together. The first resin 71 and the second resin 72 may be, for example, the same resin. The first resin 71 and the second resin 72 may be, for example, different resins.

Figure 9A:
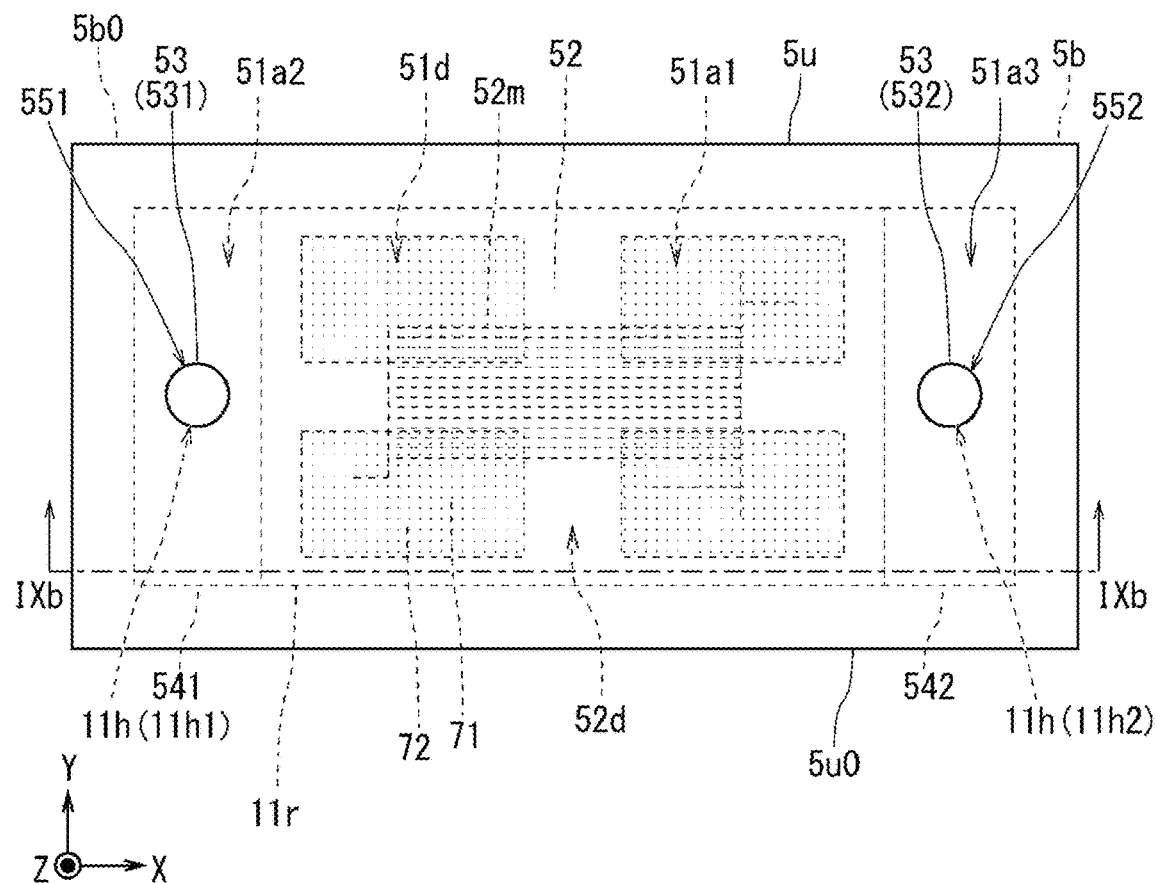
FIG. 9A illustrates a plan view of the device during manufacture of the first portion.
Figure 9B:
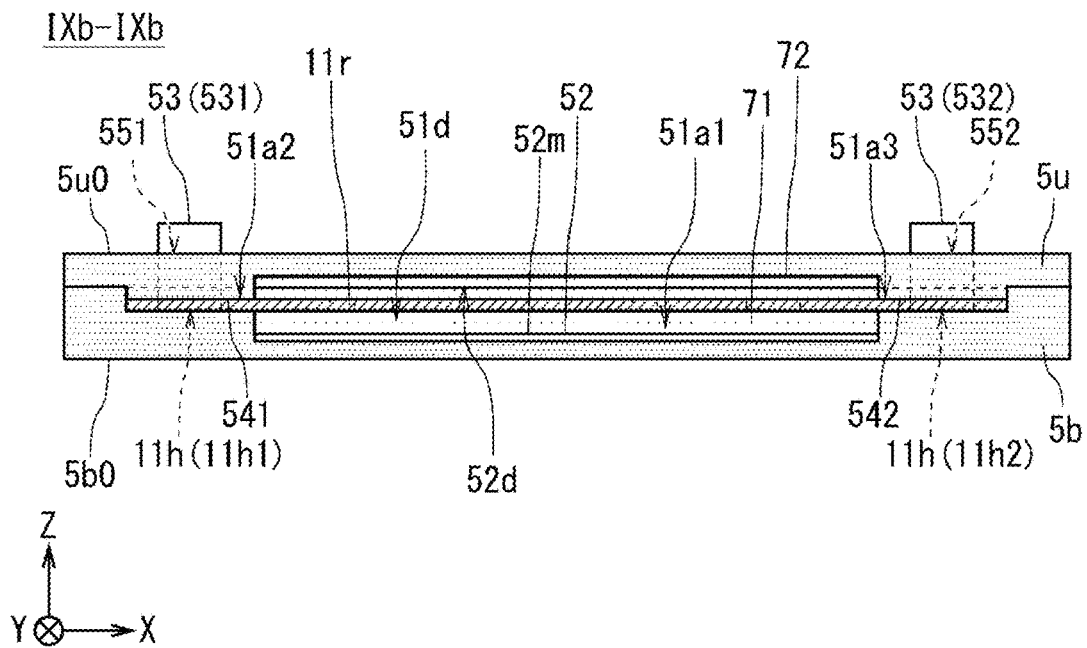
FIG. 9B illustrates an imaginary cross-sectional view of the device taken along line IXb-IXb in FIG. 9A during manufacture of the first portion.

As shown in, for example, FIGS. 9A and 9B, a first upper mold 5u used for resin molding of the first portion 11 is placed to cover the first reinforcement 11r and the second resin 72. The first upper mold 5u has a second recess 52d, a first extension 541, a second extension 542, a first hole 551, and a second hole 552. The second recess 52d is on the bottom of a substantially rectangular first upper mold body 5u0 of the first upper mold 5u. The second recess 52d has the shape corresponding to the outline of the first outer portion 11b1. The first extension 541 and the second extension 542 are both on the bottom of the first upper mold body 5u0 and extend downward (−Z direction). The first extension 541 has the shape corresponding to the outline of the upper surface of the first-A protrusion 11p1. The second extension 542 has the shape corresponding to the outline of the upper surface of the first-B protrusion 11p2. The first hole 551 is a through-hole extending upward (+Z direction) from the lower surface of the first extension 541 to the upper surface of the first upper mold 5u. The second hole 552 is a through-hole extending upward (+Z direction) from the lower surface of the second extension 542 to the upper surface of the first upper mold 5u. The second recess 52d is filled with the second resin 72. With the first-A pin 531 fitted in the first hole 551, the first extension 541 is in contact with the upper surface of the first reinforcement 11r. With the first-B pin 532 fitted in the second hole 552, the second extension 542 is in contact with the upper surface of the first reinforcement 11r.

In the state shown in FIGS. 9A and 9B, for example, the first resin 71 and the second resin 72 are cured by heating in a heating furnace (oven). The heating temperature is, for example, in a range of about 80 to 100° C. The heating time is, for example, about 30 minutes.

Figure 10A:
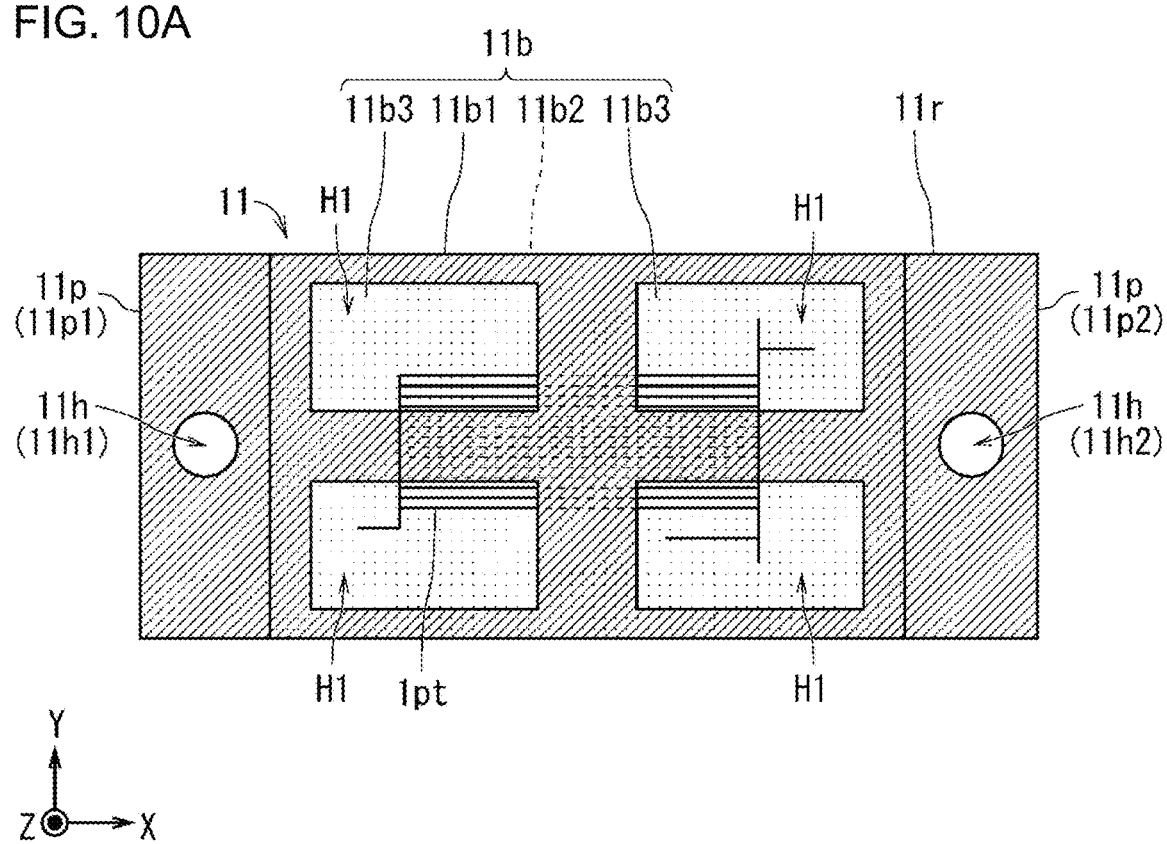
FIG. 10A illustrates a plan view of an example first portion according to the first embodiment.
Figure 10B:
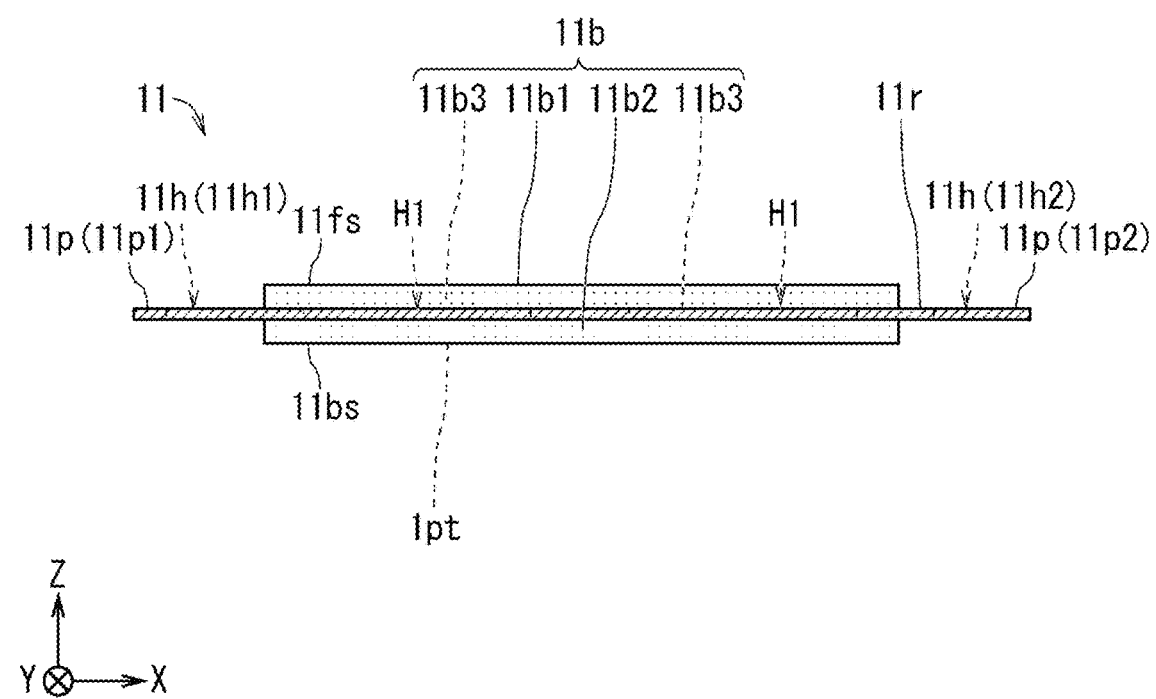
FIG. 10B illustrates a front view of the first portion according to the first embodiment.

The first lower mold 5b and the first upper mold 5u are then removed to form the first portion 11 with the first surface 11fs and the second surface 11bs as shown in FIGS. 10A and 10B. In other words, the first process in step Sp1 is performed to form, for example, the first portion 11 by resin molding to have the first body 11b formed from a resin and the first reinforcement 11r that is harder than the first body 11b. For example, the first body 11b may include the first outer portion 11b1 with the first surface 11fs, the first joint 11b2 with the second surface 11bs, and the one or more first connectors 11b3 that connect the first outer portion 11b1 and the first joint 11b2 together. The first outer portion 11b1, the first joint 11b2, and the first connectors 11b3 are integral with one another. For example, the first joint 11b2 has the groove pattern 1pt on the second surface 11bs. The first reinforcement 11r is, for example, bonded to and sandwiched between the first outer portion 11b1 and the first joint 11b2. The first reinforcement 11r includes, for example, one or more first protrusions 11p protruding from the first body 11b along the first surface 11fs as viewed in plan toward the first surface 11fs. The one or more first protrusions 11p include, for example, the first-A through-hole 11h1 as the first specific-shaped portion and the first-B through-hole 11h2 as the second specific-shaped portion at different positions from each other when viewed from a plan perspective toward the first surface 11fs.

Second Process (Step Sp2)

In the second process in step Sp2, the second portion 12 described above is formed by resin molding.

An example process for forming the second portion 12 by resin molding will now be described.

Figure 11A:
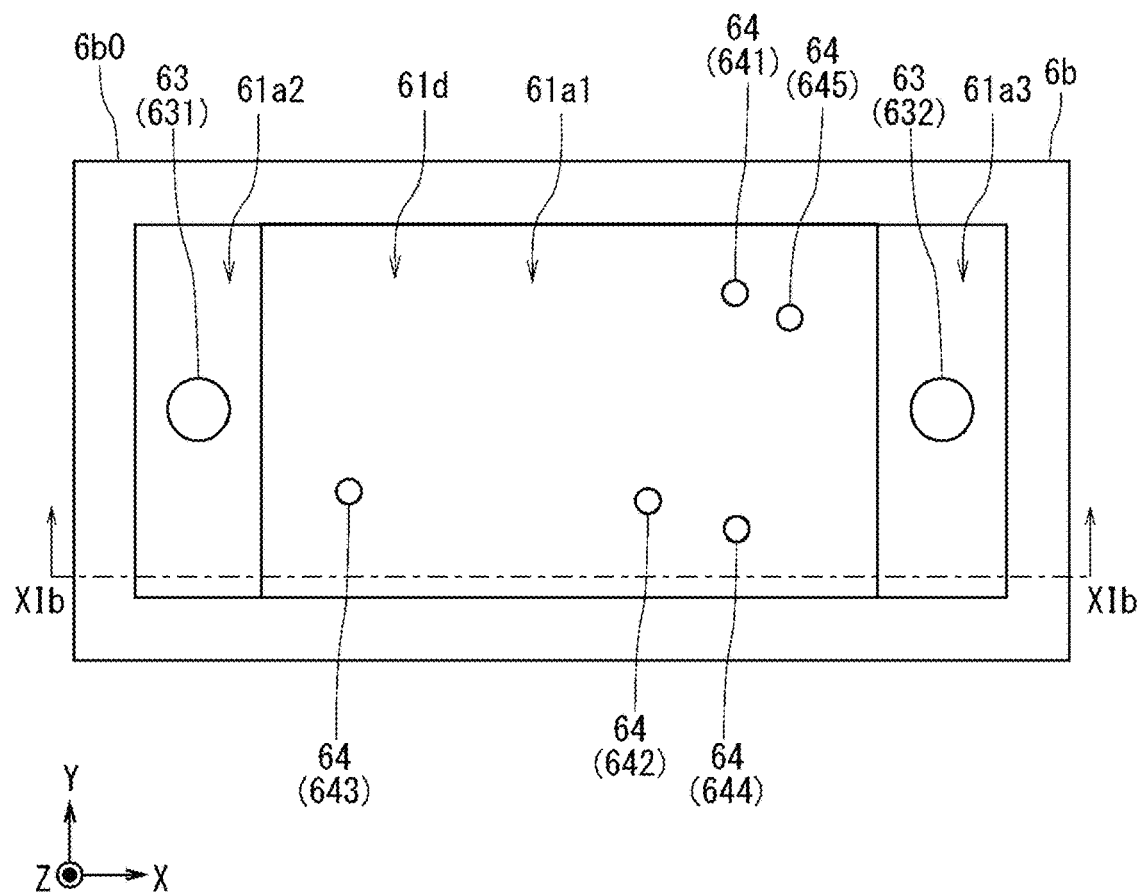
FIG. 11A illustrates a plan view of an example second lower mold used for manufacturing a second portion of the first flow path device.
Figure 11B:
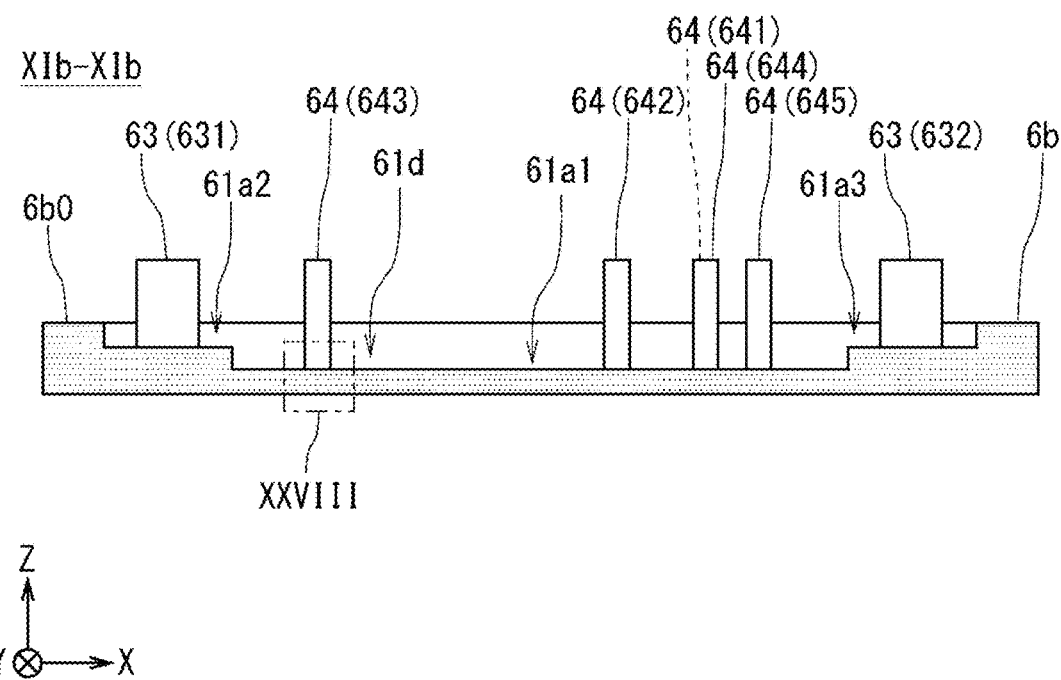
FIG. 11B illustrates an imaginary cross-sectional view of the second lower mold taken along line XIb-XIb in FIG. 11A.

As shown in, for example, FIGS. 11A and 11B, a second lower mold 6b used for resin molding of the second portion 12 is prepared. The second lower mold 6b includes, for example, a substantially rectangular second lower mold body 6b0 with an upper third recess 61d. The third recess 61d includes, for example, a third-A area 61a1, a third-B area 61a2, and a third-C area 61a3. The third-A area 61a1 has, for example, the shape corresponding to the outline of the second outer portion 12b1. The third-B area 61a2 has, for example, the shape corresponding to the outline of the second-A protrusion 12p1. The third-C area 61a3 has, for example, the shape corresponding to the outline of the second-B protrusion 12p2. In the third recess 61d, for example, the third-A area 61a1 is deeper than the third-B area 61a2 and the third-C area 61a3. The third-B area 61a2 and the third-C area 61a3 have substantially the same depth. Multiple second pins 64, which protrude upward (+Z direction), are at the bottom of the third-A area 61a1. The multiple second pins 64 are at, for example, the positions corresponding to the multiple through-holes Th2 in the second body 12b of the second portion 12. The multiple second pins 64 include, for example, a second-A pin 641, a second-B pin 642, a second-C pin 643, a second-D pin 644, and a second-E pin 645. The second-A pin 641 is, for example, shaped to correspond to the shape and position of the first through-hole Th21. The second-B pin 642 is, for example, shaped to correspond to the shape and position of the second through-hole Th22. The second-C pin 643 is, for example, shaped to correspond to the shape and position of the third through-hole Th23. The second-D pin 644 is, for example, shaped to correspond to the shape and position of the fourth through-hole Th24. The second-E pin 645 is, for example, shaped to correspond to the shape and position of the fifth through-hole Th25. A third pin 63, which protrudes, for example, upward (+Z direction), is located at the bottom of each of the third-B area 61a2 and the third-C area 61a3.

More specifically, a third-A pin 631, which protrudes upward (+Z direction), is at the bottom of the third-B area 61$a$2. A third-B pin 632, which protrudes upward (+Z direction), is at the bottom of the third-C area 61$a$3. The third pin 63 has, for example, the shape to fit in the second through-hole 12$h$ in the second reinforcement 12$r$. More specifically, the third-A pin 631 has, for example, the shape to fit in the second-A through-hole 12$h$1 in the second reinforcement 12$r$. The third-B pin 632 has, for example, the shape to fit in the second-B through-hole 12$h$2 in the second reinforcement 12$r$.

Figure 12A:
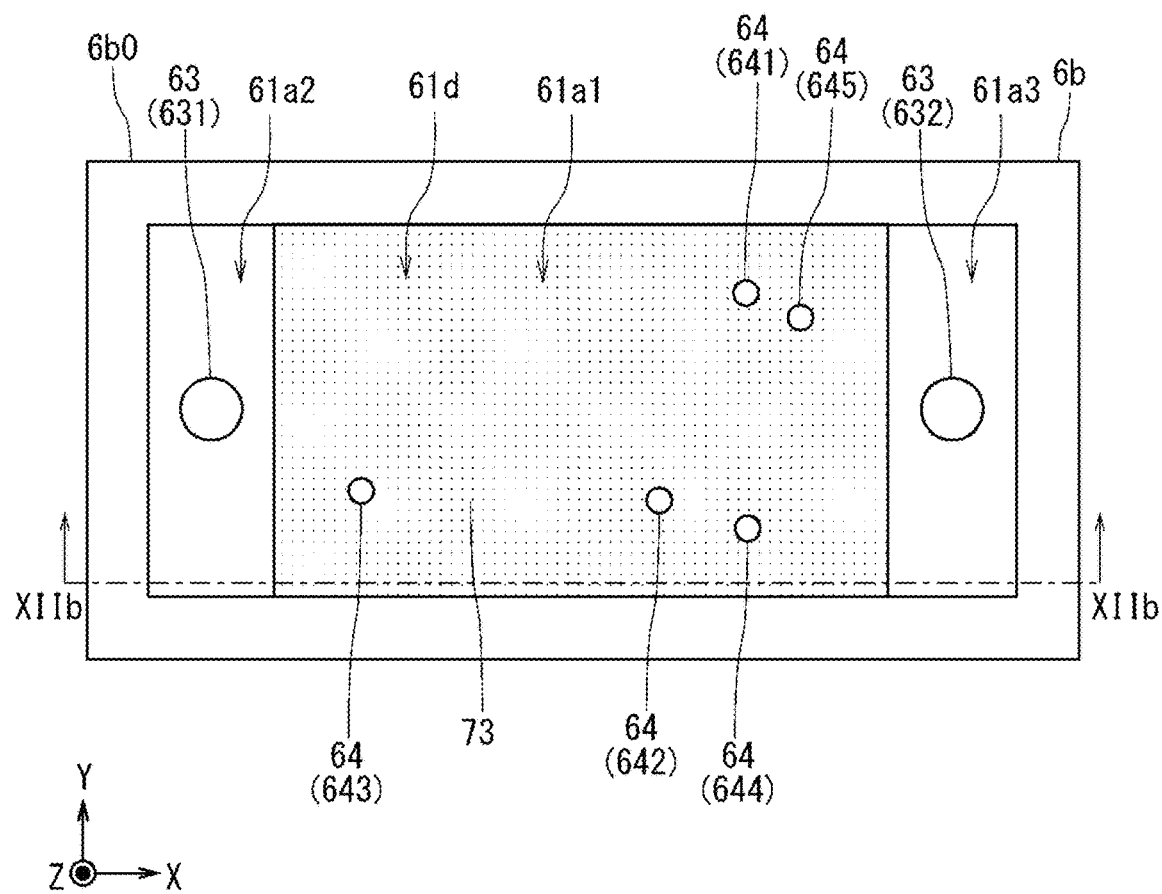
FIG. 12A illustrates a plan view of the device during manufacture of the second portion.
Figure 12B:
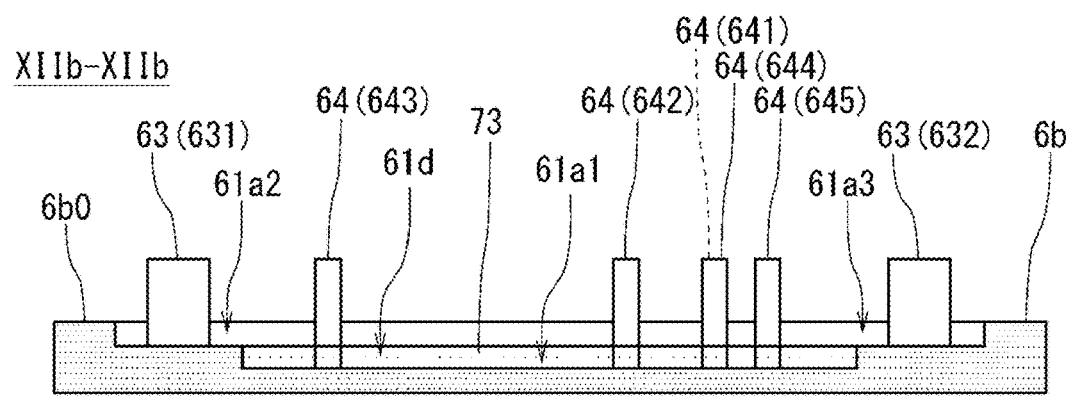
FIG. 12B illustrates an imaginary cross-sectional view of the device taken along line XIIb-XIIb in FIG. 12A during manufacture of the second portion.

As shown in FIGS. 12A and 12B, a third resin 73 that is uncured liquid is placed in the third-A area 61$a$1. For example, the third resin 73 may be a thermosetting resin containing a main agent and a hardener mixed together.

Figure 13A:
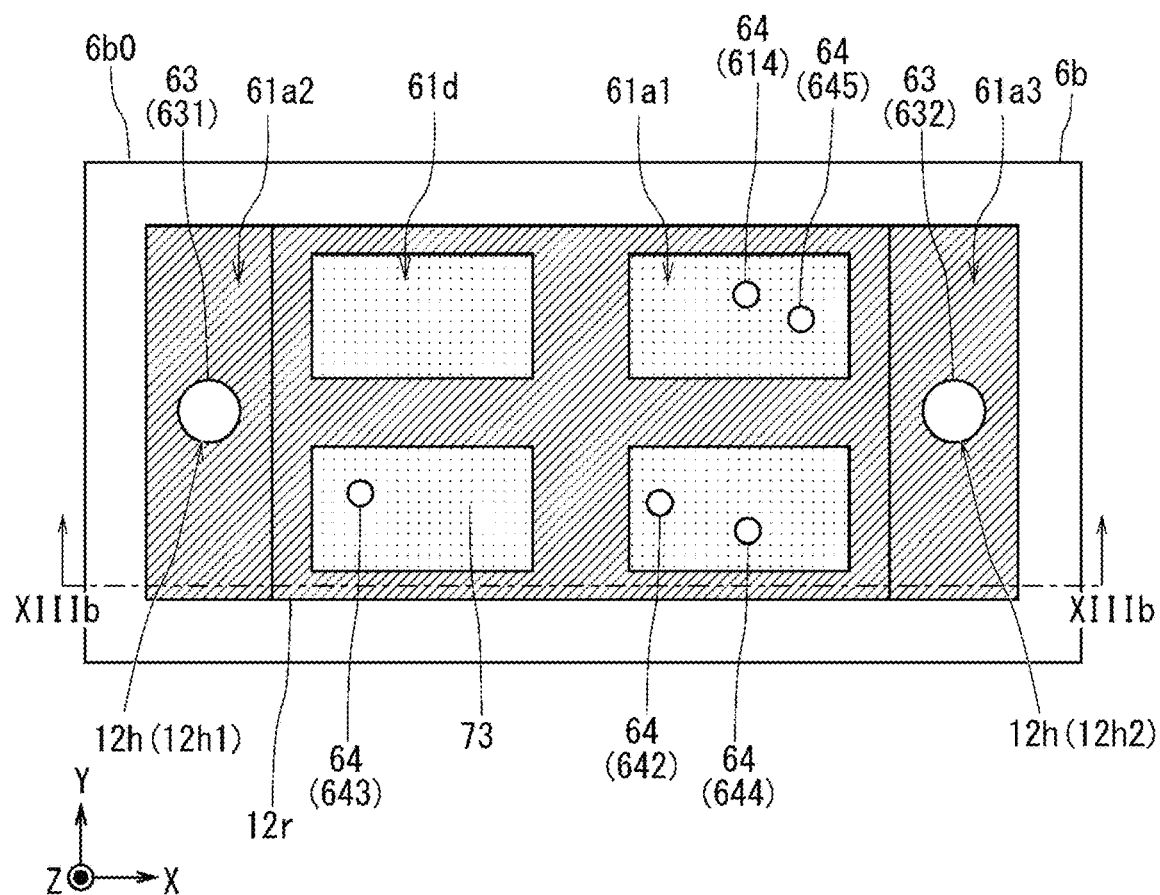
FIG. 13A illustrates a plan view of the device during manufacture of the second portion.
Figure 13B:
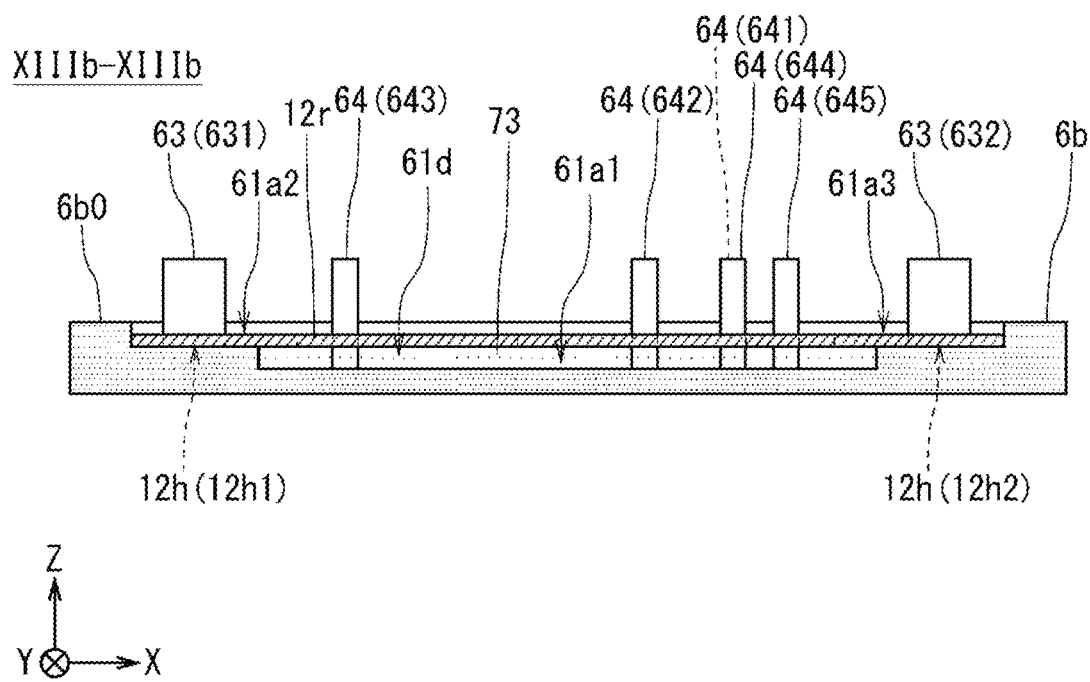
FIG. 13B illustrates an imaginary cross-sectional view of the device taken along line XIIIb-XIIIb in FIG. 13A during manufacture of the second portion.

As shown in, for example, FIGS. 13A and 13B, the second reinforcement 12$r$ is then placed between the third-B area 61$a$2 and the third-C area 61$a$3 to bridge these areas. The third-A pin 631 is fitted in the second-A through-hole 12$h$1, and the third-B pin 632 is fitted in the second-B through-hole 12$h$2.

Figure 14A:
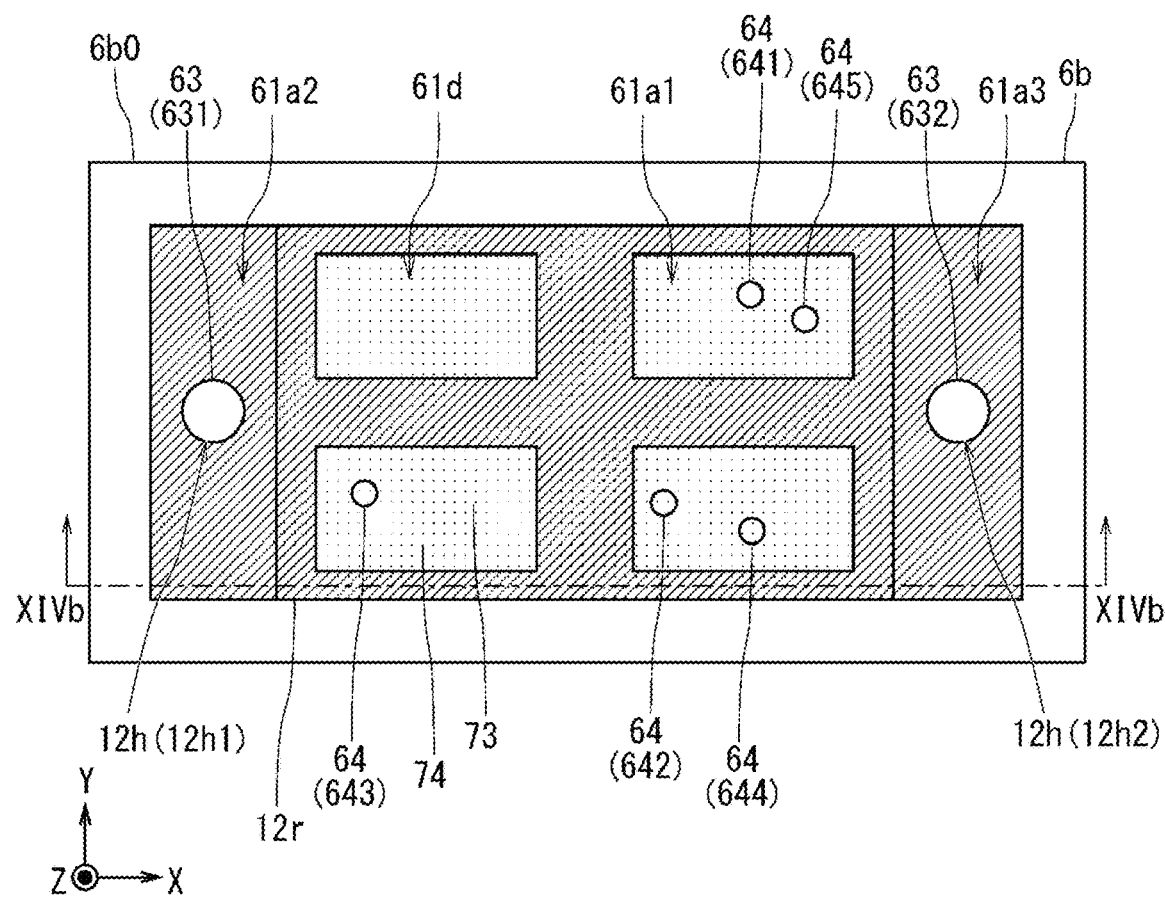
FIG. 14A illustrates a plan view of the device during manufacture of the second portion.
Figure 14B:
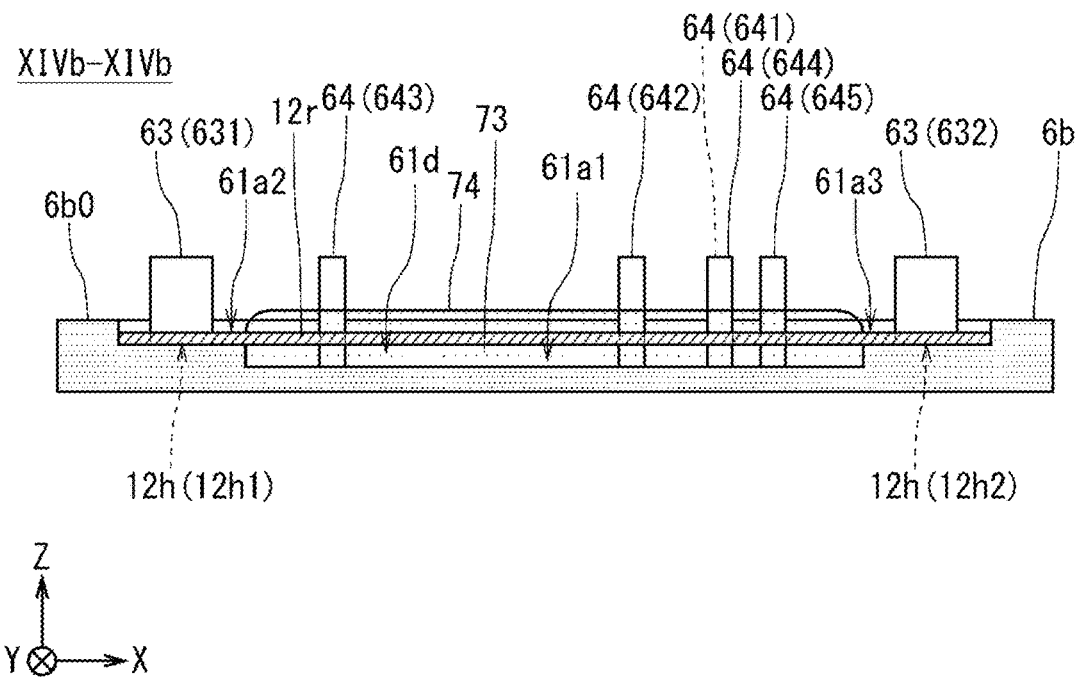
FIG. 14B illustrates an imaginary cross-sectional view of the device taken along line XIVb-XIVb in FIG. 14A during manufacture of the second portion.

As shown in FIGS. 14A and 14B, a fourth resin 74 that is uncured liquid is placed in the third-A area 61$a$1 on the second reinforcement 12$r$. For example, the fourth resin 74 may be a thermosetting resin containing a main agent and a hardener mixed together. The third resin 73 and the fourth resin 74 may be, for example, the same resin. The third resin 73 and the fourth resin 74 may be, for example, different resins.

Figure 15A:
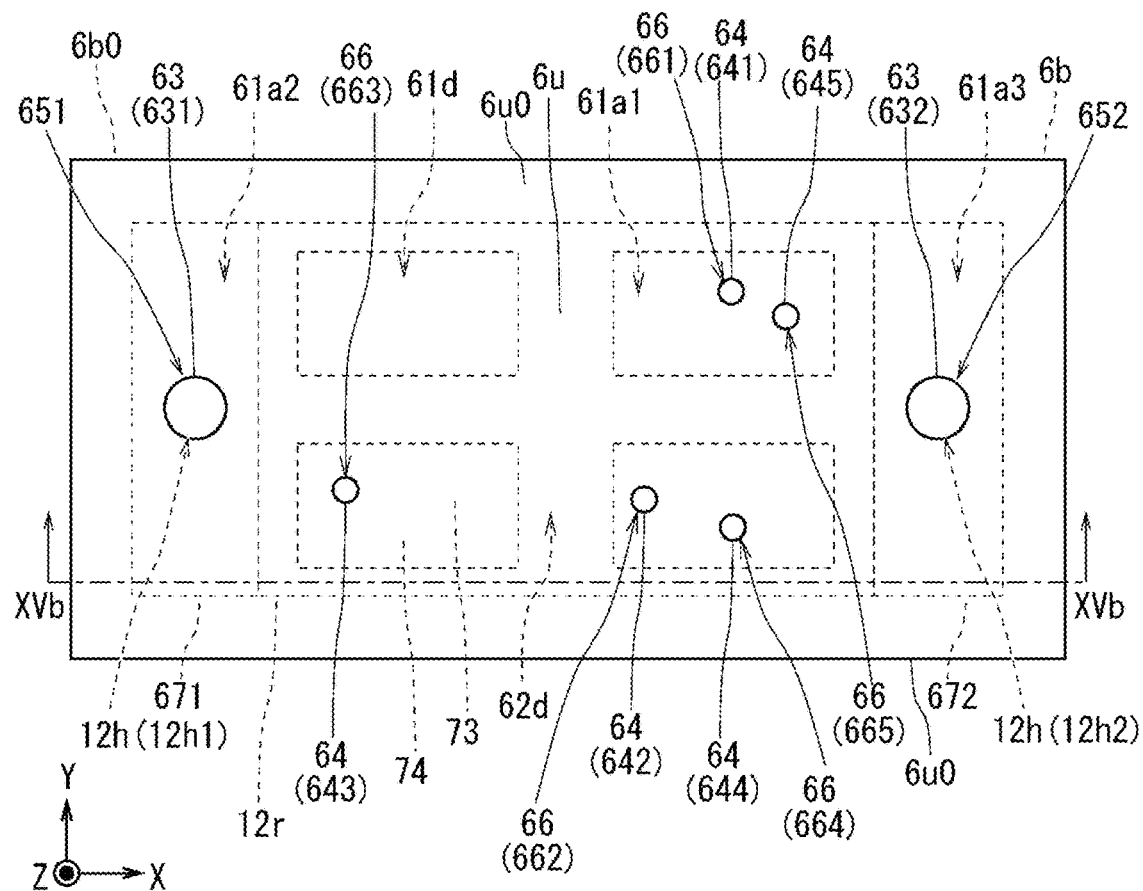
FIG. 15A illustrates a plan view of the device during manufacture of the second portion.
Figure 15B:
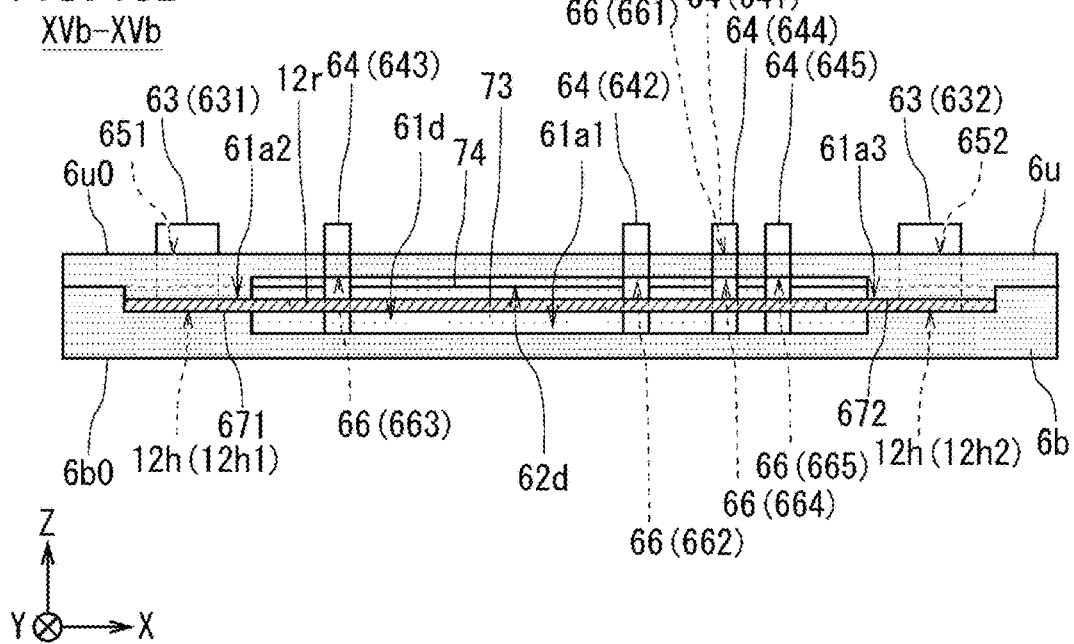
FIG. 15B illustrates an imaginary cross-sectional view of the device taken along line XVb-XVb in FIG. 15A during manufacture of the second portion.

As shown in, for example, FIGS. 15A and 15B, a second upper mold 6$u$ used for resin molding of the second portion 12 is placed to cover the second reinforcement 12$r$ and the fourth resin 74. The second upper mold 6$u$ has a fourth recess 62$d$, a third extension 671, a fourth extension 672, a third hole 651, a fourth hole 652, and multiple fifth holes 66. The fourth recess 62$d$ is on the bottom of a substantially rectangular second upper mold body 6$u$0 of the second upper mold 6$u$. The fourth recess 62$d$ has the shape corresponding to the outline of the second joint 12$b$2. The third extension 671 and the fourth extension 672 are both on the bottom of the second upper mold body 6$u$0 and extend downward (−Z direction). The third extension 671 has the shape corresponding to the outline of the upper surface of the second-A protrusion 12$p$1. The fourth extension 672 has the shape corresponding to the outline of the upper surface of the second-B protrusion 12$p$2. The third hole 651 is a through-hole extending upward (+Z direction) from the lower surface of the third extension 671 to the upper surface of the second upper mold 6$u$. The fourth hole 652 is a through-hole extending upward (+Z direction) from the lower surface of the fourth extension 672 to the upper surface of the second upper mold 6$u$. The multiple fifth holes 66 are through-holes extending upward (+Z direction) from the lower surface to the upper surface of the second upper mold 6$u$. The multiple fifth holes 66 include, for example, a fifth-A hole 661, a fifth-B hole 662, a fifth-C hole 663, a fifth-D hole 664, and a fifth-E hole 665. The fourth recess 62$d$ is filled with the fourth resin 74. With the third-A pin 631 fitted in the third hole 651 for example, the third extension 671 is in contact with the upper surface of the second reinforcement 12$r$. With the third-B pin 632 fitted in the fourth hole 652 for example, the fourth extension 672 is in contact with the upper surface of the first reinforcement 11$r$. The multiple second pins 64 are fitted in the multiple fifth holes 66. More specifically, for example, the second-A pin 641 is fitted in the fifth-A hole 661. For example, the second-B pin 642 is fitted in the fifth-B hole 662. For example, the second-C pin 643 is fitted in the fifth-C hole 663. For example, the second-D pin 644 is fitted in the fifth-D hole 664. For example, the second-E pin 645 is fitted in the fifth-E hole 665.

In the state shown in FIGS. 15A and 15B, for example, the third resin 73 and the fourth resin 74 are cured by heating in a heating furnace. The heating temperature is, for example, in a range of about 80 to 100° C. The heating time is, for example, about 30 minutes.

Figure 16A:
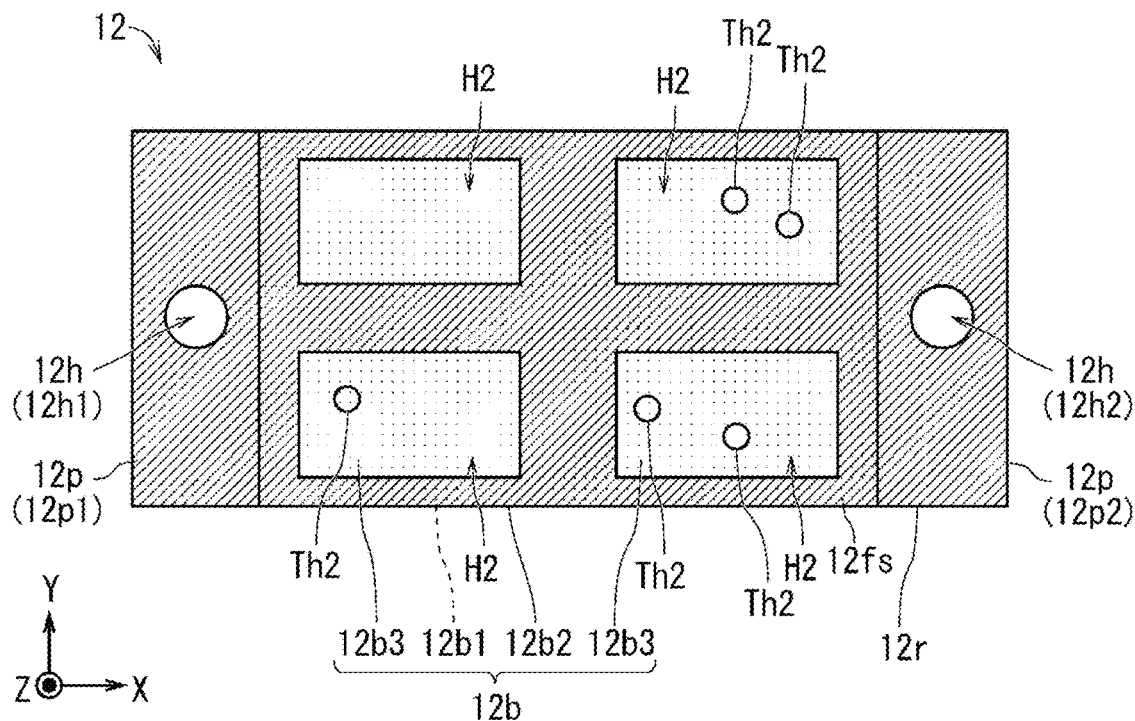
FIG. 16A illustrates a plan view of an example second portion according to the first embodiment.
Figure 16B:
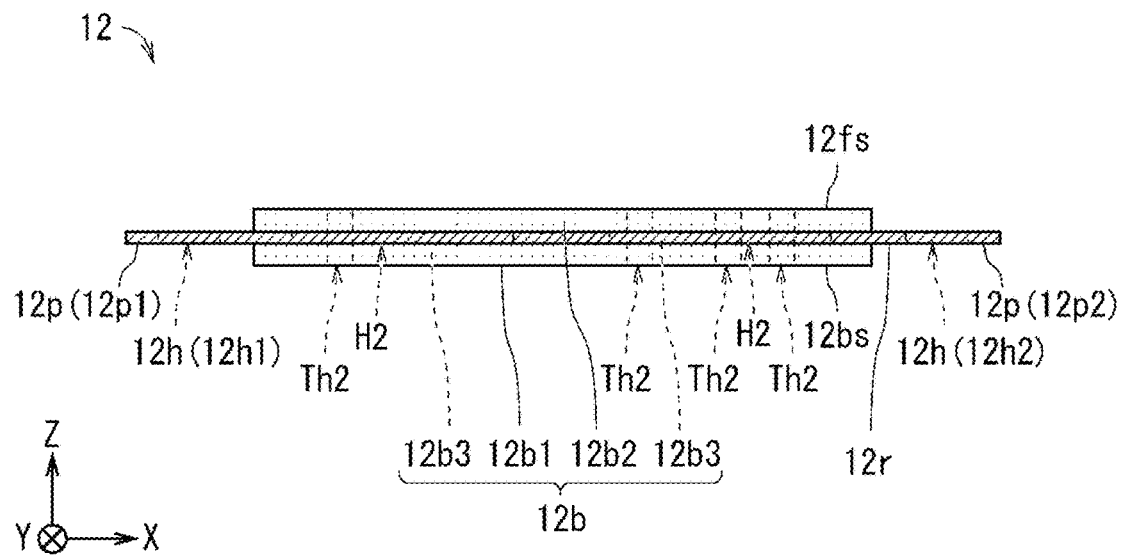
FIG. 16B illustrates a front view of the second portion according to the first embodiment.

The second lower mold 6$b$ and the second upper mold 6$u$ are then removed to form the second portion 12 with the third surface 12$fs$ and the fourth surface 12$bs$ as shown in FIGS. 16A and 16B. In other words, the second process in step Sp2 is performed to form, for example, the second portion 12 by resin molding to have the second body 12$b$ formed from a resin and the second reinforcement 12$r$ that is harder than the second body 12$b$. For example, the second body 12$b$ may include the second outer portion 12$b$1 with the fourth surface 12$bs$, the second joint 12$b$2 with the third surface 12$fs$, and one or more second connectors 12$b$3 that connect the second outer portion 12$b$1 and the second joint 12$b$2 together. The second outer portion 12$b$1, the second joint 12$b$2, and the second connectors 12$b$3 are integral with one another. The second body 12$b$ has, for example, multiple through-holes Th2 extending from the third surface 12$fs$ to the fourth surface 12$bs$. The second reinforcement 12$r$ is, for example, bonded to and sandwiched between the second outer portion 12$b$1 and the second joint 12$b$2. The second reinforcement 12$r$ includes, for example, one or more second protrusions 12$p$ protruding from the second body 12$b$ along the fourth surface 12$bs$ as viewed in plan toward the fourth surface 12$bs$. The one or more second protrusions 12$p$ include, for example, the second-A through-hole 12$h$1 as the third specific-shaped portion and the second-B through-hole 12$h$2 as the fourth specific-shaped portion at different positions from each other when viewed from a plan perspective toward the fourth surface 12$bs$.

Third Process (Step Sp3)

In the third process in step Sp3, the first flow path device 1 is formed by joining the first portion 11 and the second portion 12 at the second surface 11$bs$ and the third surface 12$fs$. For example, the first portion 11 and the second portion 12 are aligned with each other with the first-A through-hole 11$h$1 as the first specific-shaped portion, the first-B through-hole 11$h$2 as the second specific-shaped portion, the second-A through-hole 12$h$1 as the third specific-shaped portion, and the second-B through-hole 12$h$2 as the fourth specific-shaped portion. For example, the second surface 11$bs$ and the third surface 12$fs$ are joined by causing the multiple through-holes Th2 in the second portion 12 to connect to the groove pattern 1$pt$ on the second surface 11$bs$. This forms the first flow path 1$f$.

An example process for joining the second surface 11$bs$ and the third surface 12$fs$ will now be described.

Figure 17A:
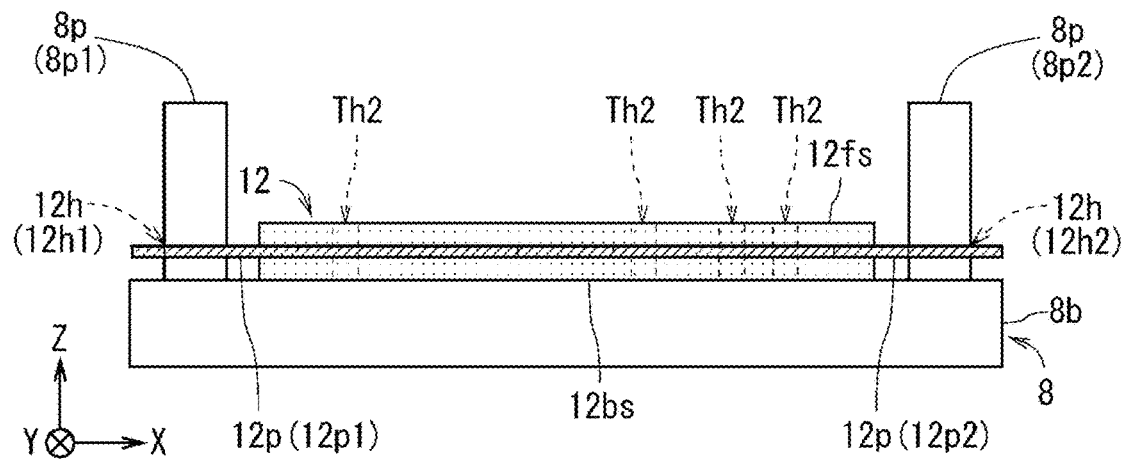
FIGS. 17A to 17C illustrate front views of the device showing the joining of the first portion and the second portion together.

As shown in, for example, FIG. 17A, a table 8 for alignment (alignment table) is prepared first. The alignment table 8 includes, for example, a base 8$b$ and multiple projections 8$p$. The base 8$b$ is, for example, rectangular. The multiple projections 8$p$ project, for example, upward (+Z direction) from the upper surface of the base 8$b$. In the example of FIG. 17A, the multiple projections 8$p$ include a first projection 8$p$1 and a second projection 8$p$2. The multiple projections 8$p$ are, for example, portions for aligning the first portion 11 and the second portion 12 (also referred to as alignment portions). The positional relationship between the first projection 8*p*1 and the second projection 8*p*2 corresponds to, for example, the positional relationship between the first-A through-hole 11*h*1 and the first-B through-hole 11*h*2 in the first reinforcement 11*r*, and also the positional relationship between the second-A through-hole 12*h*1 and the second-B through-hole 12*h*2 in the second reinforcement 12*r*.

As shown in FIG. 17A, the second portion 12 is placed on the base 8*b* to have the third surface 12*fs* facing upward (+Z direction). The first projection 8*p*1 is fitted in the second-A through-hole 12*h*1, and the second projection 8*p*2 is fitted in the second-B through-hole 12*h*2. The second-A through-hole 12*h*1 as the third specific-shaped portion and the second-B through-hole 12*h*2 as the fourth specific-shaped portion can be used to adjust the orientation and the position of the second portion 12.

Figure 17B:
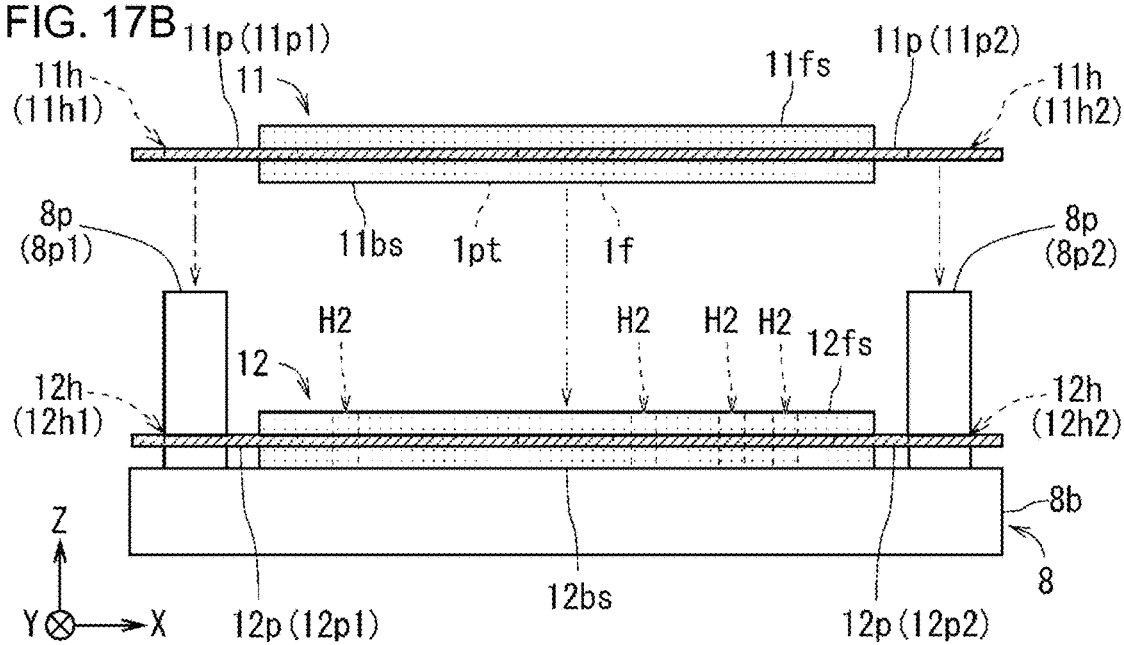
Figure 17C:
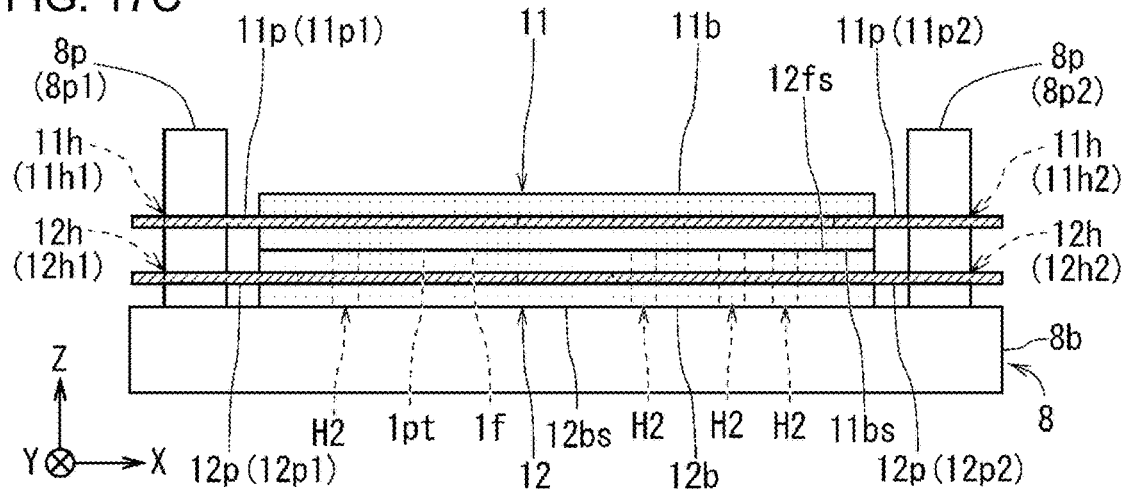

As shown in FIGS. 17B and 17C, the first portion 11 is placed on the second portion 12 to have the first surface 11*fs* facing upward (+Z direction). The first projection 8*p*1 is fitted in the first-A through-hole 11*h*1, and the second projection 8*p*2 is fitted in the first-B through-hole 11*h*2. The first-A through-hole 11*h*1 as the first specific-shaped portion and the first-B through-hole 11*h*2 as the second specific-shaped portion can be used to adjust the orientation and the position of the first portion 11.

In one example, the second surface 11*bs* and the third surface 12*fs* may undergo surface modification as pretreatment and then may be placed in contact with each other to join the surfaces together. In this example, the second surface 11*bs* and the third surface 12*fs* may be joined without an adhesive. This structure reduces impurities in the sample or impurities that may react with microparticles contained in the sample. The surface modification may be performed by, for example, irradiation of oxygen plasma or irradiation of ultraviolet (UV) light using an excimer lamp.

For the first portion 11 and the second portion 12 including the first joint 11*b*2 and the second joint 12*b*2 formed from similar resins, the joining between the second surface 11*bs* and the third surface 12*fs* achieved by surface modification can be stronger. This structure can improve, for example, the durability of the first flow path device 1. The similar resins may include, for example, resins with the same main components. More specifically, the similar resins may be, for example, silicone resins with silicone as their main component. This facilitates resin molding of the first portion 11 and the second portion 12. The silicone resins may be, for example, PDMS. In this structure, for example, the first flow path 1*f* can easily be miniaturized. PDMS is transparent, highly resistant to chemicals, biocompatible, and has other intended properties.

Although the first portion 11 is placed on the second portion 12 for joining the first portion 11 and the second portion 12 together at the second surface 11*bs* and the third surface 12*fs*, the joining is not limited to this example. For example, the second portion 12 may be placed on the first portion 11, and the second portion 12 and the first portion 11 may be joined together at the second surface 11*bs* and the third surface 12*fs*.

The first portion 11 includes the first reinforcement 11*r*. The first body 11*b* thus does not easily bend and deform when the first portion 11 is lifted with its two ends being held. This facilitates, for example, handling of the first portion 11. The second portion 12 includes the second reinforcement 12*r*. The second body 12*b* thus does not easily bend and deform when the second portion 12 is lifted with its two ends being held. This facilitates, for example, handling of the second portion 12. This facilitates, for example, alignment between the first portion 11 and the second portion 12 in joining the first portion 11 and the second portion 12 together.

When, for example, the first portion 11 and the second portion 12 are stacked on each other and joined together, the first-A through-hole 11*h*1 as the first specific-shaped portion, the first-B through-hole 11*h*2 as the second specific-shaped portion, the second-A through-hole 12*h*1 as the third specific-shaped portion, and the second-B through-hole 12*h*2 as the fourth specific-shaped portion are used to align the first portion 11 and the second portion 12 with each other. This facilitates, for example, alignment between the first portion 11 and the second portion 12. The first flow path device 1 can thus be manufactured easily and accurately.

When, for example, the first portion 11 is viewed in plan toward the first surface 11*fs*, the first-A through-hole 11*h*1 as the first specific-shaped portion and the first-B through-hole 11*h*2 as the second specific-shaped portion are located opposite to each other across the first body 11*b*. This improves, for example, the accuracy of alignment between the first portion 11 and the second portion 12. The first flow path device 1 can thus be manufactured accurately and easily. When, for example, the second portion 12 is viewed in plan toward the fourth surface 12*bs*, the second-A through-hole 12*h*1 as the third specific-shaped portion and the second-B through-hole 12*h*2 as the fourth specific-shaped portion are located opposite to each other across the second body 12*b*. This improves, for example, the accuracy of alignment between the first portion 11 and the second portion 12. The first flow path device 1 can thus be manufactured accurately and easily.

When, for example, the first flow path device 1 is viewed from a plan perspective toward the first surface 11*fs*, the first-A through-hole 11*h*1 as the first specific-shaped portion and the second-A through-hole 12*h*1 as the third specific-shaped portion overlap each other, and the first-B through-hole 11*h*2 as the second specific-shaped portion and the second-B through-hole 12*h*2 as the fourth specific-shaped portion overlap each other. This structure allows each projection 8*p* as an alignment portion to adjust the positions and the orientations of both the first portion 11 and the second portion 12. This improves, for example, the accuracy of alignment between the first portion 11 and the second portion 12. The flow path device can thus be manufactured accurately and easily.

1-4. Second Flow Path Device

As shown in FIG. 1B, the second flow path device 2 includes, for example, a second flow path 2*f* inside. The second flow path 2*f* is continuous to and connects to, for example, the first flow path 1*f* in the first flow path device 1. The second flow path device 2 allows, for example, a fluid containing specific microparticles separated and collected in the first flow path 1*f* in the first flow path device 1 to flow as a target for measurement (also referred to as a measurement target). In the first embodiment, the first flow path device 1 is located, for example, on the second flow path device 2. This allows, for example, specific microparticles separated and collected in the first flow path device 1 to flow into the second flow path device 2 under gravity as well. In this structure, for example, microparticles collected by the first flow path device 1 are less likely to be stagnant midway from the first flow path 1*f* to the second flow path 2*f*.

The material for the second flow path device 2 may be, for example, different from the material for the first flow path device 1 described above. The material for the second flow path device 2 may be, for example, engineering plastics such as PMMA or cyclo olefin polymer (COP). For example, preparing two substrates, forming a groove on one of the two substrates, and joining the two substrates to seal the groove are performed in the stated order to form the second flow path device 2.

Figure 18:
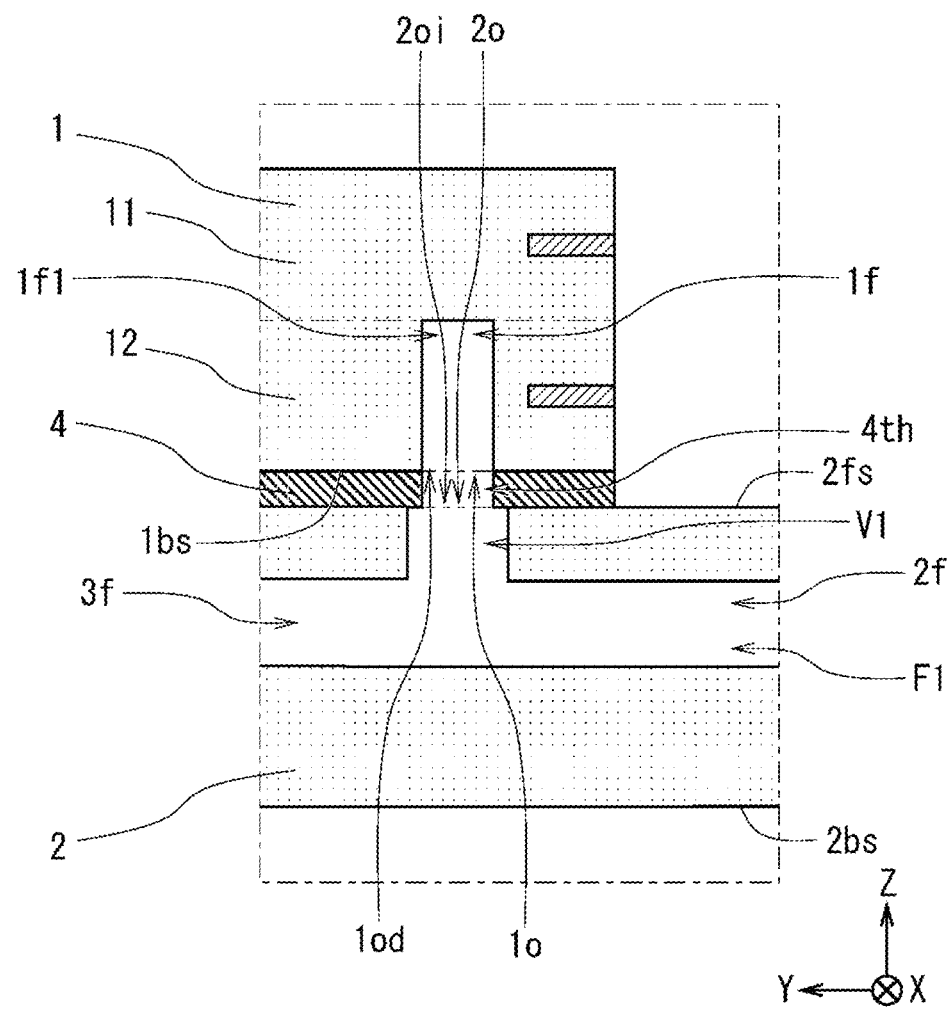
FIG. 18 illustrates an enlarged imaginary cross-sectional view of the flow path measuring device showing area XVIII in FIG. 1B.

As shown in FIGS. 1A, 1B, and 18, the second flow path device 2 has, for example, a second upper surface 2fs as a fifth surface and a second lower surface 2bs as a sixth surface. The second flow path 2f has, for example, multiple openings 2o (also referred to as second openings) in at least one of the second upper surface 2fs and the second lower surface 2bs. In other words, the second flow path device 2 has multiple second openings 2o in, for example, either the second upper surface 2fs or the second lower surface 2bs. In the first embodiment, the second flow path device 2 has, for example, at least one second opening 2o in the second upper surface 2fs. For example, the second opening 2o in the second upper surface 2fs and the first opening 1o in the first lower surface 1bs in the first flow path device 1 are connected to each other. In other words, the first flow path 1f in the first flow path device 1 and the second flow path 2f in the second flow path device 2 connect to each other. Thus, for example, the flow path measuring device 100 can continuously perform the processes from separation and collection of specific microparticles in a sample in the first flow path device 1 to measurement of a fluid containing such specific microparticles (measurement target) in the second flow path device 2. This allows efficient processes of, for example, separation and collection of specific microparticles in a sample and measurement of a fluid containing such specific microparticles (measurement target) in the second flow path device 2.

As shown in FIGS. 1A and 1B, the second flow path device 2 has, for example, the second upper surface 2fs including a first area A1 and a second area A2. When, for example, the second upper surface 2fs is viewed from a plan perspective in the −Z direction, the second flow path 2f overlaps an area ranging from the first area A1 to the second area A2, and the first flow path device 1 overlaps the first area A1 alone, instead of overlapping both the first area A1 and the second area A2. For example, the second flow path device 2 has a portion 2tr (also referred to as a light-transmitting portion) that transmits light from at least an area in the second flow path 2f (measurement area) to the outside of the second flow path device 2. This allows, for example, a fluid containing specific microparticles (measurement target) in the second flow path 2f to undergo various measurements with various optical sensors. In the first embodiment, for example, the second flow path device 2 is entirely transparent. Thus, for example, the second flow path device 2 includes a portion between the second upper surface 2fs and the second flow path 2f and a portion between the second lower surface 2bs and the second flow path 2f that serve as transparent light-transmitting portions 2tr for transmitting light.

The multiple second openings 2o in the second flow path 2f include, for example, a second inlet 2oi and a second outlet 2od. The second inlet 2oi can receive, for example, inflow of fluid containing specific microparticles (measurement target) from the first flow path 1f in the first flow path device 1 to the second flow path 2f in the second flow path device 2. The second outlet 2od can allow, for example, a fluid containing specific microparticles (measurement target) from the second flow path 2f to flow out of the second flow path device 2 for being collected. In the example of FIGS. 1B and 18, the second inlet 2oi is in the second upper surface 2fs. The second inlet 2oi connects to the first outlet 1od of the first flow path device 1. The second outlet 2od is in the second lower surface 2bs. Under gravity, for example, the fluid from the first flow path device 1 is easy to flow through the second inlet 2oi and easy to be collected at the second outlet 2od. As shown in FIG. 18, the second inlet 2oi may be larger than the first outlet 1od. In this structure, for example, the sample is less likely to be stagnant at the joint between the first flow path device 1 and the second flow path device 2. The second inlet 2oi has a diameter of, for example, about 1 to 3 mm. The first outlet 1od has a diameter of, for example, about 1 to 3 mm.

The second flow path 2f includes, for example, a vertical portion V1 and a flat portion F1. For example, the vertical portion V1 connects to the second inlet 2oi and extends in the thickness direction (+Z direction) of the second flow path device 2. The flat portion F1 connects to, for example, the vertical portion V1 and extends along the XY plane. With the second flow path 2f having the vertical portion V1, for example, specific microparticles are less likely to be stagnant at the joint between the first flow path 1f and the second flow path 2f. With the second flow path 2f having the flat portion F11 for example, specific microparticles to accumulate in the flat portion F1. This structure allows, for example, specific microparticles in the flat portion F1 to undergo stable measurement. The vertical portion V1 has a width of, for example, about 0.5 to 2 mm. The flat portion F1 has a width of, for example, about 1 to 6 mm. The vertical portion V1 has a length of, for example, about 0.5 to 1 mm. The flat portion F1 has a height of, for example, about 0.5 to 2 mm in the thickness direction of the second flow path device 2.

Figure 20:
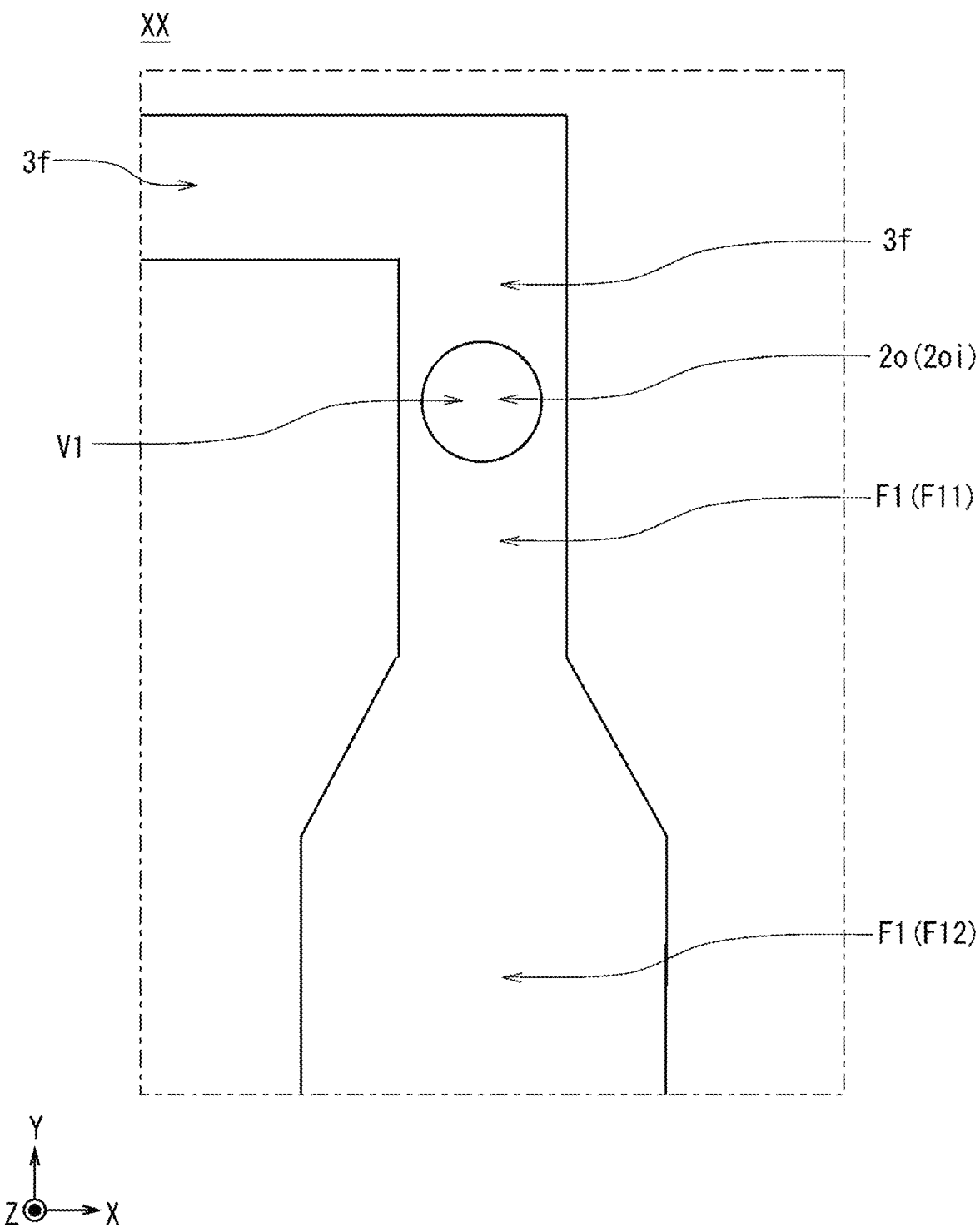
FIG. 20 illustrates an enlarged plan view of the second flow path device showing area XX in FIG. 19.

When, for example, the flat portion F1 is wider than the vertical portion V1 at least partially at the position of connection to the vertical portion V1 as shown in FIG. 20, specific microparticles are less likely to be stagnant at the joint between the flat portion F1 and the vertical portion V1. The flat portion F1 includes, for example, a first flat portion F11 and a second flat portion F12. The first flat portion F11 connects to, for example, the vertical portion V1. The second flat portion F12 connects to, for example, the first flat portion F11 and is wider than the first flat portion F11. The second flat portion F12 serves as, for example, the measurement area described above. This structure of the flat portion F1 allows, for example, the first particles P1 as specific microparticles flowing from the first flow path 1f into the second flow path 2f to diffuse in the second flow path 2f. The first flat portion F11 has a width of, for example, about 0.5 to 3 mm. The second flat portion F12 has a width of, for example, about 1 to 5 mm. The second flat portion F12 is, for example, two to ten times wider than the first flat portion F11. In the first embodiment, for example, the width of the flat portion F1 gradually increases from the first flat portion F11 to the second flat portion F12 at the joint between the first flat portion F11 and the second flat portion F12. In the thickness direction of the second flow path device 2, the second flat portion F12 may be, for example, higher than the first flat portion F11. This structure allows the first particles P1 as specific microparticles to diffuse in the flat portion F1. The first flat portion F11 has a height of, for example, about 0.2 to 1 mm. The second flat portion F12 has a height of, for example, about 1 to 5 mm.

Figure 19:
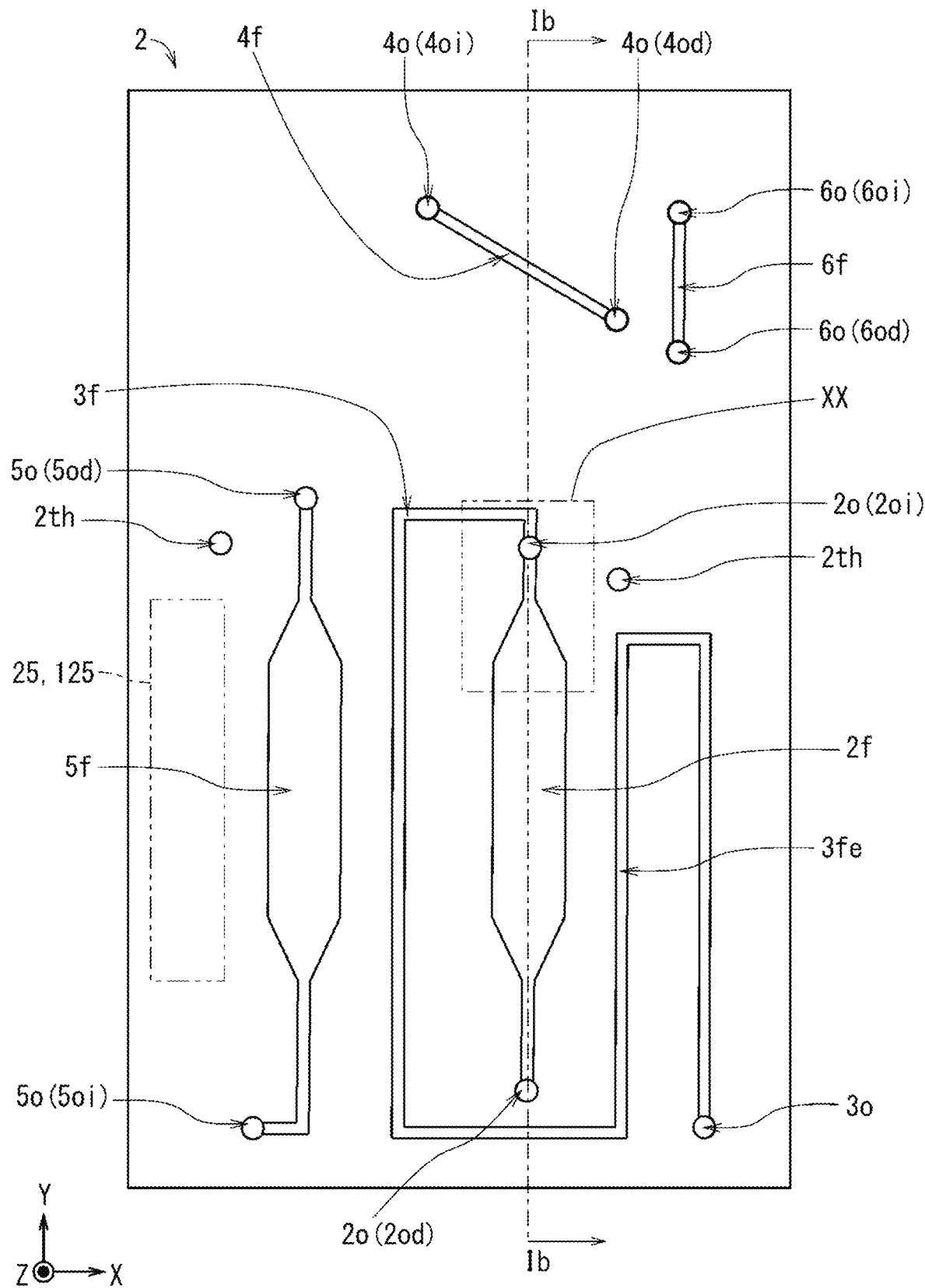
FIG. 19 illustrates a plan view of an example second flow path device according to the first embodiment.

As shown in FIGS. 19 and 20, for example, the second flow path device 2 may include a third flow path 3f that is separate from the second flow path 2f and connects to the second flow path 2f. The third flow path 3f may connect to, for example, the flat portion F1 of the second flow path 2f.

The third flow path 3f allows, for example, a fluid such as a gas (also referred to as a displacement fluid) to flow toward the second flow path 2f to displace specific microparticles flowing from the first flow path 1f and reaching the flat portion F1 toward the second outlet 2od. In this structure, specific microparticles are less likely to be stagnant in, for example, the second flow path 2f. In the first embodiment, the third flow path 3f connects to, for example, the joint between the vertical portion V1 and the flat portion F1 of the second flow path 2f. For example, the third flow path 3f has a first end connected to the second flow path 2f and a second end defining a third opening 3o that is in the second upper surface 2fs of the second flow path device 2. The third opening 3o can receive, for example, inflow of the displacement fluid for displacing the specific microparticles. The third flow path 3f may include, for example, a portion at least partially connected to the second flow path 2f and extending in the longitudinal direction (−Y direction) of the flat portion F1 of the second flow path 2f. For example, the second flow path 2f and the third flow path 3f with the same cross-sectional shape at the joint between the third flow path 3f and the second flow path 2f have no step between the flow paths. In this structure, specific microparticles are less likely to be stagnant. As shown in FIG. 19, the third flow path 3f may include, for example, a portion 3fe (also referred to as an elongated portion) meandering along the XY plane. In this structure, for example, specific microparticles from the second flow path 2f are less likely to flow reversely through the third flow path 3f toward the third opening 3o and are less likely to leak through the third opening 3o.

The first flow path device 1 may have, for example, both the first inlet 1oi and the first outlet 1od in the first lower surface 1bs. This structure allows a fluid as a sample to flow into the first flow path device 1 from below. When, for example, the second particles P2 have a greater specific gravity than the first particles P1, the second particles P2 can easily sink in the fluid, allowing easy separation of the first particles P1 from the sample.

As shown in FIG. 19, the second flow path device 2 may further include a fourth flow path 4f different from the second flow path 2f and the third flow path 3f. The fourth flow path 4f has, for example, multiple openings 4o (also referred to as fourth openings) in at least one of the second upper surface 2fs and the second lower surface 2bs. The fourth flow path 4f serves as, for example, a flow path for the sample from which the specific microparticles are yet to be separated. For example, the sample containing specific microparticles can flow through the fourth flow path 4f in the second flow path device 2 before flowing into the first flow path device 1. This reduces foreign matter and other substances in the sample before the sample enters the device. The multiple fourth openings 4o include, for example, a fourth inlet 4oi and a fourth outlet 4od. The fourth inlet 4oi can receive, for example, inflow of the sample into the fourth flow path 4f. The fourth outlet 4od can cause, for example, outflow of the sample from the fourth flow path 4f. The fourth inlet 4oi is, for example, exposed outside the second flow path device 2. The fourth outlet 4od connects to, for example, the first inlet 1oi of the first flow path device 1. The fourth inlet 4oi and the fourth outlet 4od in, for example, the second upper surface 2fs allow an operation of connecting a tube or a flow path for supplying a sample to the fourth inlet 4oi to be performed from above. This can improve operability.

As shown in FIG. 19, the second flow path device 2 may further include a fifth flow path 5f different from the second flow path 2f, the third flow path 3f, and the fourth flow path 4f. This fifth flow path 5f serves as, for example, a flow path for calibration. For example, the fifth flow path 5f may allow flow of, for example, a fluid for calibration (also referred to as a calibration fluid) containing components different from the specific microparticles separated and collected in the first flow path device 1. For every measurement of, for example, specific microparticles, measurement using light (also referred to as optical measurement) for a measurement target in the second flow path 2f and measurement using light (also referred to as optical measurement) for a measurement target in the fifth flow path 5f can be performed in sequence. A difference in light intensity between the two measurement results may then be used to estimate the number of specific microparticles in the measurement target. This reduces measurement errors caused by, for example, a deteriorating sensor used for the optical measurement. A deteriorating sensor may include, for example, a deteriorating light emitter or a deteriorating light receiver. The fifth flow path 5f has, for example, multiple openings 5o (also referred to as fifth openings) in at least one of the second upper surface 2fs and the second lower surface 2bs. The multiple fifth openings 5o include, for example, a fifth inlet 5oi and a fifth outlet 5od. The fifth inlet 5oi can receive, for example, inflow of the sample for calibration into the fifth flow path 5f. The fifth outlet 5od can cause, for example, outflow of the sample for calibration from the fifth flow path 5f. The fifth inlet 5oi in, for example, the second upper surface 2fs similarly to the third opening 3o allows an operation of connecting a tube or a flow path to the fifth inlet 5oi and the third opening 3o to be performed from above. This can improve operability. The fifth outlet 5od is in the second lower surface 2bs.

As shown in FIG. 19, the second flow path device 2 may further include a sixth flow path 6f different from the second flow path 2f, the third flow path 3f, the fourth flow path 4f, and the fifth flow path 5f. The sixth flow path 6f has, for example, multiple openings 6o (also referred to as sixth openings) in at least one of the second upper surface 2fs and the second lower surface 2bs. The multiple sixth openings 6o include, for example, a sixth inlet 6oi and a sixth outlet 6od. The sixth inlet 6oi can receive, for example, inflow of fluid that creates a sample-directing flow into the sixth flow path 6f. The sixth outlet 6od can cause, for example, outflow of fluid that creates a sample-directing flow from the sixth flow path 6f. The sixth inlet 6oi is, for example, exposed outside the second flow path device 2. The sixth outlet 6od connects to, for example, the first sample-directing inlet 1op of the first flow path device 1.

1-5. Connection Between First Flow Path Device and Second Flow Path Device

The first lower surface 1bs of the first flow path device 1 is fixed on the second upper surface 2fs of the second flow path device 2 with, for example, a sheet 4. In other words, for example, the first lower surface 1bs of the first flow path device 1 and the second upper surface 2fs of the second flow path device 2 face each other with the sheet 4 between them. In the example of FIGS. 1B and 18, the sheet 4 has top and bottom surfaces along the XY plane and a thickness in the +Z direction. For example, the first flow path device 1 and the second flow path device 2 that are plates are stacked on each other in the thickness direction (+Z direction) to downsize the flow path measuring device 100.

The sheet 4 serves as, for example, an intermediate layer for joining materials that are difficult to adhere to each other. The sheet 4 may be, for example, a flexible silicone resin such as silicone or PDMS. The sheet 4 can then deform in correspondence with, for example, the curves or other profiles of the first lower surface 1*bs* of the first flow path device 1 and the second upper surface 2*fs* of the second flow path device 2. This allows, for example, the sheet 4 to adhere closely to both the first lower surface 1*bs* and the second upper surface 2*fs*. As shown in FIGS. 1B and 18, the sheet 4 has, for example, through-holes 4*th*. Each through-hole 4*th* connects to, for example, the first opening 1*o*. In the first embodiment, for example, the five first openings 1*o* of the first flow path device 1 connect to the second flow path device 2. The sheet 4 may thus have, for example, five through-holes 4*th*. In this structure, for example, a fluid can flow between the first flow path device 1 and the second flow path device 2 through the through-holes 4*th*.

For example, the first flow path device 1 and the second flow path device 2 may be joined together with an adhesive applied to the top and bottom surfaces of the sheet 4. The adhesive may be, for example, a resin curable with ultraviolet light (also referred to as a light-curable resin) or a resin curable by heating (also referred to as a thermosetting resin).

1-6. Overview of First Embodiment

The first flow path device 1 according to the first embodiment includes, for example, the first portion 11 and the second portion 12 that are joined to each other. The first portion 11 includes, for example, the first reinforcement 11*r* extending through the integrally formed resin first body 11*b*. The first body 11*b* thus does not easily bend and deform when the first portion 11 including the first reinforcement 11*r* is lifted with its two ends being held. This facilitates, for example, handling of the first portion 11. This facilitates, for example, alignment between the first portion 11 and the second portion 12 in joining the first portion 11 and the second portion 12 together. The second portion 12 includes, for example, the second reinforcement 12*r* extending through the integrally formed resin second body 12*b*. The second body 12*b* thus does not easily bend and deform when the second portion 12 including the second reinforcement 12*r* is lifted with its two ends being held. This facilitates, for example, handling of the second portion 12. This facilitates, for example, alignment between the first portion 11 and the second portion 12 in joining the first portion 11 and the second portion 12 together. The first flow path device 1 can thus be manufactured easily and accurately.

For example, the first reinforcement 11*r* in the first portion 11 has the first-A through-hole 11*h*1 as the first specific-shaped portion and the first-B through-hole 11*h*2 as the second specific-shaped portion both protruding from the first body 11*b*. For example, the second reinforcement 12*r* in the second portion 12 has the second-A through-hole 12*h*1 as the third specific-shaped portion and the second-B through-hole 12*h*2 as the fourth specific-shaped portion both protruding from the second body 12*b*. When, for example, the first portion 11 and the second portion 12 are stacked on each other and joined together, the first-A through-hole 11*h*1 as the first specific-shaped portion and the first-B through-hole 11*h*2 as the second specific-shaped portion can be used to determine the orientation and the position of the first portion 11. For example, the second-A through-hole 12*h*1 as the third specific-shaped portion and the second-B through-hole 12*h*2 as the fourth specific-shaped portion can be used to determine the orientation and the position of the second portion 12. This facilitates, for example, alignment between the first portion 11 and the second portion 12. The first flow path device 1 can thus be manufactured accurately.

The method for manufacturing the first flow path device 1 according to the first embodiment may include, for example, forming the first portion 11 and the second portion 12 by resin molding and joining the first portion 11 and the second portion 12 together. In joining the first portion 11 and the second portion 12 together, the first body 11*b* does not easily bend and deform when, for example, the first portion 11 including the first reinforcement 11*r* is lifted with its two ends being held. The second portion 12 includes the second reinforcement 12*r*. The second body 12*b* thus does not easily bend and deform when the second portion 12 is lifted with its two ends being held. This facilitates, for example, alignment between the first portion 11 and the second portion 12. The first flow path device 1 can be manufactured easily.

When, for example, the second surface 11*bs* of the first portion 11 and the third surface 12*fs* of the second portion 12 are joined together, the first-A through-hole 11*h*1 as the first specific-shaped portion, the first-B through-hole 11*h*2 as the second specific-shaped portion, the second-A through-hole 12*h*1 as the third specific-shaped portion, and the second-B through-hole 12*h*2 as the fourth specific-shaped portion are used to align the first portion 11 and the second portion 12 with each other. This facilitates alignment between the first portion 11 and the second portion 12. The first flow path device 1 can thus be manufactured easily and accurately.

The first flow path device 1 can be manufactured accurately and easily. Thus, the flow path measuring device 100 including the first flow path device 1 and the second flow path device 2 can also be manufactured accurately and easily.

2. Other Embodiments

The present disclosure is not limited to the above first embodiment and may be changed or modified variously without departing from the spirit and scope of the present disclosure.

2-1. Second Embodiment

Figure 21:
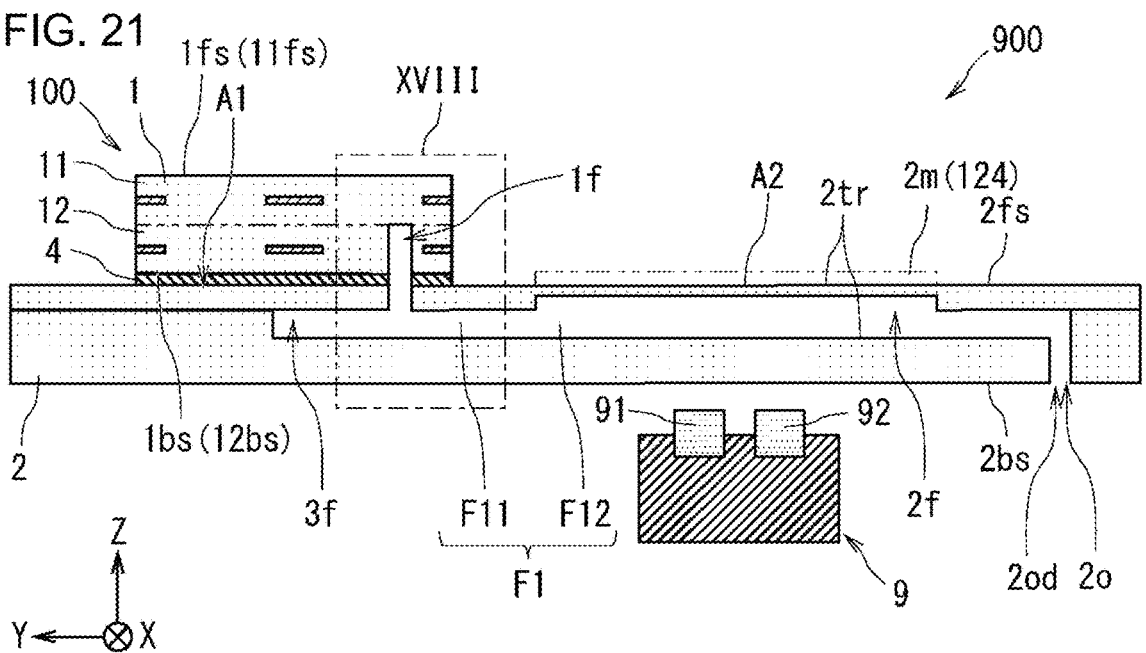
FIG. 21 illustrates an imaginary cross-sectional view of an inspection apparatus according to a second embodiment at a position corresponding to line Ib-Ib in FIG. 1A.

In the above first embodiment, an inspection apparatus 900 may be used as shown in, for example, FIG. 21. The inspection apparatus 900 includes, in addition to the flow path measuring device 100, a sensor 9 to receive light transmitted through the light-transmitting portion 2*tr* from the second flat portion F12 as the measurement area. The flow path measuring device 100 can be manufactured accurately and easily. Thus, the inspection apparatus 900 including the flow path measuring device 100 and the sensor 9 can also be manufactured accurately and easily.

An example of the inspection apparatus 900 will now be described.

As shown in FIG. 21, the inspection apparatus 900 includes, for example, the flow path measuring device 100 and the sensor 9.

The sensor 9 may be, for example, an optical sensor including a light emitter 91 and a light receiver 92. The light emitter 91 may be, for example, a light emitting element such as a light-emitting diode (LED). The light receiver 92 may be, for example, a light receiving element such as a photo diode (PD). The light receiving element may be, for example, a light receiving element including a semiconductor substrate of a first conductivity type having a semiconductor region of a second conductivity type in a surface layer near its upper surface. The light emitting element may be, for example, a light emitting element including the semiconductor substrate described above and multiple semiconductor layers stacked on the semiconductor substrate.

In the inspection apparatus 900 described above, for example, intended specific microparticles (e.g., the first particles P1) are separated from a sample in the first flow path 1f in the first flow path device 1, and a fluid containing specific microparticles (measurement target) flows to the second flow path 2f in the second flow path device 2. The fluid containing specific microparticles (measurement target) located in the second flat portion F12 as the measurement area in the second flow path 2f are then irradiated with light from the light emitter 91 in the sensor 9. The light through the second flat portion F12 is then received by the light receiver 92 for measurement of the intended specific microparticles. When, for example, the light disperses or is absorbed by specific microparticles (first particles P1) in the measurement target as the light passes through the second flat portion F12, attenuating the light intensity. The inspection apparatus 900 can determine the amount of light attenuation based on, for example, the difference between the intensity of light emitted from the light emitter 91 and the intensity of light received by the light receiver 92. A calibration curve may be predefined for the relationship between each fluid and its light attenuation amount with the known number or concentration of microparticles per unit volume. The inspection apparatus 900 can then calculate the number or concentration of specific microparticles in the measurement target based on the light attenuation amount and the calibration curve. In other words, the inspection apparatus 900 can measure, for example, the number or concentration of specific microparticles in a fluid.

As shown in FIG. 21, for example, a mirror 2m may be placed on the second area A2 of the second upper surface 2fs of the second flow path device 2. In FIG. 21, a two-dot chain line indicates the outer edge of the mirror 2m. The mirror 2m may be, for example, a portion to reflect light (also referred to as a light-reflective portion) formed from metal such as aluminum or gold. For example, the mirror 2m with a light reflective portion can be prepared by depositing a layer of metal on one surface of a plate such as a glass plate by vapor deposition or sputtering. In the inspection apparatus 900 with this structure, for example, the light emitter 91 and the light receiver 92 in the sensor 9 may face the second lower surface 2bs of the second flow path device 2. The light receiver 92 can receive, for example, light emitted from the light emitter 91 passing through the second flat portion F12, reflected by the mirror 2m, and then passing through the second flat portion F12 again. As the light passes through the second flat portion F12 twice, the light attenuates greatly before being detected by the inspection apparatus 900. The inspection apparatus 900 can thus improve the measurement accuracy.

In the flow path measuring device 100, the mirror 2m is placed on the second upper surface 2fs to cover both the second flow path 2f and the fifth flow path 5f. The mirror 2m is not limited to this structure but may be replaced by separate mirrors 2m sized as appropriate to cover the respective second and fifth flow paths 2f and 5f, instead of being one integral mirror covering both the second and fifth flow paths 2f and 5f. The separate mirrors 2m sized as appropriate to cover the respective second and fifth flow paths 2f and 5f may be separated by a light shield placed between them to block ambient light from entering the sensor 9. To more effectively block ambient light from entering the sensor 9 with the mirror 2m, a non-reflective plate or sheet may be placed on the mirror 2m to prevent ambient light from being transmitted and entering the sensor 9 through the mirror 2m, or to prevent ambient light from entering the mirror 2m.

The flow path measuring device 100 may further include, instead of the mirror 2m, a non-reflective member 124 that does not reflect light emitted from the light emitter 91 included in the sensor 9 in a portion of the second upper surface 2fs of the second flow path device 2 overlapping the second and fifth flow paths 2f and 5f, in the same manner as the mirror 2m. The non-reflective member 124 allows the light receiver 92 in the sensor 9 to receive light reflected from the first particles contained in the second flow path 2f or light reflected at an interface between the second flow path 2f and the fifth flow path 5f (the ceiling surface of the flow path as viewed from the sensor 9). This structure can measure reflection from the interface in the flow path and optically set the DC bias of the light receiver 92, and also allows the light receiver 92 to receive light reflected from the first particles. Further, the non-reflective member 124 can further block ambient light from entering the second and fifth flow paths 2f and 5f at a position opposite to the sensor 9 (from a position near the second upper surface 2fs). This structure reduces optical noise against the sensor 9 and increase the accuracy of measurement with the sensor 9. The non-reflective member 124 may be, for example, a non-reflective fabric. The non-reflective member 124 may be a matte paint, such as a black paint.

The non-reflective member 124 to replace the mirror 2m may be an integral portion as large as to cover both the second flow path 2f and the fifth flow path 5f across the entire area for measurement with the sensor 9.

The flow path measuring device 100 may further include, for example, a non-reflective area 25 between an outer periphery of the second upper surface 2fs of the second flow path device 2 and the fifth flow path 5f. The non-reflective area 25 may extend parallel to the second flow path 2f and the fifth flow path 5f as shown in FIG. 19. The non-reflective area 25 may be any portion of the second flow path device 2 including no second flow path 2f and no fifth flow path 5f and be an area containing no mirror 2m or no non-reflective member 124 when the second flow path device 2 is viewed from above. The non-reflective area 25 may include, as a non-reflective member that does not reflect light emitted from the sensor 9, a reference non-reflective member 125. The reference non-reflective member 125 can be used for calibrating the light receiver 92 in the sensor 9, and can serve as a reference for providing a reference signal to be used in measurement with the sensor 9. The intensity of reflected light from the reference non-reflective member 125 is used as a reference in reducing susceptibility to noise when the sensor 9 is used. The reference non-reflective member 125 may be, for example, a non-reflective fabric, and may be a matte paint, such as a black paint, applied on a surface.

The reference non-reflective member 125 may be placed on the second lower surface 2bs of the second flow path device 2 in an area corresponding to the non-reflective area 25 and not overlapping the second flow path 2f and the fifth flow path 5f. The intensity of reflected light from the reference non-reflective member 125 is also used as a reference in reducing susceptibility to noise that may occur when the sensor 9 is used.

Figure 22:
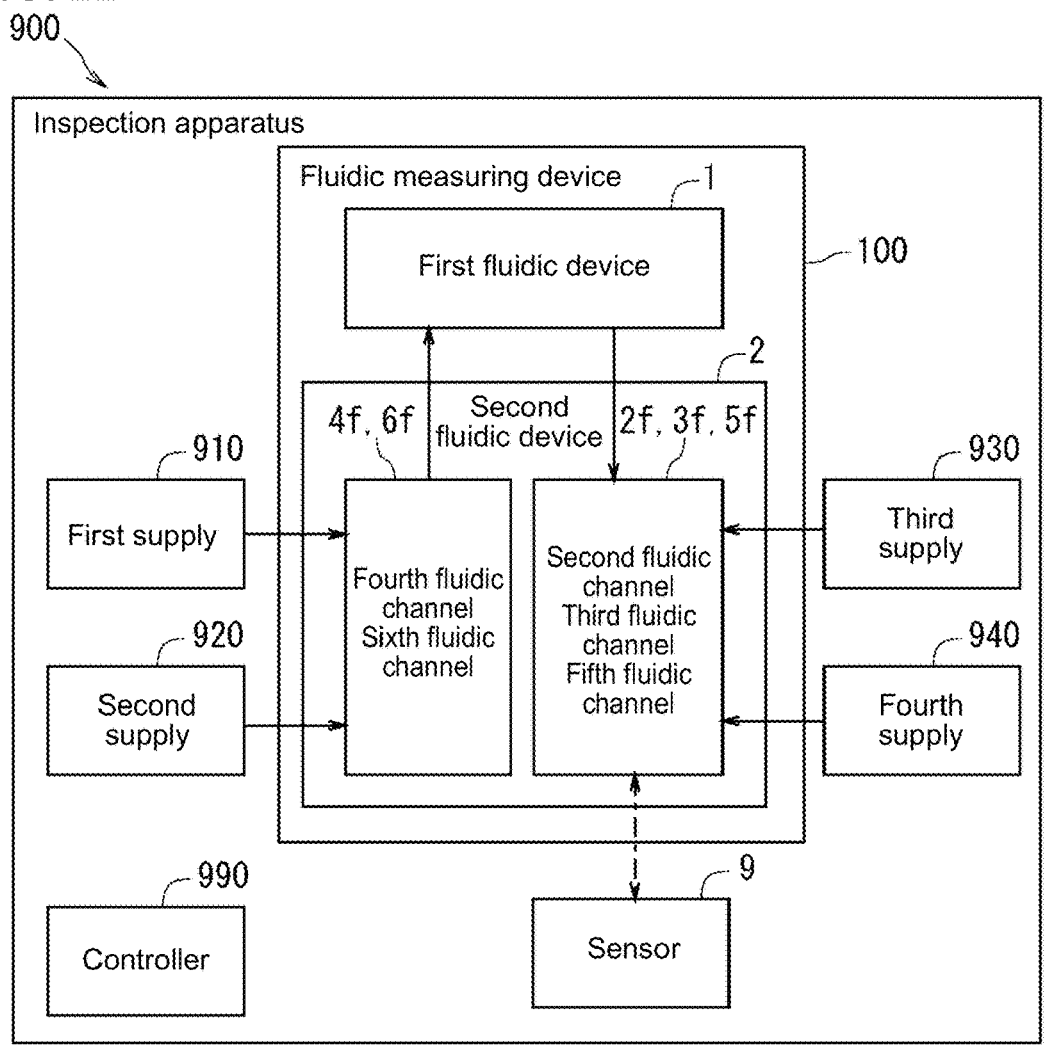
FIG. 22 illustrates a block diagram of the inspection apparatus according to the second embodiment.

As shown in FIG. 22, the inspection apparatus 900 may include, for example, a first supply 910, a second supply 920, a third supply 930, and a fourth supply 940. The first supply 910, the second supply 920, the third supply 930, and the fourth supply 940 are connected to the flow path measuring device 100. The first supply 910 can supply, for example, a sample stored in the storage with a pump or another tool. The first supply 910 connects to, for example, the fourth inlet 4oi. The second supply 920 can supply, for example, a fluid that creates a sample-directing flow stored in the storage with a pump or another tool. The second supply 920 connects to, for example, the sixth inlet 6oi. The third supply 930 can supply, for example, a displacement fluid stored in the storage with a pump or another tool. The third supply 930 connects to, for example, the third opening 3o. The fourth supply 940 can supply, for example, the calibration fluid stored in the storage with a pump or another tool. The fourth supply 940 connects to, for example, the fifth inlet 5oi. When, for example, the calibration fluid is a fluid collected from at least either the first discharge port 1ox or the second discharge port 1oe of the first flow path device 1, the fourth supply 940 may be eliminated.

The inspection apparatus 900 may include, for example, a controller 990. The controller 990 may be, for example, a computer including one or more central processing units (CPUs), a read-only memory (ROM), and a random-access memory (RAM). For example, each CPU reads and executes a program stored in the ROM to implement various functions or control. Various items of information generated temporarily during the processing performed by each CPU may be stored temporarily into, for example, the RAM. The controller 990 can control, for example, the operations of the first supply 910, the second supply 920, the third supply 930, the fourth supply 940, and the sensor 9. The controller 990 can calculate the amount of light attenuation based on, for example, the difference between the intensity of light emitted from the light emitter 91 and the intensity of light received by the light receiver 92 and can then calculate the number or concentration of specific microparticles in a measurement target based on the light attenuation amount and the calibration curve. For example, some or all of the functional components of the controller 990 may be implemented by dedicated hardware.

2-2. Third Embodiment

In each of the above embodiments, for example, the first reinforcement 11r and the second reinforcement 12r may be reinforcements with various shapes, and the first connector 11b3 and the second connector 12b3 may be connectors in various forms.

Figure 23A:
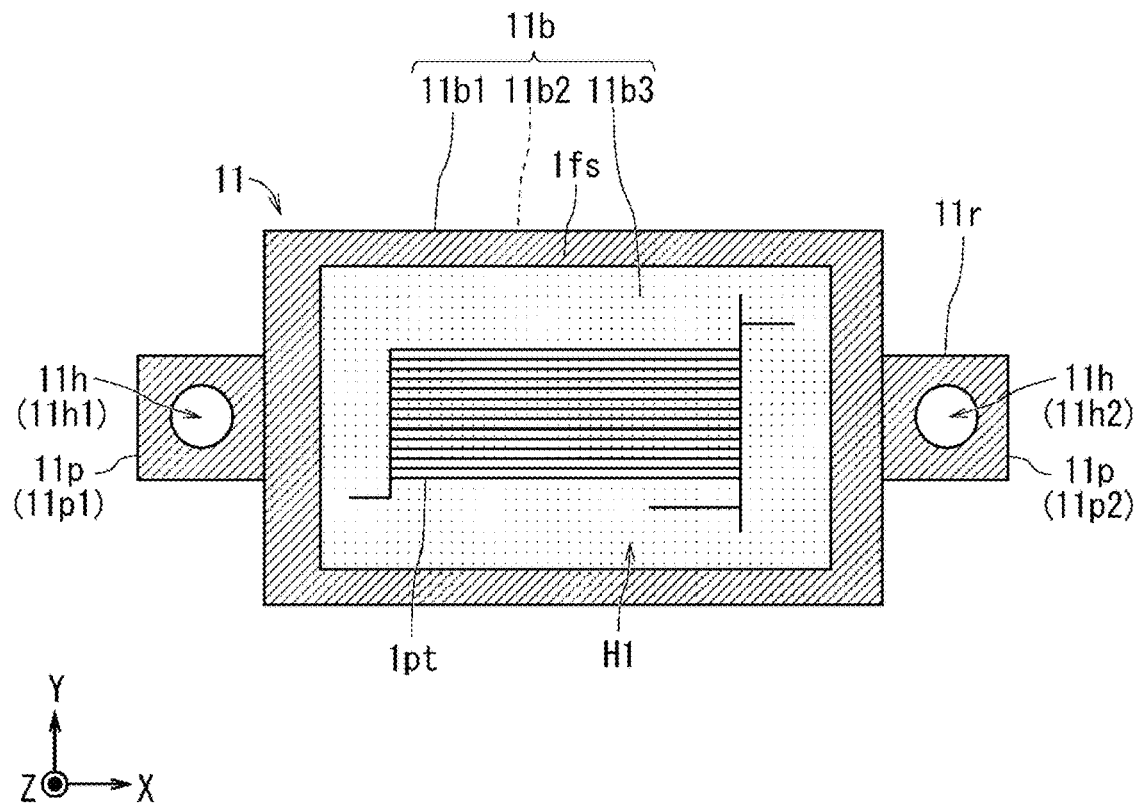
FIG. 23A illustrates a plan view of a first portion in a first example of a third embodiment.

As shown in FIG. 23A, for example, the structure may include a single hole H1 and the one or more first connectors 11b3 being a single first connector 11b3. The structure may include one or more holes H1 and one or more first connectors 11b3. As the first portion 11 is viewed in plan or viewed from a plan perspective in the −Z direction, for example, the multiple first protrusions 11p may have a smaller width than the first body 11b in the Y direction.

Figure 23B:
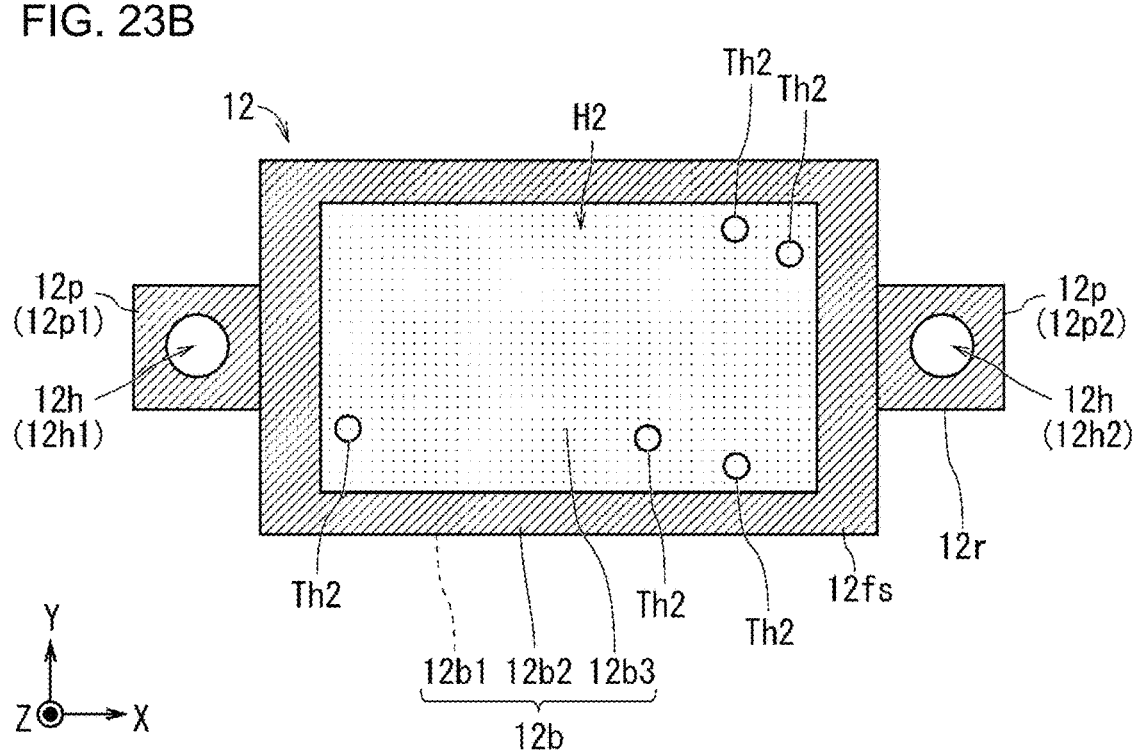
FIG. 23B illustrates a plan view of a second portion in the first example of the third embodiment.

As shown in FIG. 23B, for example, the structure may include a single hole H2 and the one or more second connectors 12b3 being a single second connector 12b3. The structure may include one or more holes H2 and one or more second connectors 12b3. As the second portion 12 is viewed in plan or viewed from a plan perspective in the −Z direction, for example, the multiple second protrusions 12p may have a smaller width than the second body 12b in the Y direction.

Figure 24A:
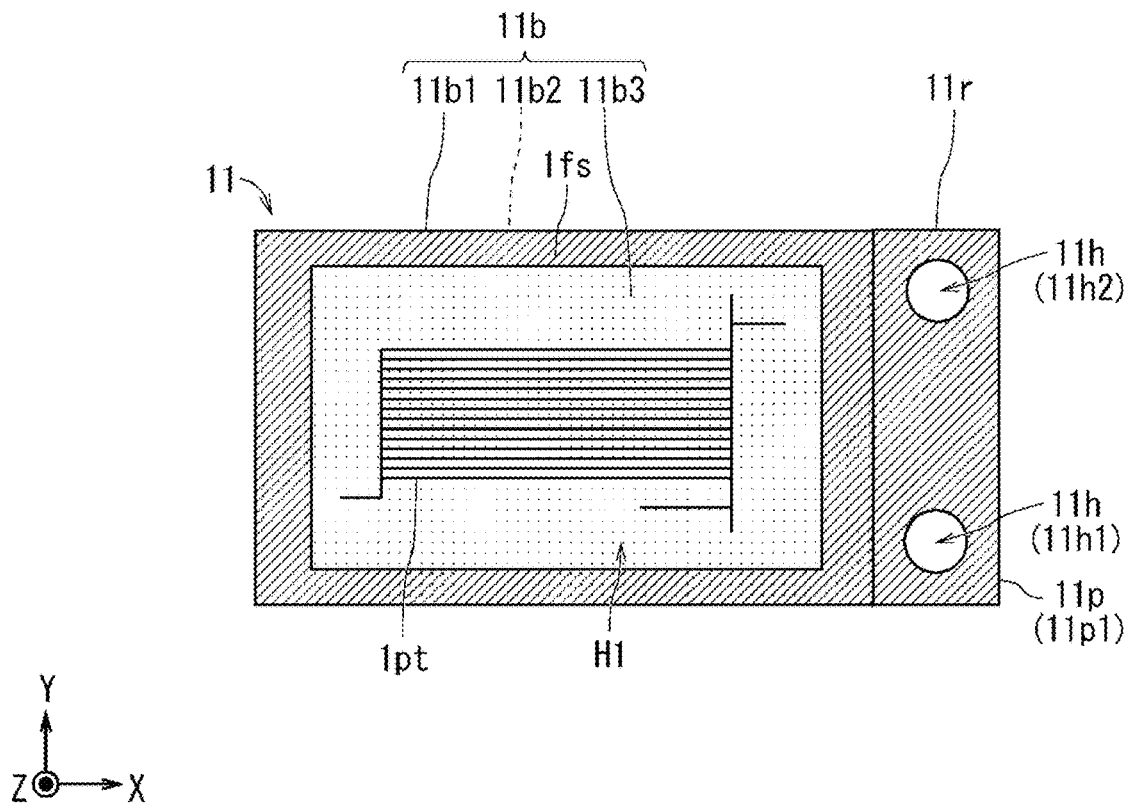
FIG. 24A illustrates a plan view of a first portion in a second example of the third embodiment.

When, for example, the first portion 11 is viewed in plan or viewed from a plan perspective in the −Z direction as shown in FIG. 24A, the first-A through-hole 11h1 as the first specific-shaped portion and the first-B through-hole 11h2 as the second specific-shaped portion may not be located opposite to each other across the first body 11b. The one or more first protrusions 11p may be, for example, a single first protrusion 11p. More specifically, the first reinforcement 11r may include, for example, one or more first protrusions 11p. In the example of FIG. 24A, the single first protrusion 11p has a first-A through-hole 11h1 as the first specific-shaped portion and a first-B through-hole 11h2 as the second specific-shaped portion.

Figure 24B:
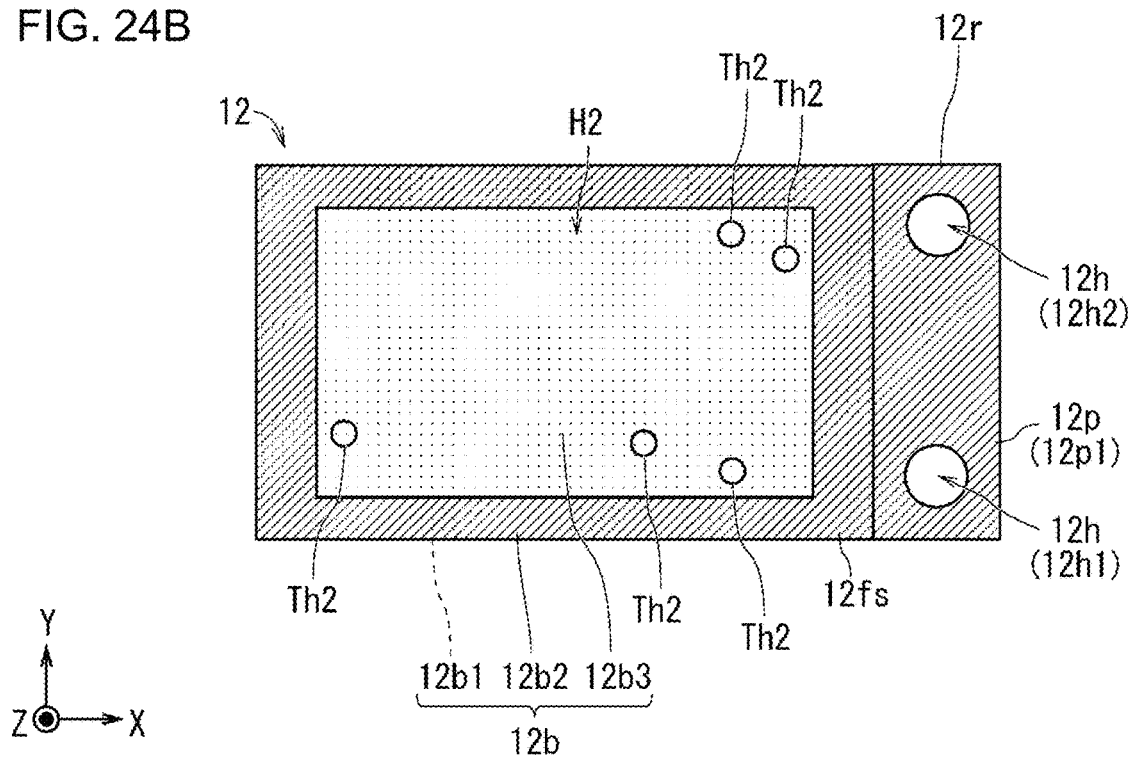
FIG. 24B illustrates a plan view of a second portion in the second example of the third embodiment.

When, for example, the second portion 12 is viewed in plan or viewed from a plan perspective in the −Z direction as shown in FIG. 24B, the second-A through-hole 12h1 as the third specific-shaped portion and the second-B through-hole 12h2 as the fourth specific-shaped portion may not be located opposite to each other across the second body 12b. The one or more second protrusions 12p may be, for example, a single second protrusion 12p. More specifically, the second reinforcement 12r may include, for example, one or more second protrusions 12p. In the example of FIG. 24B, the single second protrusion 12p has the second-A through-hole 12h1 as the third specific-shaped portion and the second-B through-hole 12h2 as the fourth specific-shaped portion.

Figure 25A:
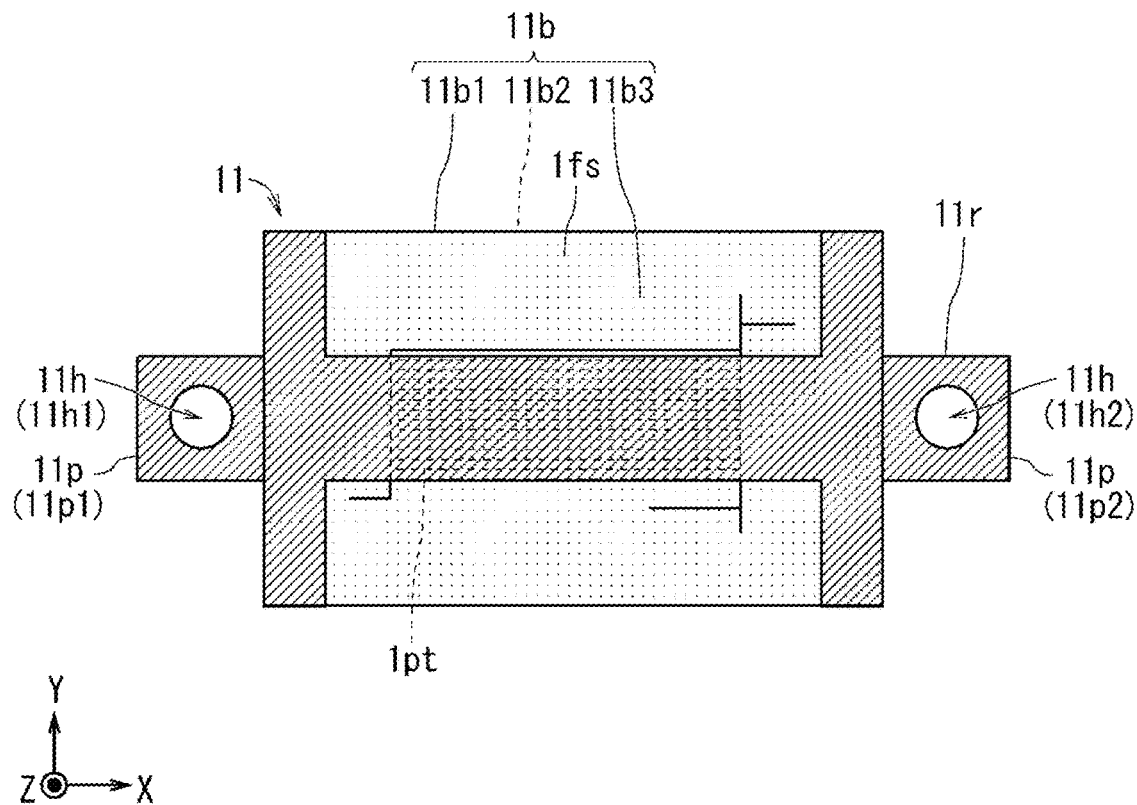
FIG. 25A illustrates a plan view of a first portion in a third example of the third embodiment.

As shown in FIG. 25A, for example, the first reinforcement 11r may not have the hole H1. The first connectors 11b3 may sandwich the first reinforcement 11r between them in the ±Y directions.

Figure 25B:
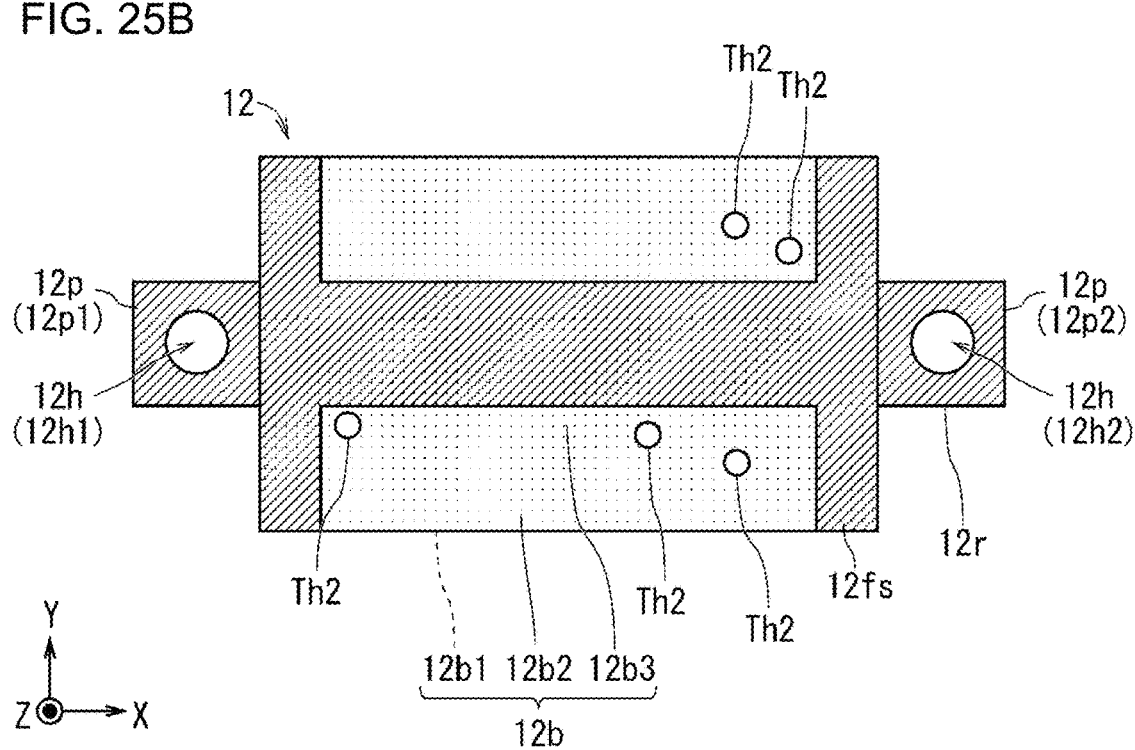
FIG. 25B illustrates a plan view of a second portion in the third example of the third embodiment.

As shown in FIG. 25B, for example, the second reinforcement 12r may not have the hole H2. The second connectors 12b3 may sandwich the second reinforcement 12r between them in the ±Y directions.

Figure 26A:
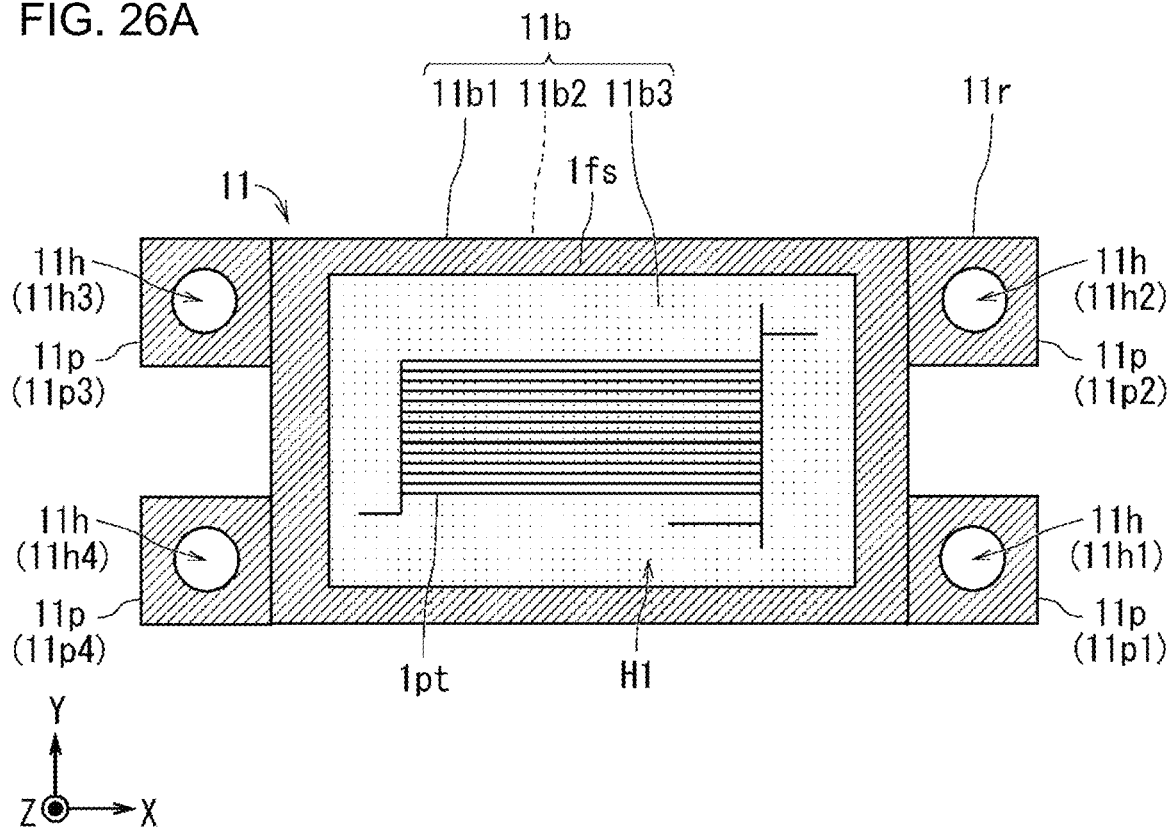
FIG. 26A illustrates a plan view of a first portion in a fourth example of the third embodiment.

As shown in FIG. 26A, for example, the multiple first protrusions 11p may be four first protrusions 11p. The multiple first protrusions 11p may further include, for example, a first-C protrusion 11p3 and a first-D protrusion 11p4. In this structure, for example, the first-C protrusion 11p3 may have a first-C through-hole 11h3 as a fifth specific-shaped portion for alignment, and the first-D protrusion 11p4 may have a first-D through-hole 11h4 as a sixth specific-shaped portion for alignment. More specifically, the one or more first protrusions 11p may have, for example, two or more specific-shaped portions.

Figure 26B:
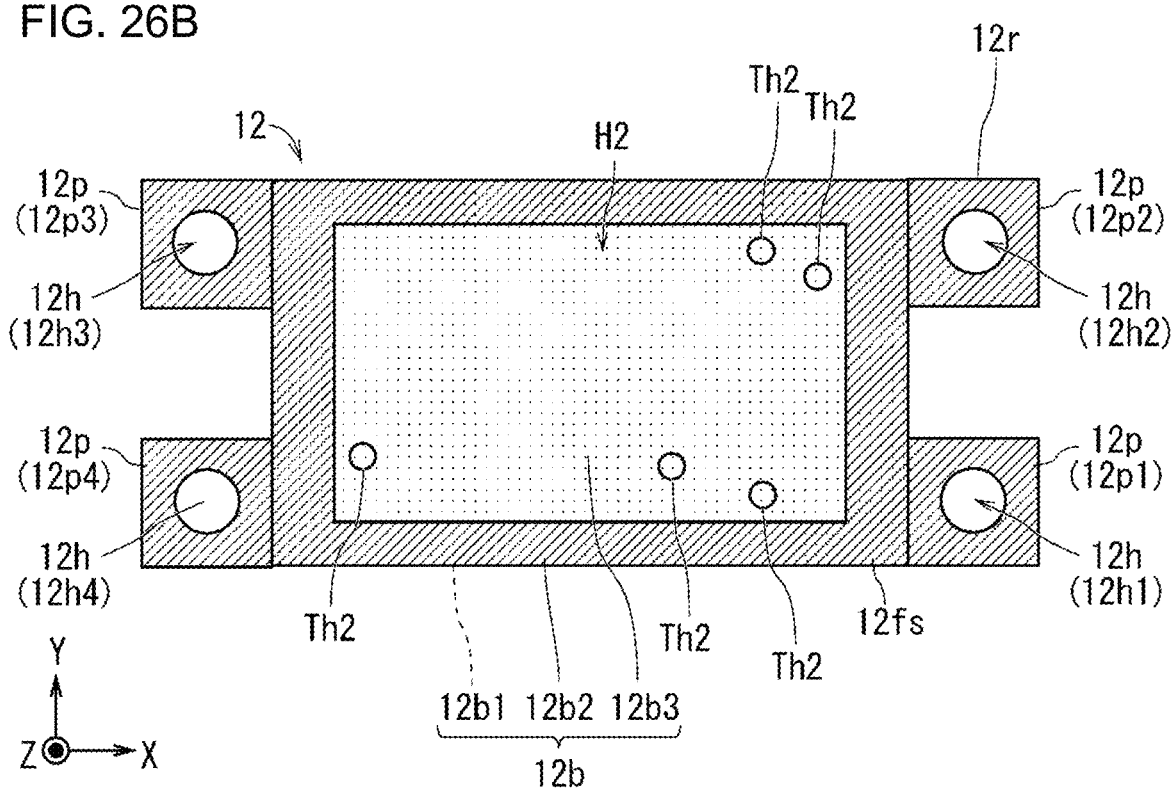
FIG. 26B illustrates a plan view of a second portion in the fourth example of the third embodiment.
Figure 27A:
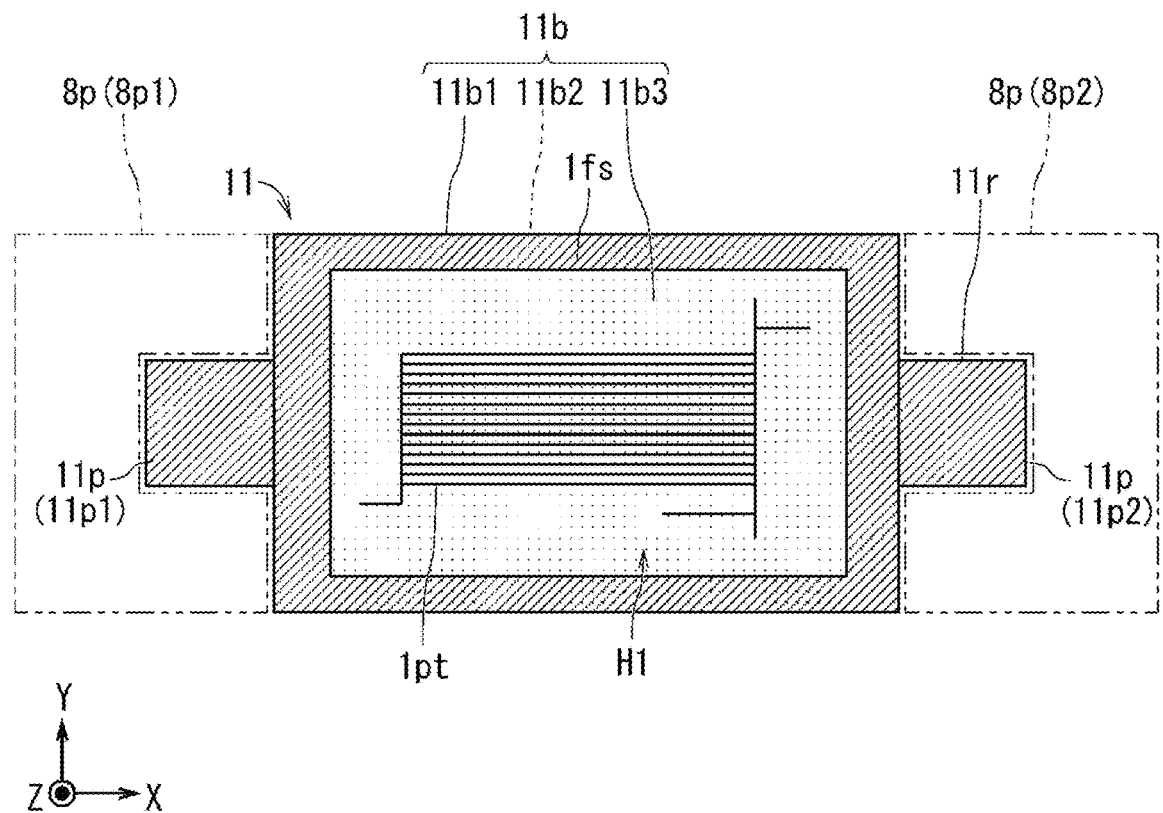
FIG. 27A illustrates a plan view of a first portion in a fifth example of the third embodiment.
Figure 27B:
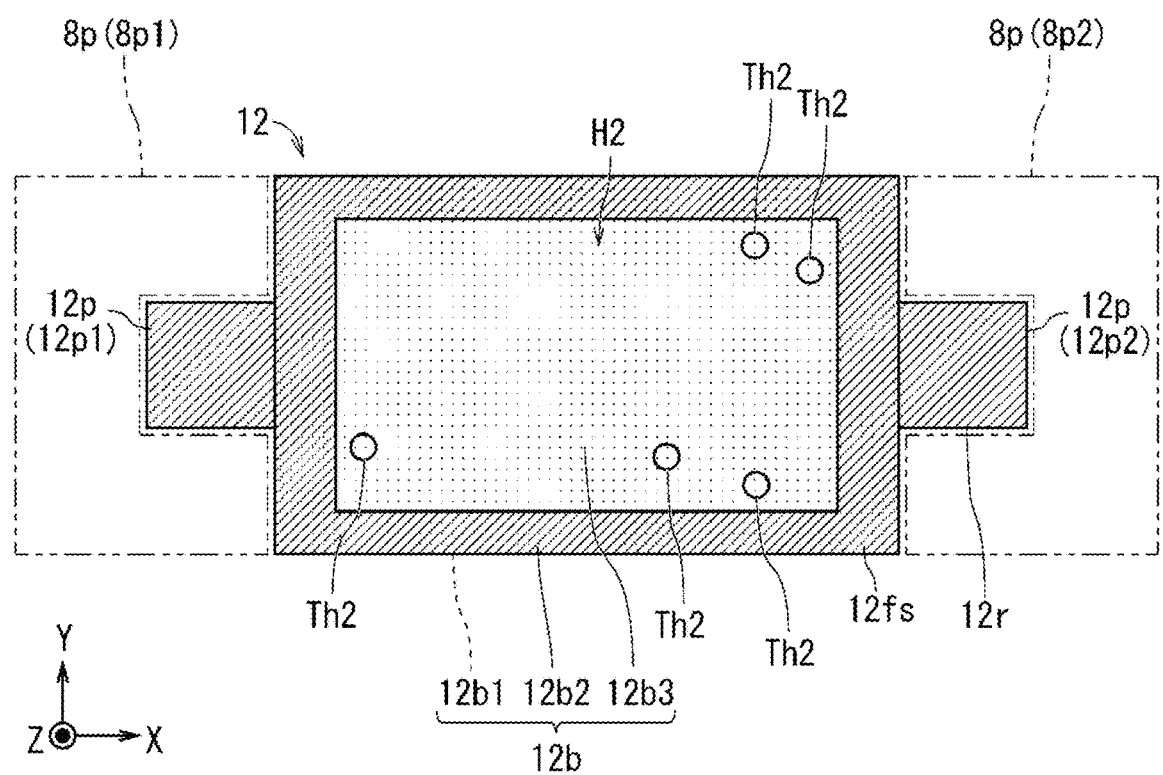
FIG. 27B illustrates a plan view of a second portion in the fifth example of the third embodiment.

As shown in FIG. 26B, for example, the multiple second protrusions 12p may be four second protrusions 12p. The multiple second protrusions 12p may further include, for example, a second-C protrusion 12p3 and a second-D protrusion 12p4. In this structure, for example, the second-C protrusion 12p3 may have a second-C through-hole 12h3 as a seventh specific-shaped portion for alignment, and the second-D protrusion 12p4 may have a second-D through-hole 12h4 as an eighth specific-shaped portion for alignment. More specifically, the one or more second protrusions 12p may have, for example, two or more specific-shaped portions.

For example, the specific-shaped portions included in each first protrusion 11p may not be through-holes but may have various shapes. For example, the specific-shaped portions included in each second protrusion 12p may not be through-holes but may have various shapes. As indicated by the two-dot chain lines in FIGS. 27A and 27B, for example, the shape of the projection 8p on the alignment table 8 may be shaped to fit the outer edge as a specific-shaped portion in the first protrusion 11p, or may be shaped to fit the outer edge as a specific-shaped portion in the second protrusion 12p.

For example, the first specific-shaped portion in the first portion 11 and the third specific-shaped portion in the second portion 12 may not overlap when viewed from a plan perspective in the −Z direction, and the second specific-shaped portion in the first portion 11 and the fourth specific-shaped portion in the second portion 12 may not overlap. In this structure, for example, the alignment table 8 may have multiple projections that fit into multiple specific-shaped portions of the first portion 11 and multiple projections that fit into multiple specific-shaped portions of the second portion 12 to facilitate alignment between the first portion 11 and the second portion 12.

3. Others

In each of the above embodiments, for example, the first reinforcement 11r may not be a plate. For example, the second reinforcement 12r may not be a plate. For example, the first reinforcement 11r and the second reinforcement 12r may each have multiple bar portions that are connected together.

In each of the above embodiments, for example, the first portion 11 may be formed by resin molding to include the first outer portion 11b1, the first connectors 11b3, and the first joint 11b2 in the stated order from the bottom.

Figure 28:
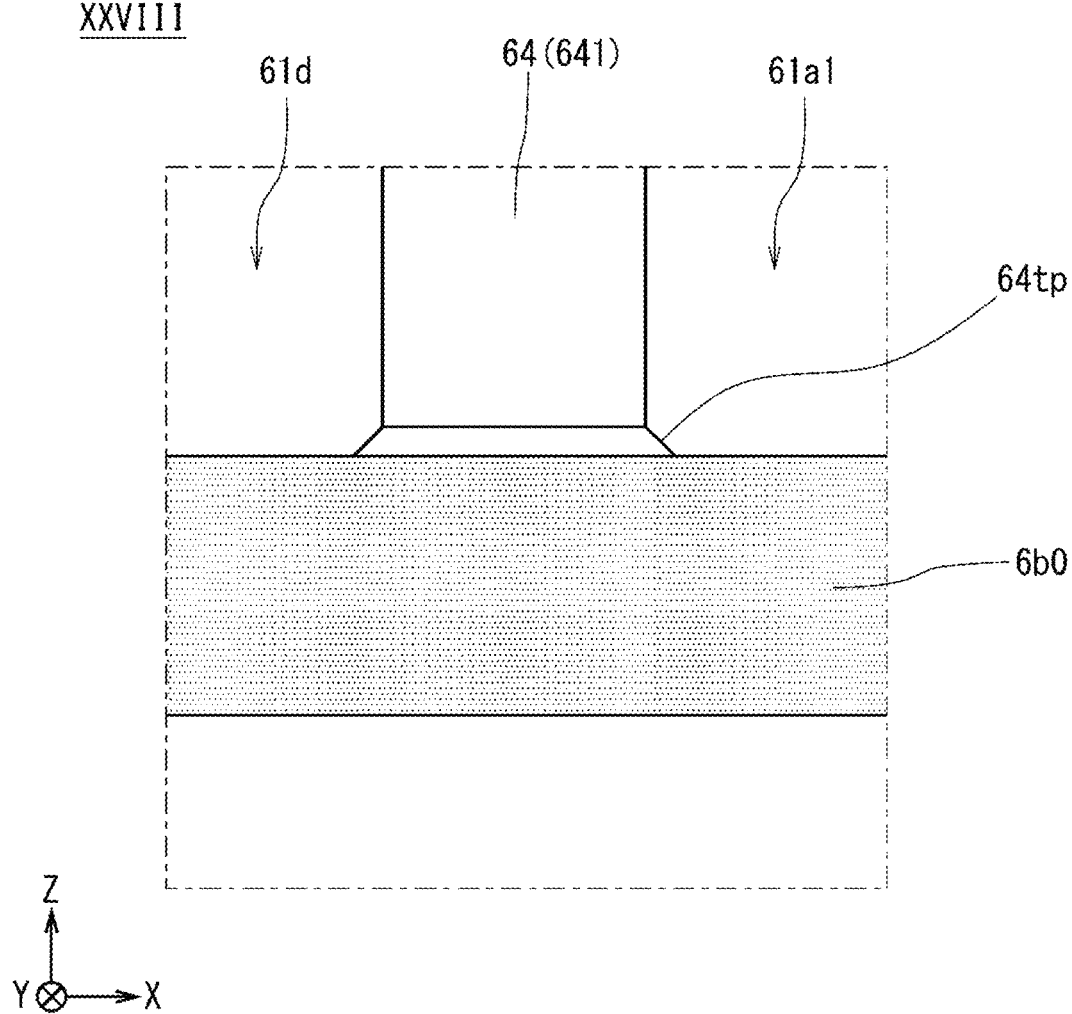
FIG. 28 illustrates an enlarged cross-sectional view of the second lower mold showing area XXVIII in FIG. 11B.

In each of the above embodiments, for example, the second portion 12 may be formed by resin molding to include the second joint 12b2, the second connectors 12b3, and the second outer portion 12b1 in the stated order from the bottom. As shown in FIG. 28, for example, the structure may have the second pins 64 each having a tapered portion 64tp that increases its diameter toward the second lower mold body 6b0. In this structure, for example, the second joint 12b2 is less likely to have burrs at the edges of the through-holes Th2. In this structure, the second surface 11bs and the third surface 12fs can be joined together easily.

In each of the above embodiments, for example, the second pins 64 may not be used to form the through-holes Th2 in the second portion 12 in resin molding. For example, the second portion 12 may be formed by resin molding without the second pins 64 and thus without forming the through-holes Th2. After the resin molding process, the through-holes Th2 may be formed by punching or another process.

In each of the above embodiments, the first upper surface 1fs and the first lower surface 1bs of the first flow path device 1 may not be rectangular. For example, the first upper surface 1fs and the first lower surface 1bs of the first flow path device 1 may have different shapes. For example, the second surface 11bs of the first portion 11 and the third surface 12fs of the second portion 12 may have different shapes.

In each of the above embodiments, the first upper surface 1fs and the first lower surface 1bs of the first flow path device 1 may not be flat.

In each of the above embodiments, the second upper surface 2fs and the second lower surface 2bs of the second flow path device 2 may not be rectangular. For example, the second upper surface 2fs and the second lower surface 2bs of the second flow path device 2 may have different shapes.

In each of the above embodiments, the second upper surface 2fs and the second lower surface 2bs of the second flow path device 2 may not be flat.

In each of the above embodiments, the first flow path device 1 may not be located on the second upper surface 2fs of the second flow path device 2. For example, the second flow path device 2 and the first flow path device 1 may be arranged on the same imaginary plane.

Figure 29:
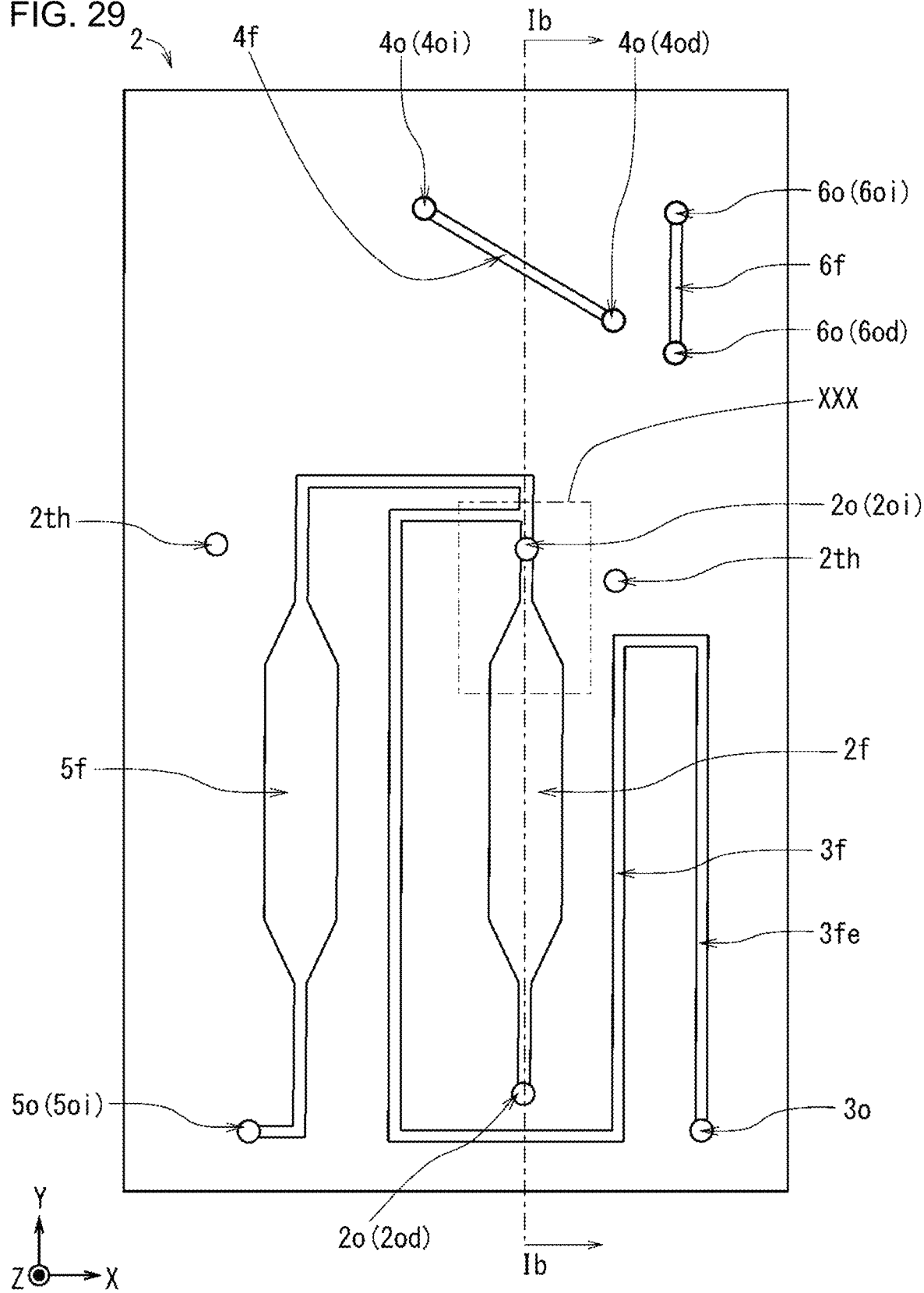
FIG. 29 illustrates a plan view of a second flow path device according to a modification.
Figure 30:
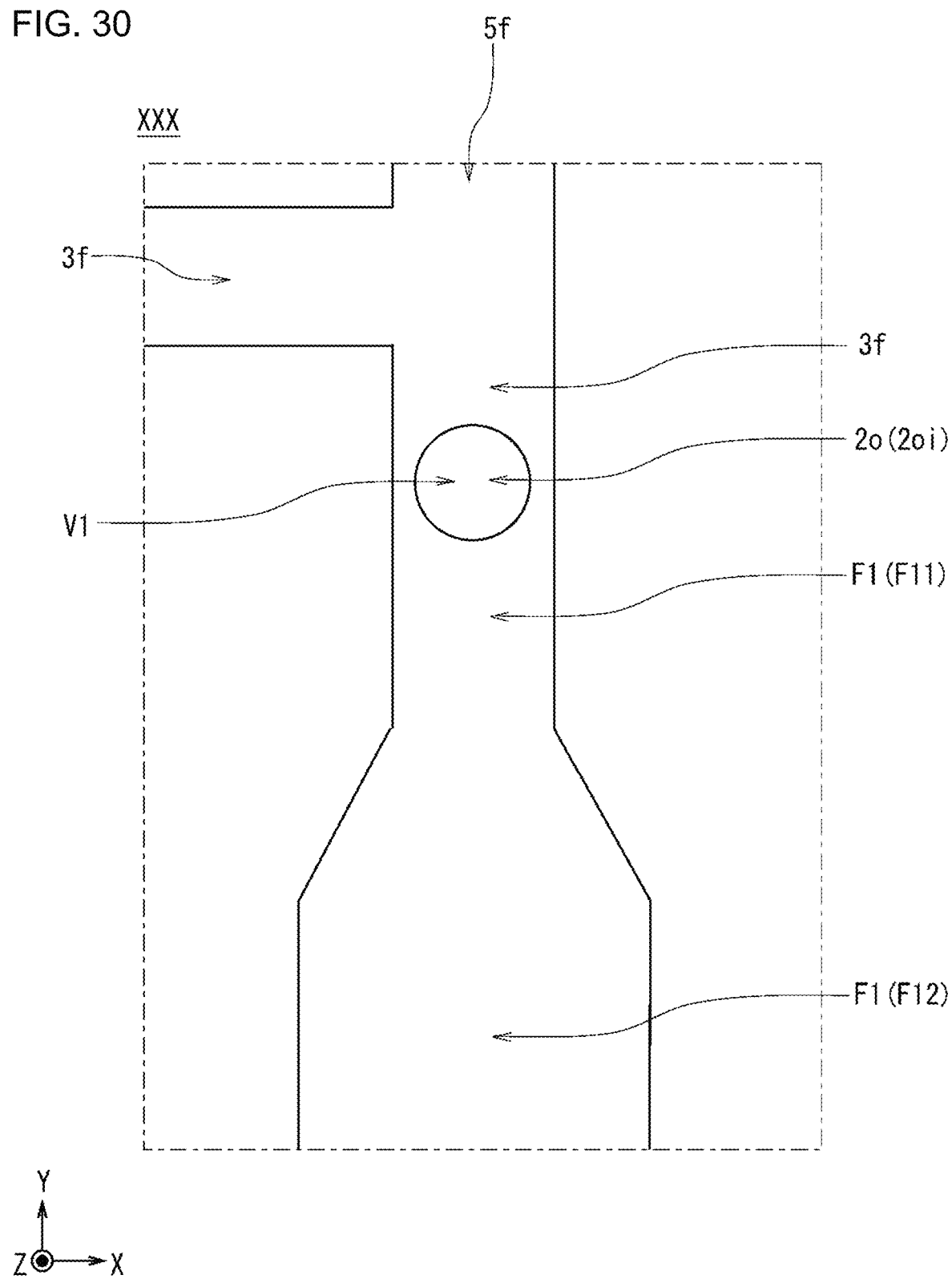
FIG. 30 illustrates an enlarged plan view of the second flow path device showing area XXX in FIG. 29.

In each of the above embodiments, the fifth flow path 5f may not have the fifth outlet 5od. As shown in FIGS. 29 and 30, for example, the fifth flow path 5f may have one end connected to the second flow path 2f. This structure can cause, for example, a fluid to flow from the fifth flow path 5f into the second flow path 2f. This allows, for example, dilution of the concentration of white blood cells as the first particles P1 in the fluid in the second flow path 2f.

In each of the above embodiments, the second flow path device 2 may not have the fifth flow path 5f and the sixth flow path 6f. For example, the fifth flow path 5f may also serve as the sixth flow path 6f. In this case, the sixth flow path 6f may be eliminated. In other words, for example, the fifth flow path 5f and the sixth flow path 6f may be replaced by a single fifth flow path 5f. In this structure, for example, the fifth outlet 5od of the fifth flow path 5f may be connected to the first sample-directing inlet 1op of the first flow path 1f.

Figure 31:
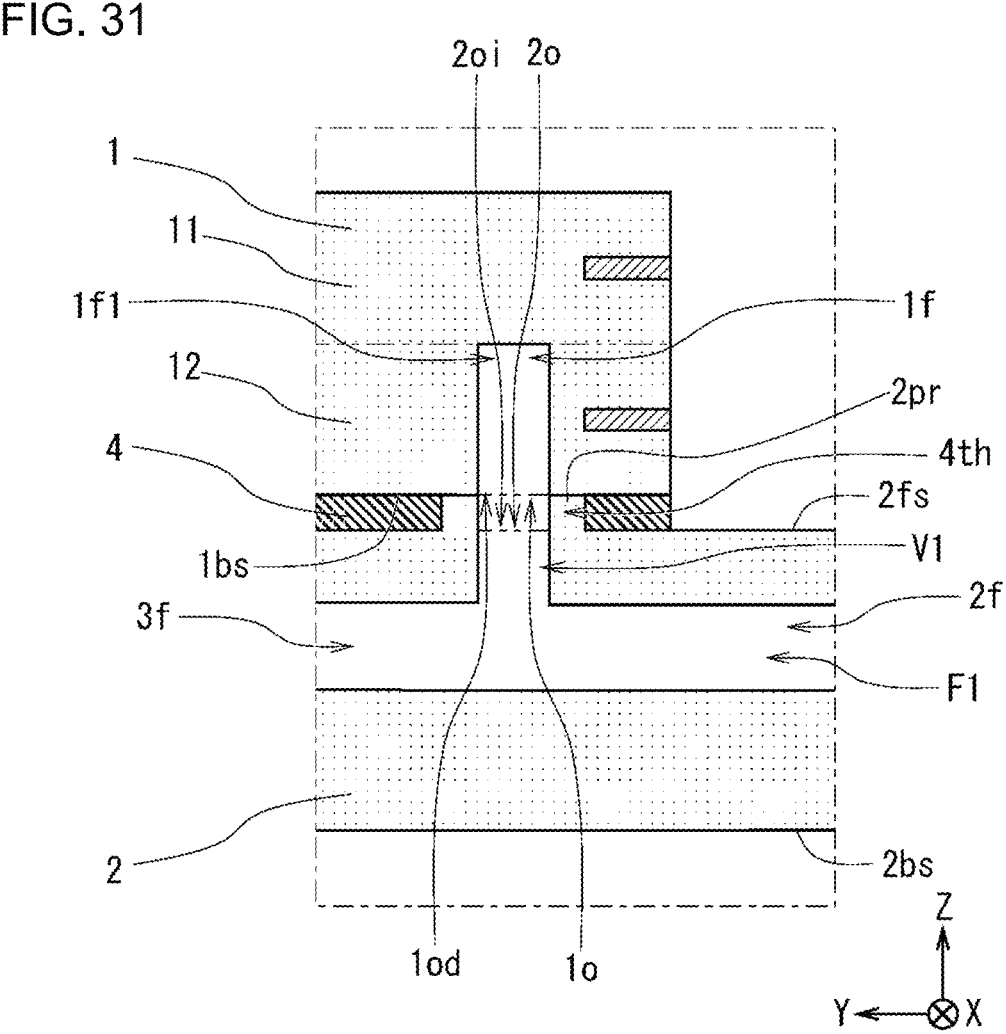
FIG. 31 illustrates an enlarged imaginary cross-sectional view of a flow path measuring device according to a modification at a position corresponding to area XVIII of the flow path measuring device shown in FIG. 1B.

As shown in FIG. 31, for example, the second flow path device 2 in each of the above embodiments may have multiple projections 2pr protruding in the +Z direction on the second upper surface 2fs. The projections 2pr are in an area defining a flow path that is connected to the first flow path 1f in the first flow path device 1. In this structure, for example, the multiple projections 2pr may fit into the multiple through-holes 4th in the sheet 4. This structure allows the first flow path 1f in the first flow path device 1 to be easily connected to the flow path in the second flow path device 2. When, for example, the first flow path 1f in the first flow path device 1 and the flow path in the second flow path device 2 can be connected reliably with the multiple projections 2pr fitting into the multiple through-holes 4th, no adhesive may be used to join the sheet 4 to the second flow path device 2.

In each of the above embodiments, the first lower surface 1bs of the first flow path device 1 may be directly fastened on the second upper surface 2fs of the second flow path device 2 without using the sheet 4. In this structure, for example, the first lower surface 1bs and the second upper surface 2fs may be joined with an adhesive, or the first lower surface 1bs and the second upper surface 2fs may be joined without using an adhesive but may be joined directly by surface modification or with a silane coupler applied.

In each of the above embodiments, for example, the sensor 9 may detect light emitted from a measurement target in the second flat portion F12 as the measurement area. For example, the sensor 9 may detect fluorescence emitted from specific microparticles, in the measurement target, that react with a reagent in the second flat portion F12.

In each of the above embodiments, for example, the first flow path device 1 may be a stand-alone flow path device without being combined with the second flow path device 2. The first flow path device 1 may be, for example, connected with a tube or another connection to another device and used as a microchip for separating specific components in a fluid as a sample.

In each of the above embodiments, for example, the first flow path 1f in the first flow path device 1 may not be used to separate specific microparticles in a fluid as a sample. The first flow path 1f may be used to, for example, mix multiple liquids.

The components described in the above embodiments and modifications may be entirely or partially combined as appropriate unless any contradiction arises.

The invention claimed is:

1. A flow path device, comprising:
   a first portion having a first surface and a second surface opposite to the first surface; and
   a second portion having a third surface joined to the second surface and a fourth surface opposite to the third surface, wherein the first portion includes a first body comprising a resin and a first reinforcement being harder than the first body;

the first body includes a first outer portion having the first surface, a first joint having the second surface, and one or more first connectors connecting the first outer portion and the first joint together, and the first outer portion, the first joint, and the one or more first connectors are integral with one another;

the first joint has, on the second surface, a groove pattern defining a first flow path, the first reinforcement is sandwiched between the first outer portion and the first joint and is bonded to the first outer portion and the first joint, and the first reinforcement includes one or more first protrusions protruding from the first body in a direction along the first surface when viewed in plan toward the first surface;

the one or more first protrusions include a first specific-shaped portion and a second specific-shaped portion at different positions when viewed in plan toward the first surface; and wherein the second portion includes a second body comprising a resin and a second reinforcement being harder than the second body;

the second body includes a second outer portion having the fourth surface, a second joint having the third surface, one or more second connectors connecting the second outer portion and the second joint together, and a plurality of through-holes extending from the third surface to the fourth surface and connecting to the first flow path, and the second outer portion, the second joint, and the one or more second connectors are integral with one another;

the second reinforcement is sandwiched between the second outer portion and the second joint and is bonded to the second outer portion and the second joint, and the second reinforcement includes one or more second protrusions protruding from the second body in a direction along the fourth surface when viewed in plan toward the fourth surface; and the one or more second protrusions include a third specific-shaped portion and a fourth specific-shaped portion at different positions when viewed from a plan perspective toward the fourth surface.

2. The flow path device according to claim 1, wherein the first joint and the second joint comprise similar resins.

3. The flow path device according to claim 1, wherein each of the first joint and the second joint comprises a silicone resin.

4. The flow path device according to claim 1, wherein the first body comprises polydimethylsiloxane.

5. The flow path device according to claim 1, wherein the first specific-shaped portion and the second specific-shaped portion are located opposite to each other across the first body when the first portion is viewed in plan.

6. The flow path device according to claim 1, wherein the third specific-shaped portion and the fourth specific-shaped portion are opposite to each other across the second body when the second portion is viewed in plan.

7. The flow path device according to claim 1, wherein the first specific-shaped portion and the third specific-shaped portion overlap each other and the second specific-shaped portion and the fourth specific-shaped portion overlap each other when viewed from a plan perspective toward the first surface.

8. A method for manufacturing a flow path device, the method comprising:

(a) forming a first portion by resin molding, the first portion having a first surface and a second surface opposite to the first surface;

(b) forming a second portion by resin molding, the second portion having a third surface and a fourth surface opposite to the third surface; and (c) joining the first portion and the second portion at the second surface and the third surface to form a flow path device, wherein (a) forming includes forming the first portion including a first body comprising a resin and a first reinforcement being harder than the first body, the first body includes a first outer portion having the first surface, a first joint having the second surface, and one or more first connectors connecting the first outer portion and the first joint together, the first outer portion, the first joint, and the one or more first connectors are integral with one another, the first joint has a groove pattern on the second surface, the first reinforcement is sandwiched between the first outer portion and the first joint and is bonded to the first outer portion and the first joint, and the first reinforcement includes one or more first protrusions protruding from the first body in a direction along the first surface when viewed in plan toward the first surface, the one or more first protrusions include a first specific-shaped portion and a second specific-shaped portion at different positions when viewed from a plan perspective toward the first surface, (b) forming includes forming the second portion including a second body comprising a resin and a second reinforcement being harder than the second body, the second body includes a second outer portion having the fourth surface, a second joint having the third surface, one or more second connectors connecting the second outer portion and the second joint together, and a plurality of through-holes extending from the third surface to the fourth surface, and the second outer portion, the second joint, and the one or more second connectors are integral with one another, the second reinforcement is sandwiched between the second outer portion and the second joint and is bonded to the second outer portion and the second joint, and the second reinforcement includes one or more second protrusions protruding from the second body in a direction along the fourth surface when viewed in plan toward the fourth surface, the one or more second protrusions include a third specific-shaped portion and a fourth specific-shaped portion at different positions when viewed from a plan perspective toward the fourth surface, and (c) joining includes aligning the first portion and the second portion using the first specific-shaped portion, the second specific-shaped portion, the third specific-shaped portion, and the fourth specific-shaped portion and bonding the first portion and the second portion at the second surface and the third surface to connect the groove pattern and the plurality of through-holes and to cause the groove pattern to define a first flow path.

9. The method according to claim 8, wherein (a) forming and (b) forming include forming the first portion and the second portion to cause the first joint and the second joint to comprise similar resins.

10. A flow path measuring device, comprising:

a first flow path device including the flow path device according to claim 1; and a second flow path device, wherein the plurality of through-holes include a through-hole including a first opening located in the fourth surface, the second flow path device has a fifth surface and a sixth surface opposite to the fifth surface, a second flow path located inside the second flow path device and having a second opening in the fifth surface, and a light-transmitting portion configured to transmit light from at least a measurement area included in the second flow path out of the second flow path device, and the first opening and the second opening connect to each other.

11. An inspection apparatus, comprising:

the flow path measuring device according to claim 10; and a sensor configured to receive light from the measurement area through the light-transmitting portion.

* * * * *